(12) United States Patent
Shimamura et al.

(10) Patent No.: US 6,249,378 B1
(45) Date of Patent: *Jun. 19, 2001

(54) MIRROR AND PROJECTION TYPE DISPLAY APPARATUS

(75) Inventors: Naotaka Shimamura; Tetsuo Hattori; Mikio Okamoto, all of Kanagawa (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,841

(22) Filed: Feb. 27, 1998

(30) Foreign Application Priority Data

| Feb. 28, 1997 | (JP) | ................................... | 9-061829 |
| Feb. 28, 1997 | (JP) | ................................... | 9-061830 |
| Feb. 28, 1997 | (JP) | ................................... | 9-061831 |

(51) Int. Cl.$^7$ .................................. G02B 27/28
(52) U.S. Cl. ......................... 359/487; 359/488; 359/584; 353/20
(58) Field of Search .................................. 359/487, 488, 359/584; 353/20

(56) References Cited

U.S. PATENT DOCUMENTS

| 4,836,649 |   | 6/1989  | Ledebuhr et al. ............ 350/331 |
| 5,278,680 | * | 1/1994  | Karasawa et al. ............ 359/40  |
| 5,357,370 |   | 10/1994 | Miyatake et al. ............ 359/495 |
| 5,559,634 | * | 9/1996  | Weber ........................... 359/638 |

* cited by examiner

Primary Examiner—Cassandra Spyrou
Assistant Examiner—Craig Curtis
(74) Attorney, Agent, or Firm—Foley & Lardner

(57) ABSTRACT

A mirror comprises a transparent glass substrate and a dielectric multilayer film laminated on one surface (entrance surface) of the glass substrate. The dielectric multilayer film is formed by layers made of a high refractive index material and layers made of a low refractive index material which are alternately laminated, and is applied to a projection type display apparatus. The material and thickness of each layer are set so as to yield a polarization characteristic for causing reflected light to approach linearly polarized light.

25 Claims, 31 Drawing Sheets

FOR B LIGHT

FOR B LIGHT

FOR B LIGHT

FOR G LIGHT

FOR R LIGHT

FOR G LIGHT

FOR R LIGHT

FOR B LIGHT

FOR G LIGHT

MIRROR AND PROJECTION TYPE DISPLAY APPARATUS

BACKGROUND OF THE INVENTION

1. Field of the Invention

The present invention relates to a mirror and a projection type display apparatus using a liquid crystal light valve.

2. Related Background Art

There has been known a projection type display apparatus in which light from a light source is chromatically decomposed into R, G, and B light components; these individual color light components are made incident on liquid crystal light valves disposed for the respective color light components and emitted therefrom after being modulated therein; thus emitted light components are analyzed and then are chromatically combined together; and thus chromatically combined light is projected onto a screen by a projection optical system. Such an apparatus is disclosed in U.S. Pat. No. 5,357,370.

SUMMARY OF THE INVENTION

The mirror in accordance with the present invention has a polarizing characteristic (polarization separating characteristic) for causing reflected light to approximate linearly polarized light. Since this mirror has such a characteristic, it attains a reflecting function and a polarizing function at the same time. Accordingly, in a projection type display apparatus, When this mirror is employed as a bending mirror, disposed in an optical path through which light is incident on a light valve, for bending the optical path, the light incident on the light valve yields an enhanced purity in polarization, thus allowing the contrast of projection image to improve.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS (Mirror of First Embodiment)

The mirror in accordance with a first embodiment of the present invention will be explained with reference to FIGS. 1 to 4.

Figure 1:
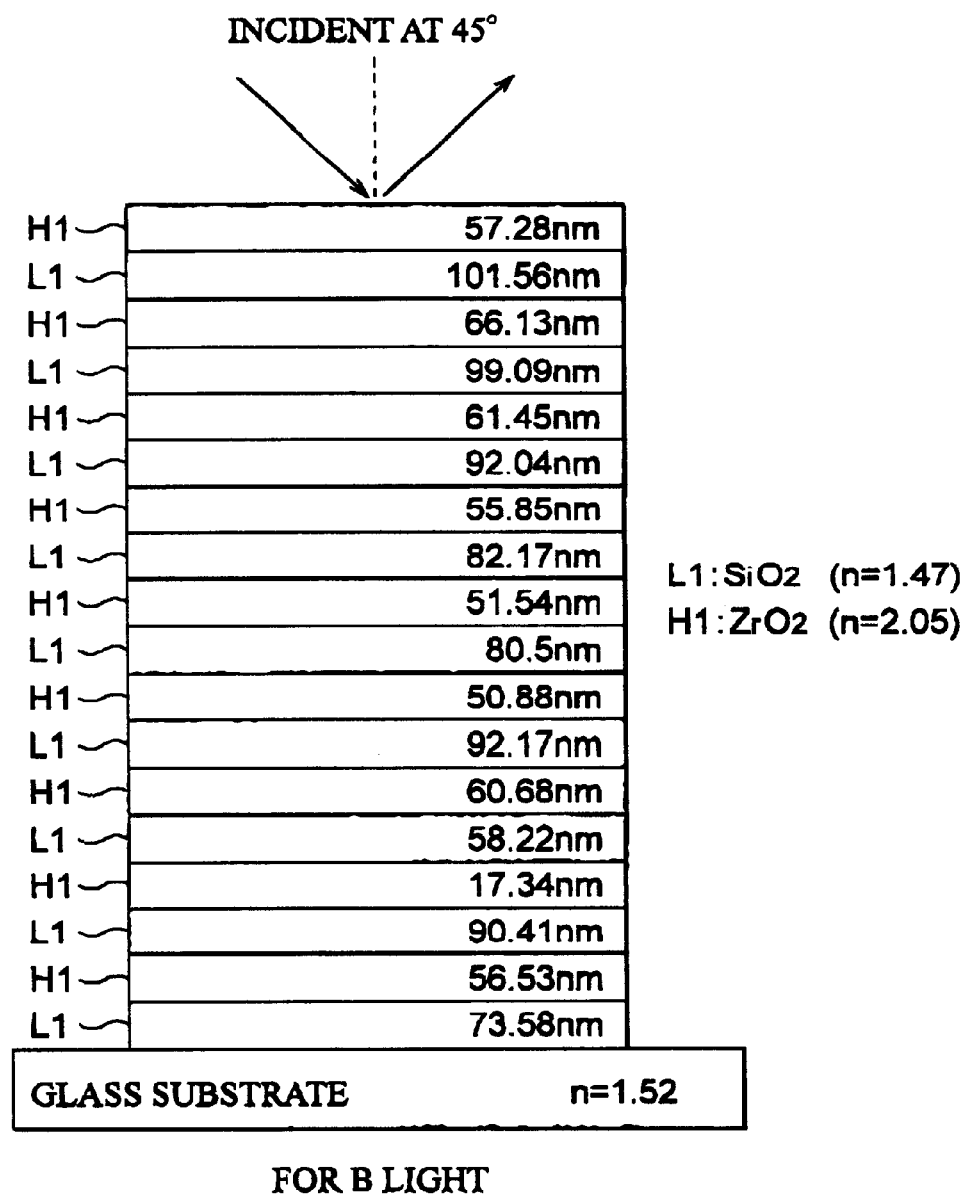
FIG. 1 is a view schematically showing a cross-sectional configuration of a mirror in accordance with its first embodiment of the present invention.
Figure 2:
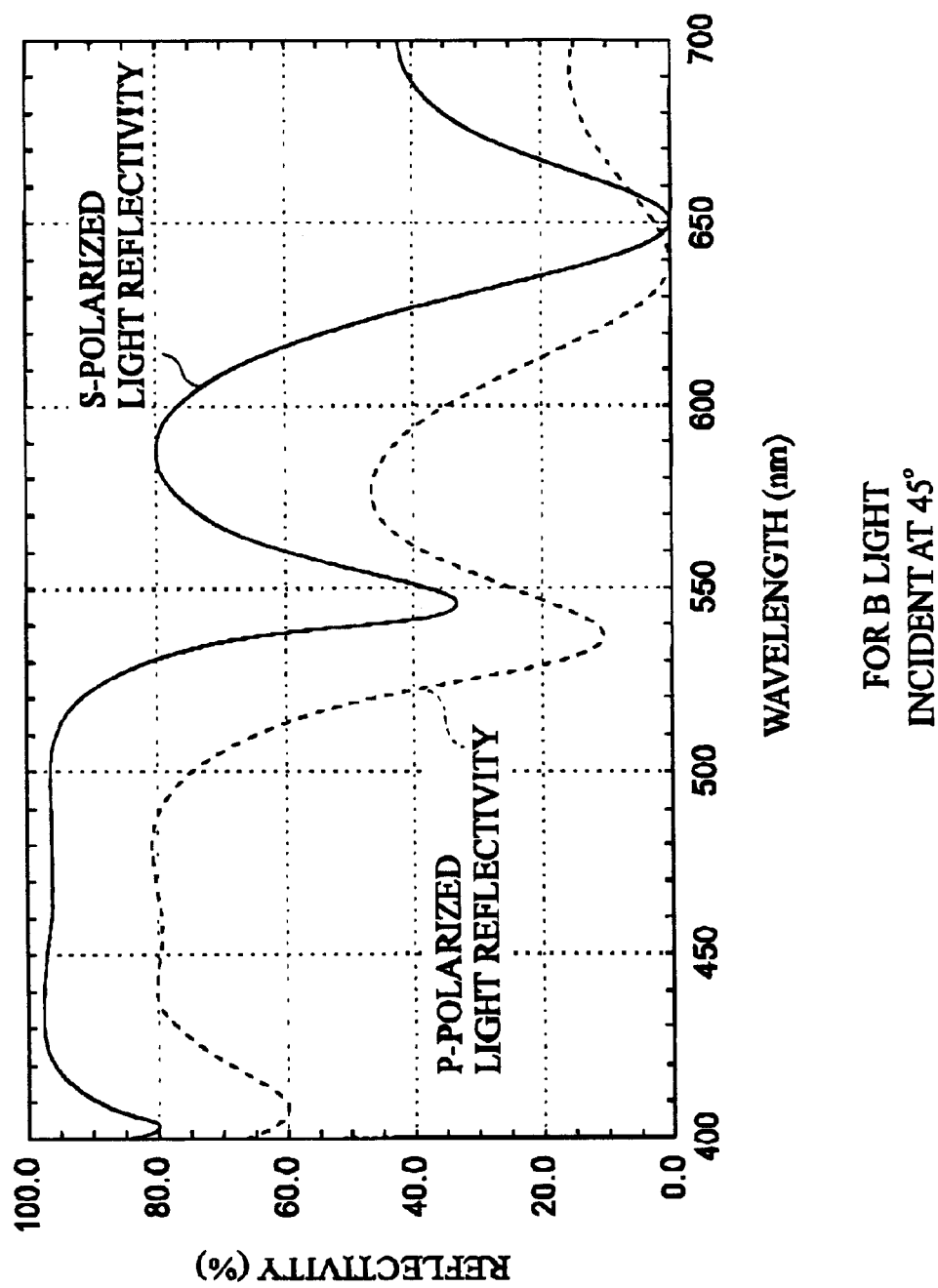
FIG. 2 is a view showing a reflection characteristic of the mirror shown in FIG. 1 at an incident angle of 45 degrees.
Figure 3:
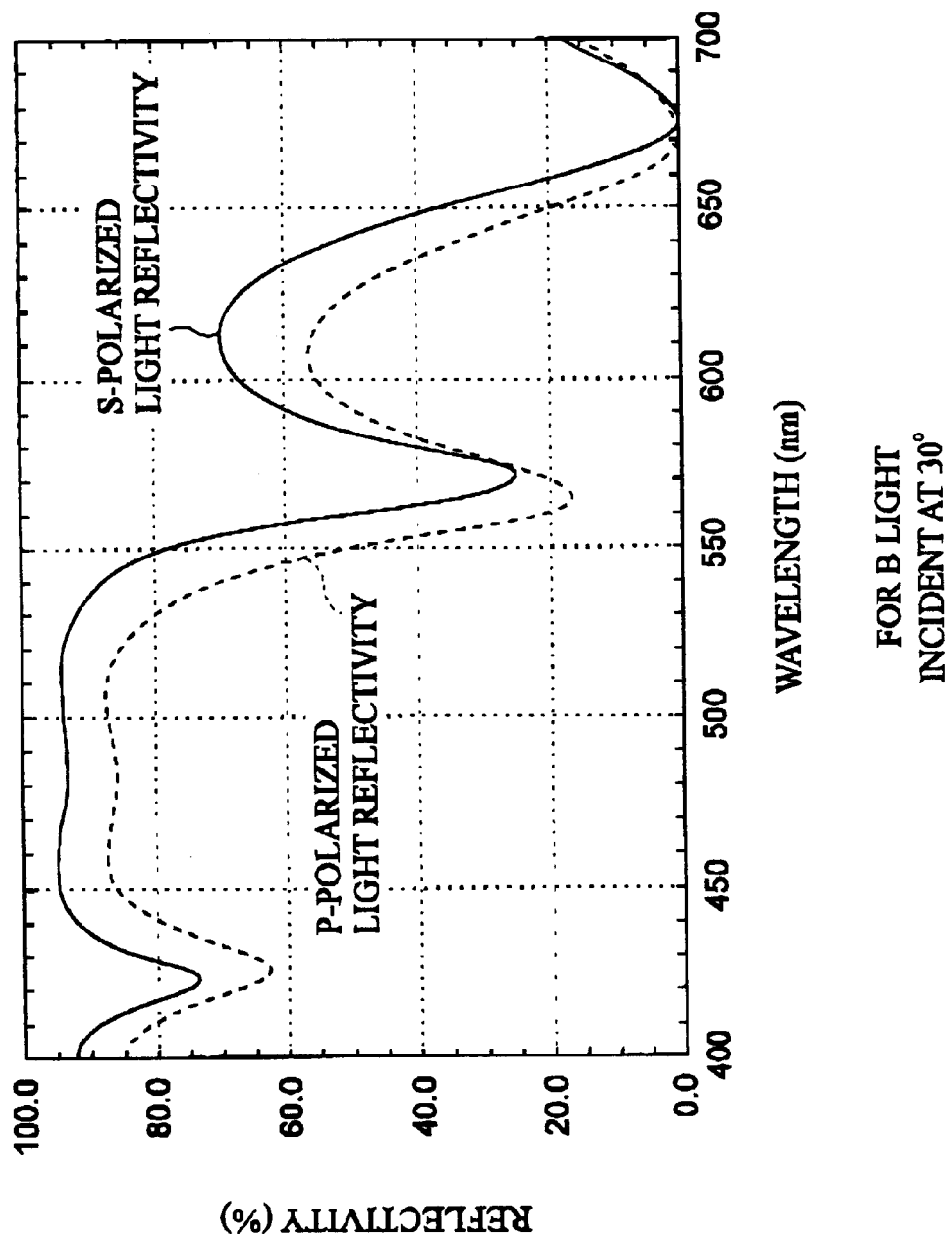
FIG. 3 is a view showing a reflection characteristic of the mirror shown in FIG. 1 at an incident angle of 30 degrees.
Figure 4:
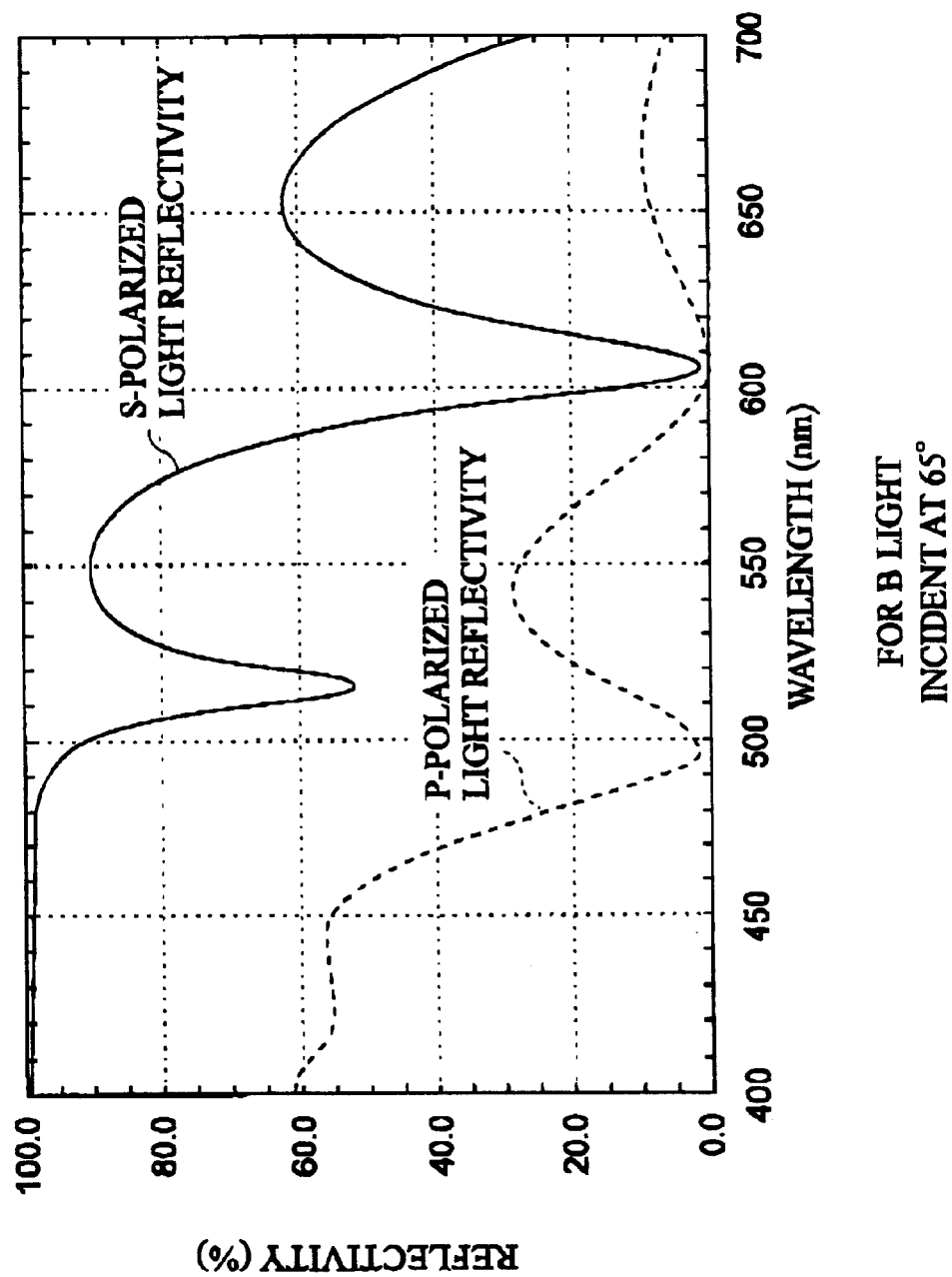
FIG. 4 is a view showing a reflection characteristic of the mirror shown in FIG. 1 at an incident angle of 65 degrees.

FIG. 1 is a view schematically showing a cross-sectional configuration of the mirror in accordance with this embodiment. FIGS. 2 to 4 are views respectively showing reflection characteristics of the mirror shown in FIG. 1.

The mirror in accordance with this embodiment is an example of mirror for B (blue) light, which is optimized for light incident thereon at an incident angle of 45 degrees. As shown in FIG. 1, it is constituted by a transparent glass substrate having a refractive index n=1.52, and a dielectric multilayer film laminated on one surface (entrance surface) of the glass substrate. As shown in FIG. 1, this dielectric multilayer is formed by 18 layers in total of films made of zirconium oxide ($ZrO_2$: refractive index n=2.05) as a high refractive index material H1 and films made of silicon dioxide ($SiO_2$: refractive index n=1.47) as a low refractive index material L1, which are alternately laminated with their respective film thickness values shown in FIG. 1.

FIG. 2 shows a reflection characteristic of the mirror shown in FIG. 1 at an incident angle of 45 degrees. In FIG. 2 (as with FIGS. 3, 4, 6, 7, 8, 10, 12, 14, 16, and 18 which will be explained later), solid line indicates reflectivity of S-polarized light, whereas dotted line indicates reflectivity of P-polarized light, when the mirror is disposed within the air having a refractive index of 1. As can be seen from FIG. 2, in the mirror shown in FIG. 1, with respect to light made incident thereon at an incident angle of 45 degrees, over substantially the whole B light wavelength region (400 nm to 500 nm), the reflectivity of S-polarized light is at least 95%, whereas the reflectivity of P-polarized light is at a level lower than that of S-polarized light by about 20%, from which it can be understood that the mirror has a polarizing characteristic, in the B light wavelength region, for causing reflected light to approximate linearly polarized light.

Namely, in the case where light in a predetermined wavelength band with a width of at least 50 nm (e.g., 450 to 500 nm), having S-polarized and P-polarized components, selected from a wavelength band of 400 to 500 nm (B light) is made incident on the mirror at an incident angle of 45 degrees, the ratio $Rs=Irs/Iis$ of intensity of S-polarized light component in reflected light (Irs) to intensity of S-polarized light component in incident light (Iis) is at least 90%, which is greater by at least 15% than the ratio $Rp=Irp/Iip$ of intensity of P-polarized light component in reflected light (Irp) to intensity of P-polarized light component in incident light (Iip). Namely, under this condition, the mirror satisfies the following relationships:

Rs≧90%,

Rs−Rp≧15%.

More specifically, under this condition, the mirror satisfies the following relationships;

Rs≧95%,

Rs−Rp≧15%.

Also, when light in a wavelength band of 400 to 500 nm (B light) having S-polarized and P-polarized components is made incident on this mirror, the average value (Ars) of ratio $Rs=Irs/Iis$ of intensity of S-polarized light component in reflected light (Irs) to intensity of S-polarized light component in incident light (Iis) is at least 85%, which is greater by at least 15% than the average value (Arp) of ratio $Rp=Irp/Iip$ of intensity of P-polarized light component in reflected light (Irp) to intensity of P-polarized light component in incident light (Iip). Namely, under this condition, the mirror satisfies the following relationships:

ARs≧85%,

ARs−ARp≧15%.

Here, as can be seen from FIG. 2, the mirror shown in FIG. 1 is a dichroic mirror having a selectivity for reflection wavelength.

Namely, when light in a wavelength band of 500 to 600 nm (G light; green) having S-polarized and P-polarized components is made incident on this mirror, the average value (Ars) of ratio $Rs=Irs/Iis$ of intensity of S-polarized light component in reflected light (Irs) to intensity of S-polarized light component in incident light (Iis) is not higher than 80%, whereas the average value (Arp) of ratio $Rp=Irp/Iip$ of intensity of P-polarized light component in reflected light (Irp) to intensity of P-polarized light component in incident light (Iip) is not higher than 60%. Namely, under this condition, the mirror satisfies the following relationships:

ARs≧80%,

ARp≧60%.

More specifically, under this condition, the mirror satisfies the following relationships:

ARs≧75%,

ARp≧55%.

When light in a wavelength band of 600 to 700 nm (R light: red) having S-polarized and P-polarized components is made incident on this mirror, the average value (Ars) of ratio $Rs=Irs/Iis$ of intensity of S-polarized light component in reflected light (Irs) to intensity of S-polarized light component in incident light is not higher than 40%, whereas the average value (Arp) of ratio $Rp=Irp/Iip$ of intensity of P-polarized light component in reflected light (Irp) to intensity of P-polarized light component in incident light (Iip) is not higher than 25%. Namely, under this condition, the mirror satisfies the following relationships:

ARs≧40%,

ARp≧25%.

More specifically, under this condition, the mirror satisfies the following relationships:

ARs≧35%,

ARp≧15%.

FIG. 3 shows a reflection characteristic of the mirror shown in FIG. 1 at an incident angle of 30 degrees. As can be seen from FIG. 3, in the mirror shown in FIG. 1, with respect to light incident thereon at an incident angle of 30 degrees, in the B light wavelength region, the reflectivity of S-polarized light decreases, while the reflectivity of P-polarized light increases, thereby indicating that the polarizing characteristic for causing reflected light to approximate linearly polarized light is not so strong. Though the mirror shown in FIG. 1 is thus not preferably used at an incident angle of 30 degrees, it can still be used there since it substantially has a polarizing characteristic even at this angle.

FIG. 4 shows a reflection characteristic of the mirror shown in FIG. 1 at an incident angle of 65 degrees. As can be seen from FIG. 3, in the mirror shown in FIG. 1, with respect to light incident thereon at an incident angle of 65 degrees, in the B light wavelength region, the reflectivity of S-polarized light further increases, while the reflectivity of P-polarized light further decreases so as to be lower than that of the S-polarized light by about 40%, thus yielding a further favorable polarizing characteristic (favorable reflection-extinguishing ratio). In this case, however, the wavelength width in which the S-polarized light can be reflected becomes smaller than that with the incident angle of 45 degrees. The mirror shown in FIG. 1 can also be used with an incident angle of 65 degrees.

(Mirror of Second Embodiment)

The mirror in accordance with a second embodiment of the present invention will be explained with reference to FIGS. 5 to 8.

Figure 5:
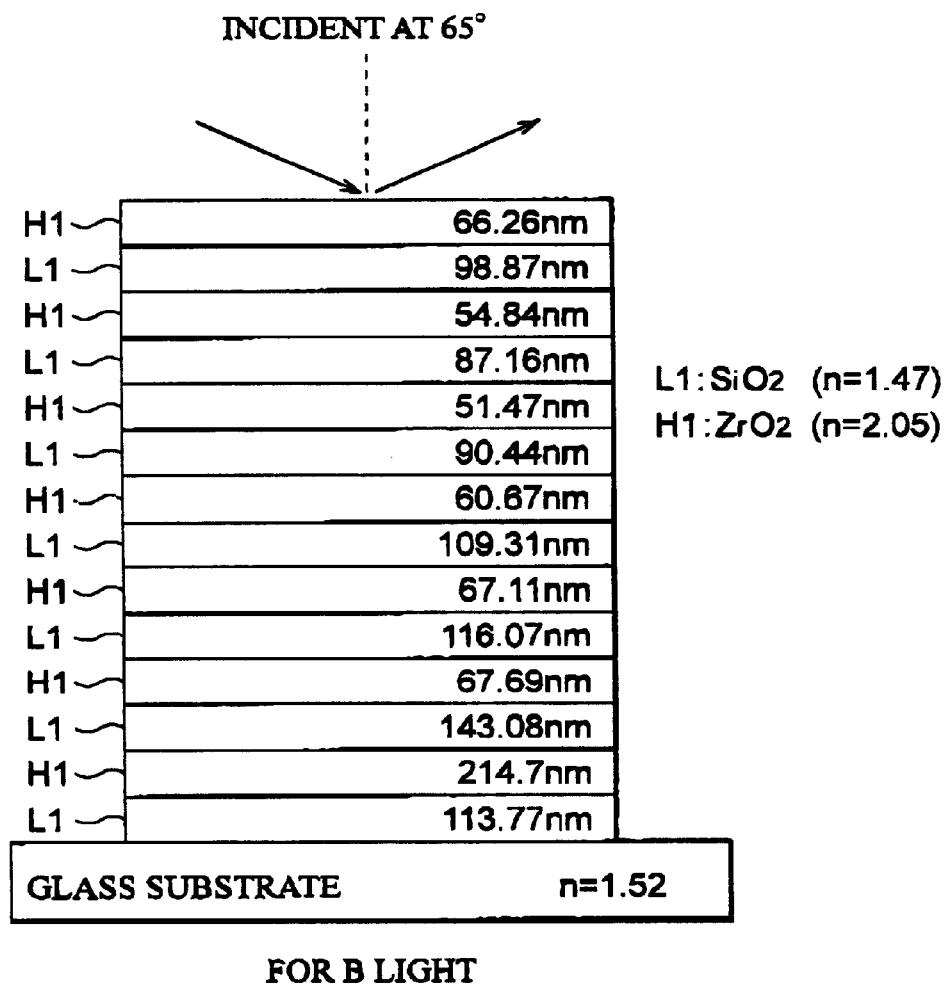
FIG. 5 is a view schematically showing a cross-sectional configuration of a mirror in accordance with its second embodiment of the present invention.
Figure 6:
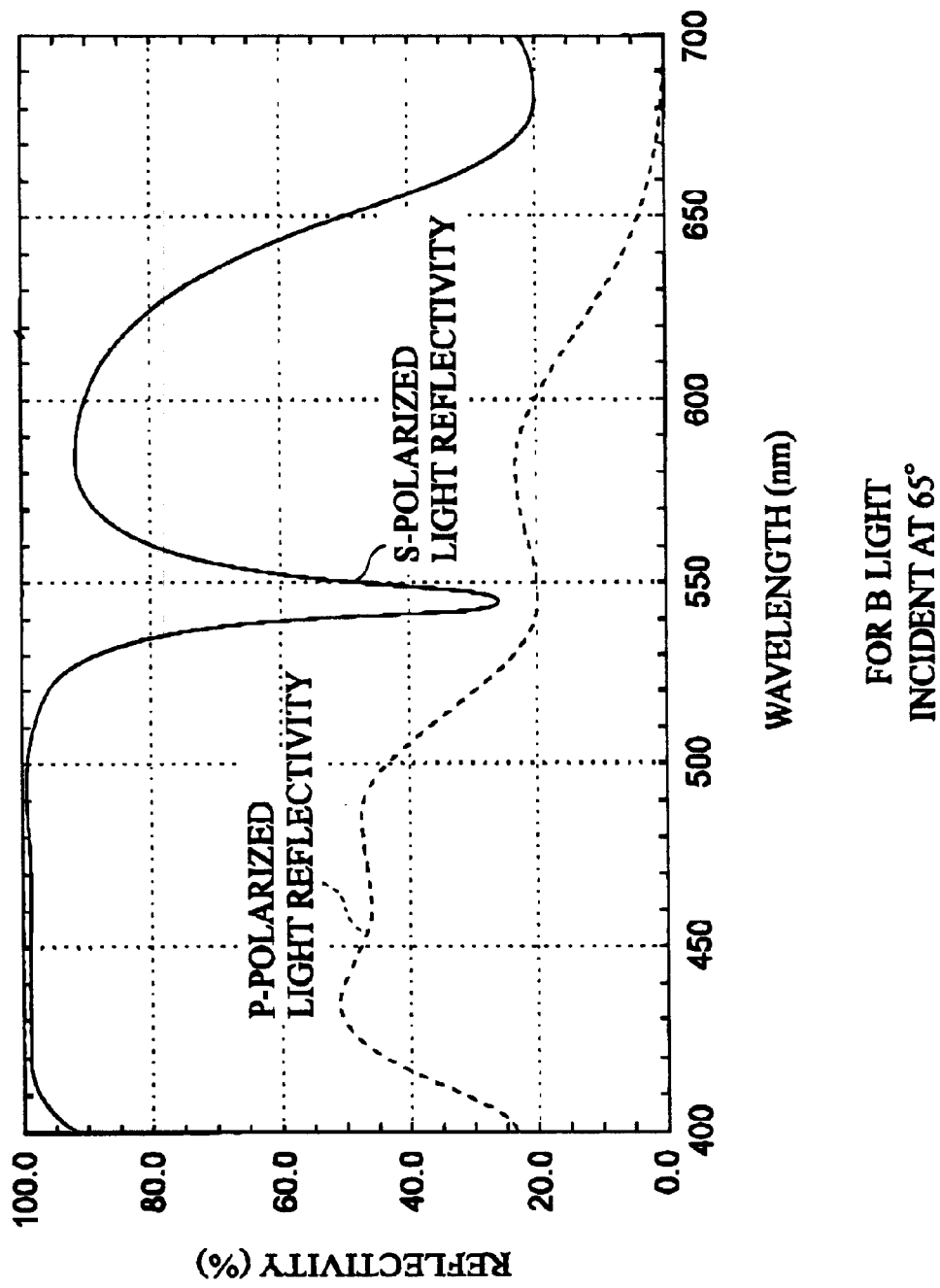
FIG. 6 is a view showing a reflection characteristic of the mirror shown in FIG. 5 at an incident angle of 65 degrees.
Figure 7:
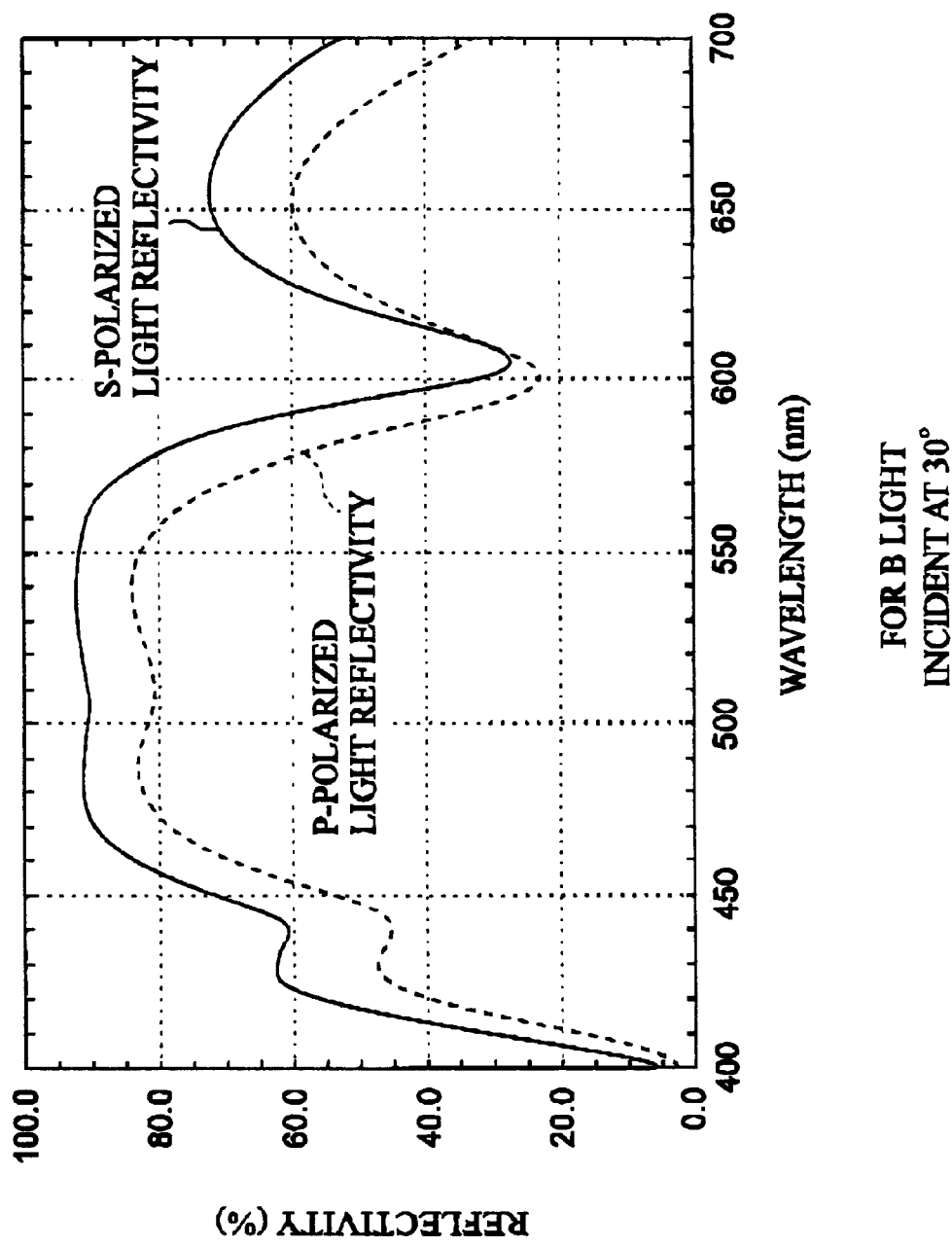
FIG. 7 is a view showing a reflection characteristic of the mirror shown in FIG. 5 at an incident angle of 30 degrees.
Figure 8:
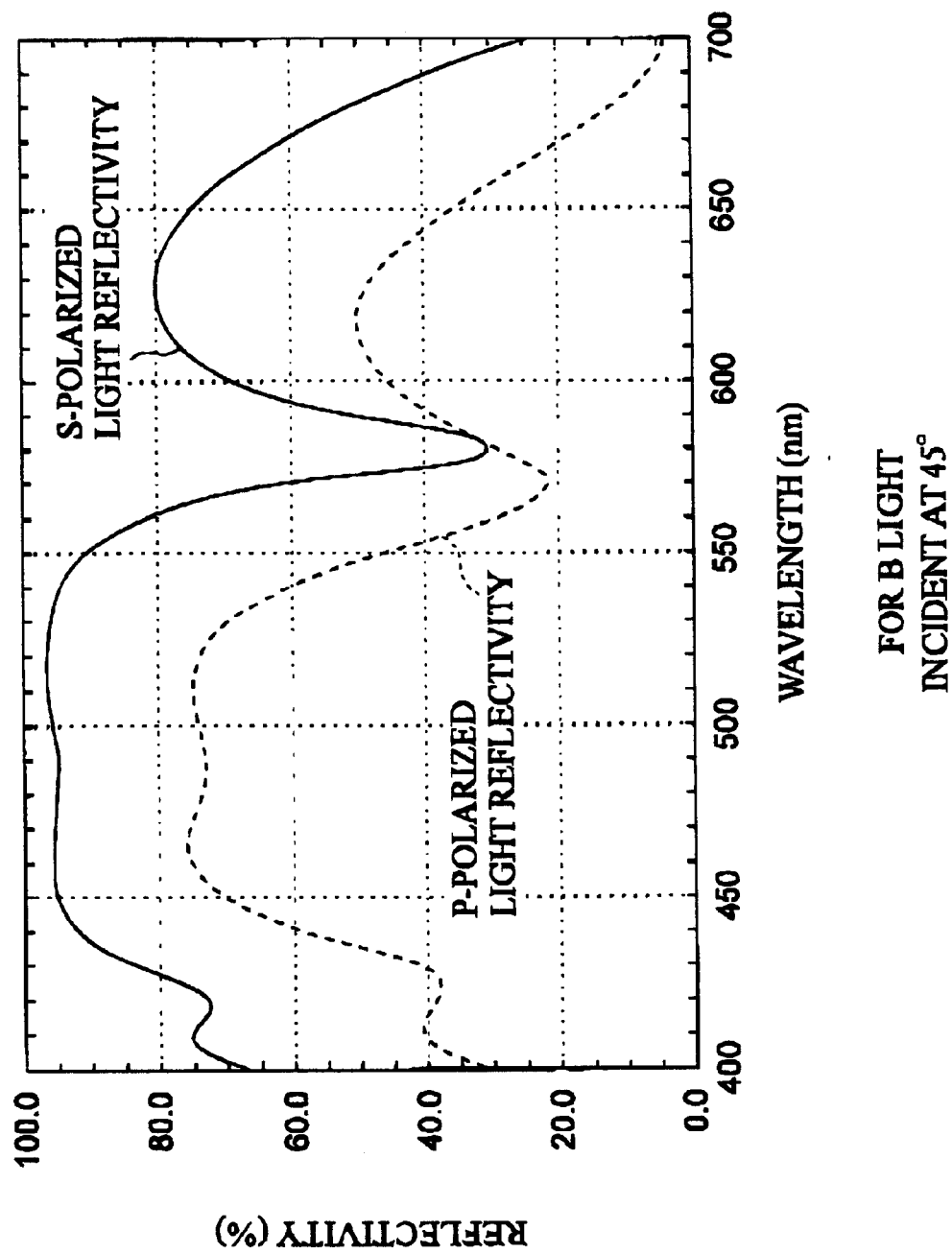
FIG. 8 is a view showing a reflection characteristic of the mirror shown in FIG. 5 at an incident angle of 45 degrees.

FIG. 5 is a view schematically showing a cross-sectional configuration of the mirror in accordance with this embodiment. FIGS. 6 to 8 are views respectively showing reflection characteristics of the mirror shown in FIG. 5.

The mirror in accordance with this embodiment is an example of mirror for B (blue) light, which is optimized for light incident thereon at an incident angle of 65 degrees. As shown in FIG. 5, it is constituted by a transparent glass substrate having a refractive index n=1.52, and a dielectric multilayer film laminated on one surface (entrance surface) of the glass substrate. As shown in FIG. 5, this dielectric multilayer is formed by 14 layers in total of films made of zirconium oxide ($ZrO_2$: refractive index n=2.05) as a high refractive index material H1 and films made of silicon dioxide ($SiO_2$: refractive index n=1.47) as a low refractive index material L1, which are alternately laminated with their respective film thickness values shown in FIG. 5. Though the materials H1 and L1 constituting the dielectric multilayer film shown in FIG. 5 are the same as those constituting the dielectric multilayer film shown in FIG. 1, they are different from each other in their thickness values and number of layers.

FIG. 6 shows a reflection characteristic of the mirror shown in FIG. 5 at an incident angle of 65 degrees. As can be seen from FIG. 6, in the mirror shown in FIG. 5, over substantially the whole B light wavelength region, the reflectivity of S-polarized light is favorable, i.e., at least 95%, whereas the reflectivity of P-polarized light is lower than that of the S-polarized light nearly by about 50%, from which it can be understood that the mirror has a polarization separating characteristic which is superior to that of the mirror optimized for 45-degree incidence in accordance with the first embodiment shown in FIG. 1. Here, as can be seen from FIG. 6, the mirror shown in FIG. 5 is also a dichroic mirror having a selectivity for reflection wavelength.

FIG. 7 shows a reflection characteristic of the mirror shown in FIG. 5 at an incident angle of 30 degrees. As can be seen from FIG. 7, the mirror shown in FIG. 5, with respect to light incident thereon at an incident angle of 30 degrees, the reflectivity of P-polarized light decreases, the reflectivity of S-polarized light increases, and the reflection wavelength range (wavelength range having a high reflectivity) of S-polarized light shifts toward the G light region. Accordingly, the mirror shown in FIG. 5 cannot further be used as a polarizing reflecting mirror for B light at an incident angle of 30 degrees.

FIG. 8 shows a reflection characteristic of the mirror shown in FIG. 5 at an incident angle of 45 degrees. As can be seen from FIG. 8, in the mirror shown in FIG. 5, with respect to light incident thereon at an incident angle of 45 degrees, the reflectivity of S-polarized light slightly decreases so as to become about 95%, whereas the reflectivity of P-polarized light increases to 70% or more. Since it has a relatively favorable polarizing characteristic even in this case, the mirror shown in FIG. 5 can also be used at an incident angle of 45 degrees. Nevertheless, since its reflection wavelength region is shifted to the G light wavelength region (500 nm to 600 nm) as shown in FIG. 8, it is more preferable for the mirror shown in FIG. 5 to be used at an incident angle of 65 degrees than at 45 degrees.

In this mirror, as with the mirror of the first embodiment, in the case where light in a predetermined wavelength band with a width of at least 50 nm (e.g., 450 to 500 nm), having S-polarized and P-polarized components, selected from a wavelength band of 400 to 500 nm (B light) is made incident thereon with an incident angle of 45 degrees, the ratio $Rs=Irs/Iis$ of intensity of S-polarized light component in reflected light (Irs) to intensity of S-polarized light component in incident light (Iis) is at least 90%, which is greater by at least 15% than the ratio $Rp=Irp/Iip$ of intensity of P-polarized light component in reflected light (Irp) to intensity of P-polarized light component in incident light (Iip). Namely, under this condition, the mirror satisfies the following relationships:

$Rs \geq 90\%$, $Rs-Rp \geq 15\%$.

More specifically, under this condition, the mirror satisfies the following relationships:

$Rs \geq 93\%$, $Rs-Rp \geq 15\%$.

Also, when light in a wavelength band of 400 to 500 nm (B light) having S-polarized and P-polarized components is made incident on this mirror, the average value (Ars) of ratio $Rs=Irs/Iis$ of intensity of S-polarized light component in reflected light (Irs) to intensity of S-polarized light component in incident light (Iis) is at least 85%, which is greater by at least 15% than the average value (Arp) of ratio $Rp=Irp/Iip$ of intensity of P-polarized light component in reflected light (Irp) to intensity of P-polarized light component in incident light (Iip). Namely, under this condition, the mirror satisfies the following relationships:

$ARs \geq 85\%$, $ARs-ARp \geq 15\%$.

Here, as can be seen from FIG. 8, the mirror shown in FIG. 5 is a dichroic mirror having a selectivity for reflection wavelength.

Namely, when light in a wavelength band of 500 to 600 nm (G light) having S-polarized and P-polarized components is made incident on this mirror, the average value (Ars) of ratio $Rs=Irs/Iis$ of intensity of S-polarized light component in reflected light (Irs) to intensity of S-polarized light component in incident light (Iis) is not higher than 84%, whereas the average value (Arp) of ratio $Rp=Irp/Iip$ of intensity of P-polarized light component in reflected light (Irp) to intensity of P-polarized light component in incident light (Iip) is not higher than 60%. Namely, under this condition, the mirror satisfies the following relationships:

$ARs \leq 84\%$, $ARp \leq 60\%$.

More specifically, under this condition, the mirror satisfies the following relationships:

$ARs \leq 80\%$, $ARp \leq 55\%$.

When light in a wavelength band of 600 to 700 nm (R light: red) having S-polarized and P-polarized components is made incident on this mirror, the average value (Ars) of ratio $Rs=Irs/Iis$ of intensity of S-polarized light component in reflected light (Irs) to intensity of S-polarized light component in incident light is not higher than 75%, whereas the average value (Arp) of ratio $Rp=Irp/Iip$ of intensity of P-polarized light component in reflected light (Irp) to intensity of P-polarized light component in incident light (Iip) is not higher than 35%. Namely, under this condition, the mirror satisfies the following relationships:

ARs≦75%,

ARp≦35%.

More specifically, under this condition, the mirror satisfies the following relationships;

ARs≦70%,

ARp≦30%.

(Mirror of Third Embodiment)

The mirror in accordance with a third embodiment of the present invention will be explained with reference to FIGS. 9 and 10.

Figure 9:
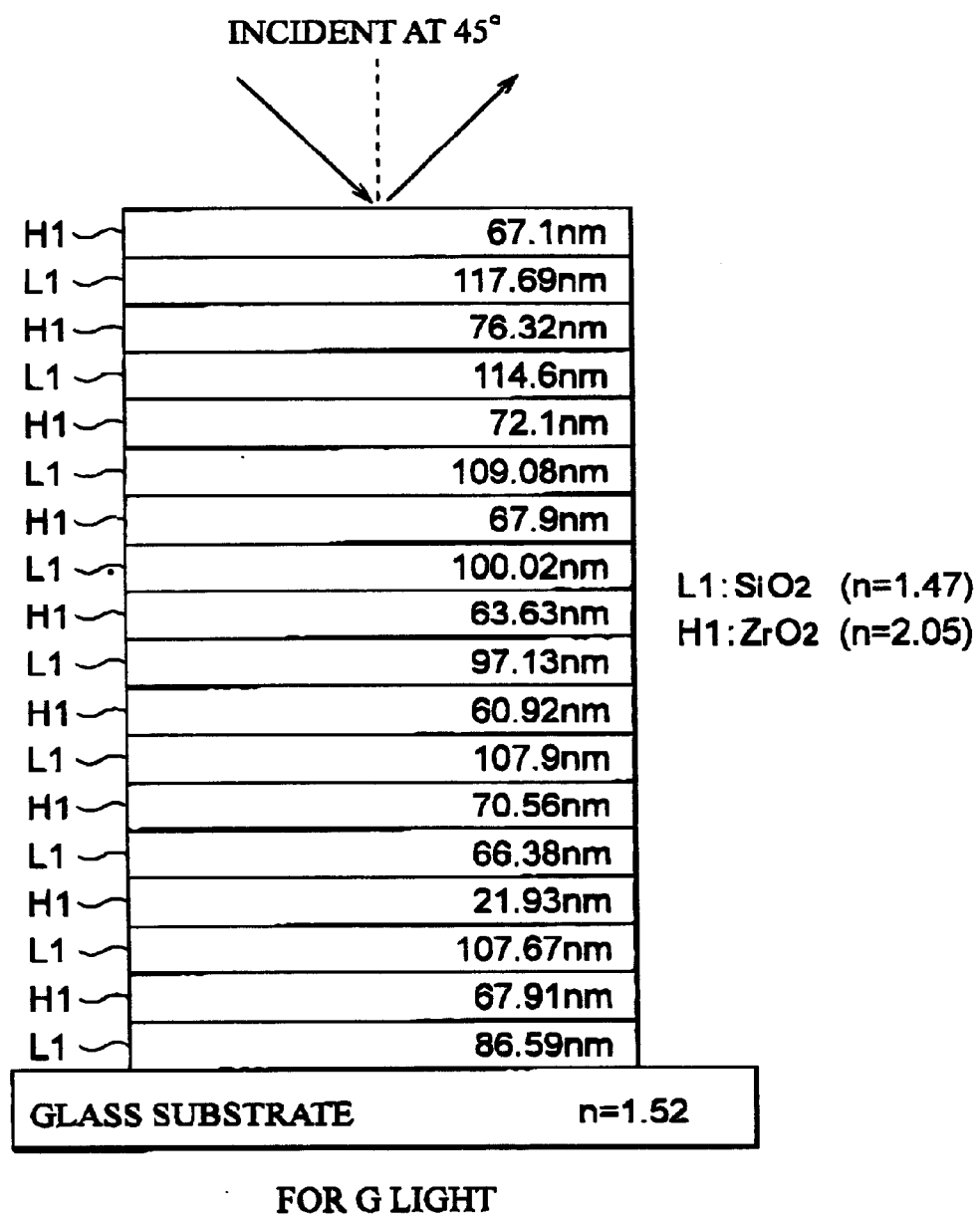
FIG. 9 is a view schematically showing a cross-sectional configuration of a mirror in accordance with its third embodiment of the present invention.

FIG. 9 is a view schematically showing a cross-sectional configuration of the mirror in accordance with this embodiment. FIG. 10 is a view showing a reflection characteristic of the mirror shown in FIG. 9.

The mirror in accordance with this embodiment is an example of mirror for G light, which is optimized for light incident thereon at an incident angle of 45 degrees. As shown in FIG. 9, it is constituted by a transparent glass substrate having a refractive index n=1.52, and a dielectric multilayer film laminated on one surface (entrance surface) of the glass substrate. As shown in FIG. 9, this dielectric multilayer is formed by 18 layers in total of films made of zirconium oxide ($ZrO_2$: refractive index n=2.05) as a high refractive index material H1 and films made of silicon dioxide ($SiO_2$: refractive index n=1.47) as a low refractive index material L1, which are alternately laminated with their respective film thickness values shown in FIG. 9.

Figure 10:
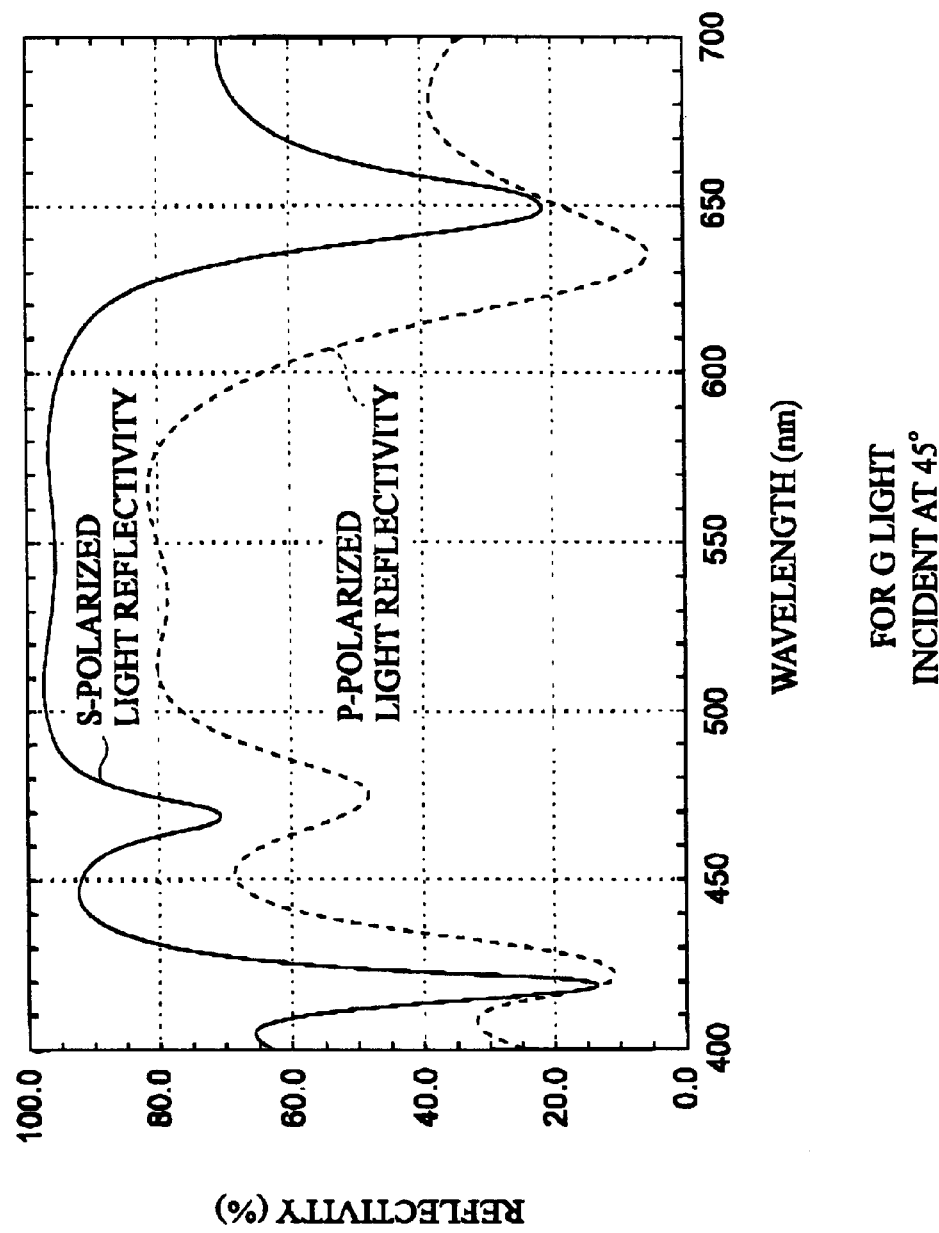
FIG. 10 is a view showing a reflection characteristic of the mirror shown in FIG. 9 at an incident angle of 45 degrees.

FIG. 10 shows a reflection characteristic of the mirror shown in FIG. 9 at an incident angle of 45 degrees. As can be seen from FIG. 10, in the mirror shown in FIG. 9, over substantially the whole G light wavelength region, the reflectivity of S-polarized light is at least 95%, whereas the reflectivity of P-polarized light is at a level lower than that of S-polarized light by about 20%, from which it can be understood that the mirror has a polarizing characteristic for causing reflected light to approach linearly polarized light in the G light wavelength region.

In this mirror, as with the mirror of the first embodiment, in the case where light in a predetermined wavelength band with a width of at least 50 nm (e.g., 500 to 550 nm), having S-polarized and P-polarized components, selected from a wavelength band of 500 to 600 nm (G light) is made incident thereon with an incident angle of 45 degrees, the ratio RS=Irs/Iis of intensity of S-polarized light component in reflected light (Irs) to intensity of S-polarized light component in incident light (Iis) is at least 90%, which is greater by at least 15% than the ratio Rp=Irp/Iip of intensity of P-polarized light component in reflected light (Irp) to intensity of P-polarized light component in incident light (Iip). Namely, under this condition, the mirror satisfies the following relationships:

Rs≧90%,

Rs−Rp≧15%.

More specifically, under this condition, the mirror satisfies the following relationships:

Rs≧95%,

Rs−Rp≧15%.

Also, when light in a wavelength band of 500 to 600 nm (G light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is at least 90%, which is greater by at least 15% than the average value (Arp) of ratio Rp=Irp/Iip of intensity of P-polarized light component in reflected light (Irp) to intensity of P-polarized light component in incident light (Iip). Namely, under this condition, the mirror satisfies the following relationships:

ARs≧90%,

ARs−ARp≧15%.

Here, as can be seen from FIG. 10, the mirror shown in FIG. 9 is a dichroic mirror having a selectivity for reflection wavelength.

Namely, when light in a wavelength band of 400 to 500 nm (B light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is not higher than 80%, whereas the average value (Arp) of ratio Rp=Irp/Iip of intensity of P-polarized light component in reflected light (Irp) to intensity of P-polarized light component in incident light (Iip) is not higher than 55%. Namely, under this condition, the mirror satisfies the following relationships:

ARs≦80%,

ARp≦55%.

More specifically, under this condition, the mirror satisfies the following relationships:

ARs≦75%,

ARp≦50%.

When light in a wavelength band of 600 to 700 nm (R light) having S-polarized and P-polarized components is made incident on this mirror, the average value (Ars) of ratio Rs=Irs/Iis of intensity of S-polarized light component in reflected light (Irs) to intensity of S-polarized light component in incident light is not higher than 65%, whereas the average value (Arp) of ratio Rp=Irp/Iip of intensity of P-polarized light component in reflected light (Irp) to intensity of P-polarized light component in incident light (Iip) is not higher than 40%. Namely, under this condition, the mirror satisfies the following relationships:

ARs≦65%,

ARp≦40%.

More specifically, under this condition, the mirror satisfies the following relationships:

ARs≦60%,

ARp≦35%.

As with the second embodiment, while using the same high refractive index material H1 and low refractive index material L1 for constituting the dielectric multilayer film as those in this embodiment, the number of layers and film thickness values thereof may be changed so as to prepare a mirror for G light optimized for light incident thereon at an incident angle of 65 degrees, thereby yielding a polarizing characteristic superior to that of the mirror in accordance with this embodiment in the G light wavelength region.

(Mirror of Fourth Embodiment)

The mirror in accordance with a fourth embodiment of the present invention will be explained with reference to FIGS. 11 and 12.

Figure 11:
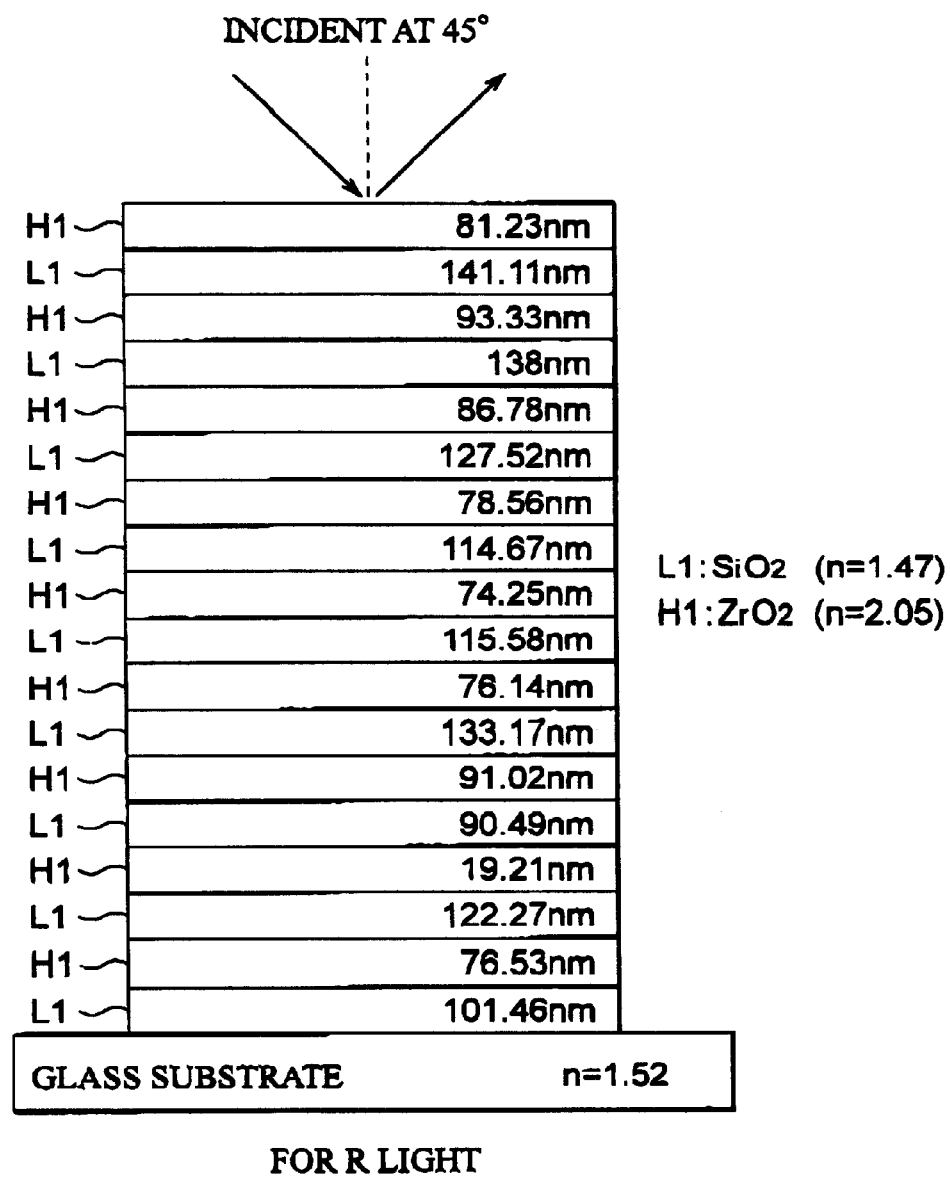
FIG. 11 is a view schematically showing a cross-sectional configuration of a mirror in accordance with its fourth embodiment of the present invention.

FIG. 11 is a view schematically showing a cross-sectional configuration of the mirror in accordance with this embodiment. FIG. 12 is a view showing a reflection characteristic of the mirror shown in FIG. 11.

The mirror in accordance with this embodiment is an example of mirror for R light, which is optimized for light incident thereon at an incident angle of 45 degrees. As shown in FIG. 11, it is constituted by a transparent glass substrate having a refractive index n=1.52, and a dielectric multilayer film laminated on one surface (entrance surface) of the glass substrate. As shown in FIG. 11, this dielectric multilayer is formed by 18 layers in total of films made of zirconium oxide ($ZrO_2$: refractive index n=2.05) as a high refractive index material H1 and films made of silicon dioxide ($SiO_2$: refractive index n=1.47) as a low refractive index material L1, which are alternately laminated with their respective film thickness values shown in FIG. 11.

Figure 12:
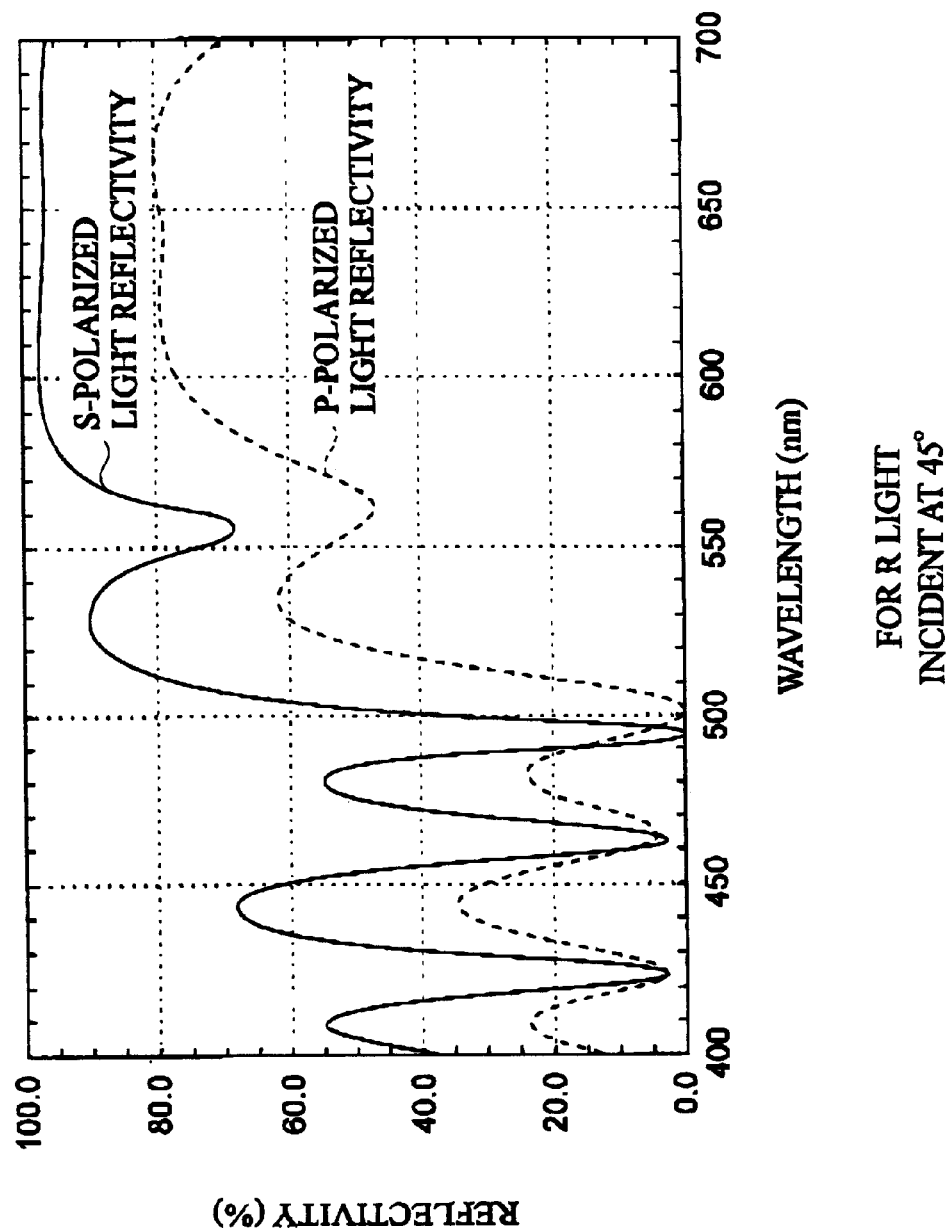
FIG. 12 is a view showing a reflection characteristic of the mirror shown in FIG. 11 at an incident angle of 45 degrees.

FIG. 12 shows a reflection characteristic of the mirror shown in FIG. 11 at an incident angle of 45 degrees. As can be seen from FIG. 12, in the mirror shown in FIG. 11, over substantially the whole R light wavelength region (600 nm to 700 nm), the reflectivity of S-polarized light is at least 95%, whereas the reflectivity of P-polarized light is at a level lower than that of S-polarized light by about 20%, from which it can be understood that the mirror has a polarizing characteristic for causing reflected light to approach linearly polarized light in the R light wavelength region.

In this mirror, as with the mirror of the first embodiment, in the case where light in a predetermined wavelength band with a width of at least 50 nm (e.g., 600 to 650 nm), having S-polarized and P-polarized components, selected from a wavelength band of 600 to 700 nm (R light) is made incident thereon with an incident angle of 45 degrees, the ratio Rs=Irs/Iis of intensity of S-polarized light component in reflected light (Irs) to intensity of S-polarized light component in incident light (Iis) is at least 90%, which is greater by at least 15% than the ratio Rp=Irp/Iip of intensity of P-polarized light component in reflected light (Irp) to intensity of P-polarized light component in incident light (Iip). Namely, under this condition, the mirror satisfies the following relationships:

Rs≧90%,

Rs−Rp≧15%.

More specifically, under this condition, the mirror satisfies the following relationships:

Rs≧95%,

Rs−Rp≧15%.

Also, when light in a wavelength band of 600 to 700 nm (R light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is at least 90%, which is greater by at least 15% than the average value (Arp) of ratio Rp=Irp/Iip of intensity of P-polarized light component in reflected light (Irp) to intensity of P-polarized light component in incident light (Iip). Namely, under this condition, the mirror satisfies the following relationships:

ARs≧90%,

ARs−ARp≧15%.

Here, as can be seen from FIG. 12, the mirror shown in FIG. 11 is a dichroic mirror having a selectivity for reflection wavelength.

Namely, when light in a wavelength band of 400 to 500 nm (B light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is not higher than 45%, whereas the average value (Arp) of ratio Rp=Irp/Iip of intensity of P-polarized light component in reflected light (Irp) to intensity of P-polarized light component in incident light (Iip) is not higher than 25%. Namely, under this condition, the mirror satisfies the following relationships:

ARs≦45%,

ARp≦25%.

More specifically, under this condition, the mirror satisfies the following relationships:

ARs≦40%,

ARp≦20%.

When light in a wavelength band of 500 to 600 nm (G light) having S-polarized and P-polarized components is made incident on this mirror, the average value (Ars) of ratio RS=Irs/Iis of intensity of S-polarized light component in reflected light (Irs) to intensity of S-polarized light component in incident light is not higher than 65%, whereas the average value (Arp) of ratio Rp=Irp/Iip of intensity of P-polarized light component in reflected light (Irp) to intensity of P-polarized light component in incident light (Iip) is not higher than 60%. Namely, under this condition, the mirror satisfies the following relationships:

ARs≦65%,

ARp≦60%.

More specifically, under this condition, the mirror satisfies the following relationships:

ARs≦60%,

ARp≦55%.

As with the second embodiment, while using the same high refractive index material H1 and low refractive index material L1 for constituting the dielectric multilayer film as those in this embodiment, the number of layers and film thickness values thereof may be changed so as to prepare a mirror for R light optimized for light incident thereon at an incident angle of 65 degrees, thereby yielding a polarizing characteristic superior to that of the mirror in accordance with this embodiment in the R light wavelength region.

(Mirror of Fifth Embodiment)

The mirror in accordance with a fifth embodiment of the present invention will be explained with reference to FIGS. 13 and 14.

Figure 13:
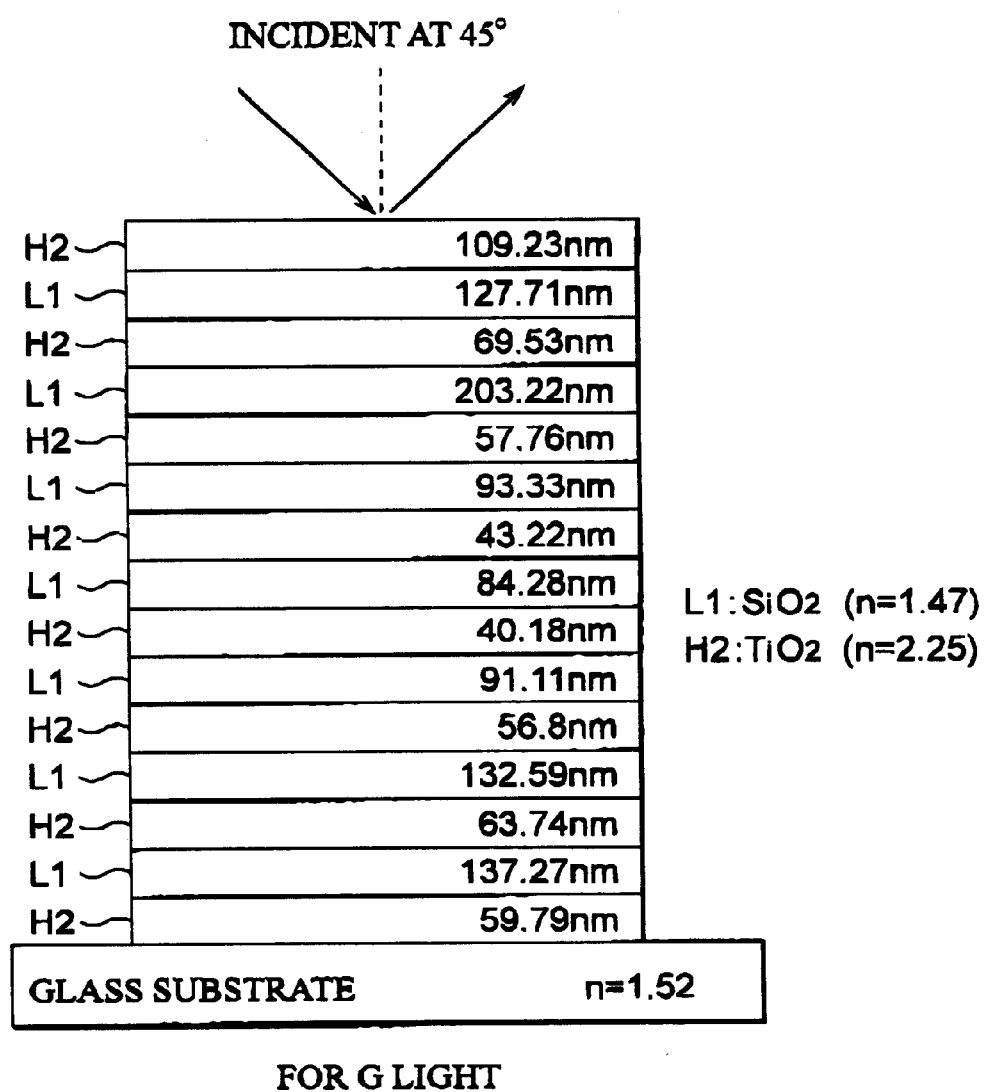
FIG. 13 is a view schematically showing a cross-sectional configuration of a mirror in accordance with its fifth embodiment of the present invention.

FIG. 13 is a view schematically showing a cross-sectional configuration of the mirror in accordance with this embodiment. FIG. 14 is a view showing a reflection characteristic of the mirror shown in FIG. 13.

The mirror in accordance with this embodiment is an example of mirror for G light, which is optimized for light incident thereon at an incident angle of 45 degrees. As shown in FIG. 13, it is constituted by a transparent glass substrate having a refractive index n=1.52, and a dielectric multilayer film laminated on one surface (entrance surface) of the glass substrate. As shown in FIG. 13, this dielectric multilayer is formed by 15 layers in total of films made of titanium oxide ($TiO_2$: refractive index n=2.25) as a high refractive index material H2 and films made of silicon dioxide ($SiO_2$: refractive index n=1.47) as a low refractive index material L1, which are alternately laminated with their respective film thickness values shown in FIG. 13. The dielectric multilayer film in FIG. 13 differs from the dielectric multilayer films respectively shown in FIGS. 1, 5, 9, and 11 in that titanium dioxide is used in place of zirconium oxide as the high refractive index material.

Figure 14:
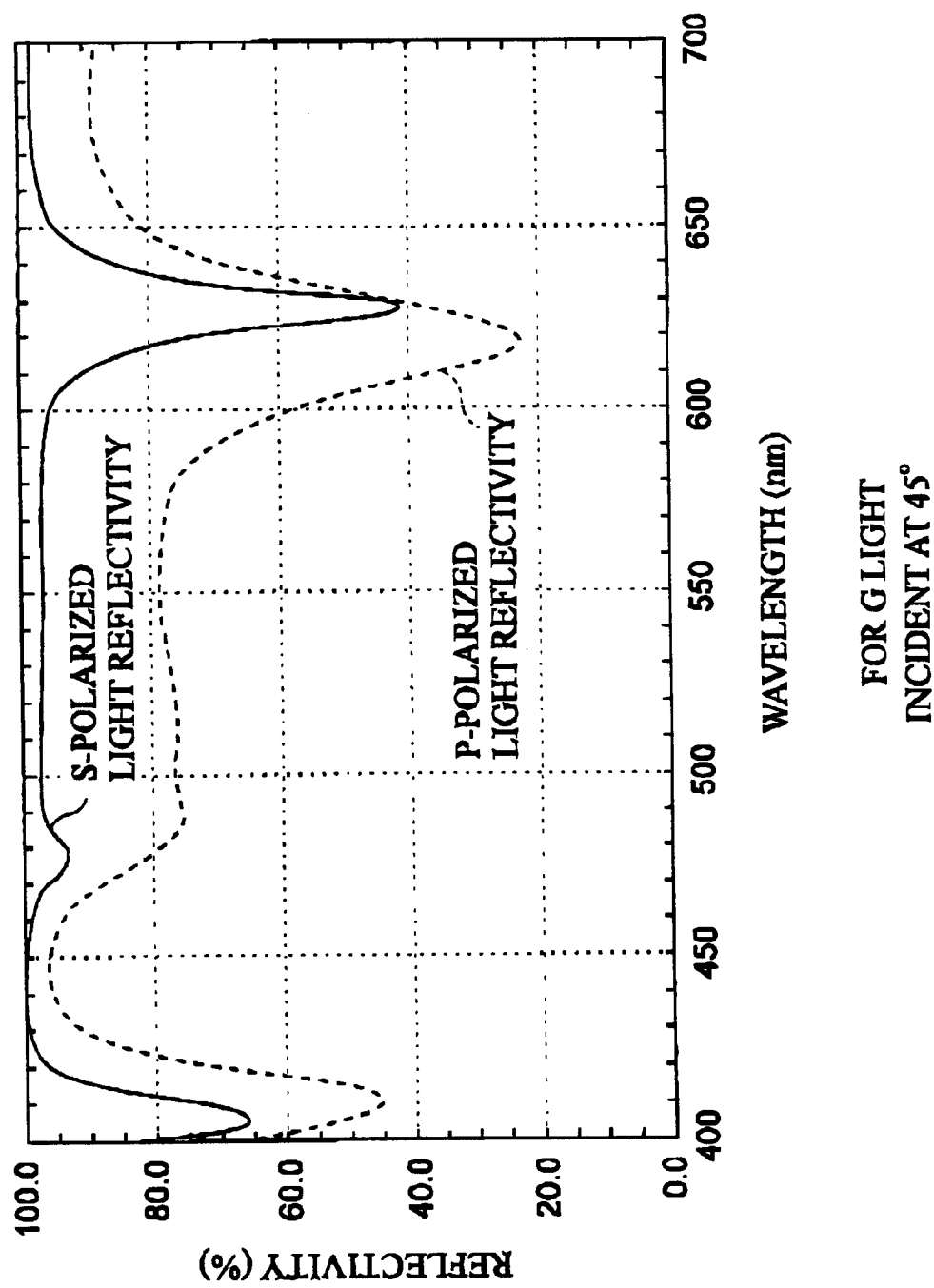
FIG. 14 is a view showing a reflection characteristic of the mirror shown in FIG. 13 at an incident angle of 45 degrees.

FIG. 14 shows a reflection characteristic of the mirror shown in FIG. 13 at an incident angle of 45 degrees. As can be seen from FIG. 14, in the mirror shown in FIG. 13, over substantially the whole G light wavelength region, the reflectivity of S-polarized light is at least 95%, whereas the reflectivity of P-polarized light is at a level lower than that of the S-polarized light by about 20%, from which it can be understood that the mirror has a polarizing characteristic for causing reflected light to approach linearly polarized light in the G light wavelength region.

In this mirror, as with the mirror of the first embodiment, in the case where light in a predetermined wavelength band with a width of at least 50 nm (e.g., 500 to 550 nm), having S-polarized and P-polarized components, selected from a wavelength band of 500 to 600 nm (G light) is made incident thereon with an incident angle of 45 degrees, the ratio Rs=Irs/Iis of intensity of S-polarized light component in reflected light (Irs) to intensity of S-polarized light component in incident light (Iis) is at least 90%, which is greater by at least 15% than the ratio Rp=Irp/Iip of intensity of P-polarized light component in reflected light (Irp) to intensity of P-polarized light component in incident light (Iip). Namely, under this condition, the mirror satisfies the following relationships:

Rs≧90%,

Rs−Rp≧15%.

More specifically, under this condition, the mirror satisfies the following relationships:

Rs≧95%,

Rs−Rp≧15%.

Also, when light in a wavelength band of 500 to 600 nm (G light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is at least 90%, which is greater by at least 15% than the average value (Arp) of ratio Rp=Irp/Iip of intensity of P-polarized light component in reflected light (Irp) to intensity of P-polarized light component in incident light (Iip). Namely, under this condition, the mirror satisfies the following relationships:

ARs≧90%,

ARs−ARp≧15%.

Here, as can be seen from FIG. 14, though the mirror shown in FIG. 13 has a high reflection area with respect to the S-polarized light in the B light wavelength region as well, it has a high reflectivity with respect to the P-polarized light in this area, whereby it can be considered to be incapable of effecting polarization separation. In order to effect polarization separation in the mirror in accordance with this embodiment, light in the G light wavelength region is made incident thereon.

As with the second embodiment, while using the same high refractive index material H2 and low refractive index material L1 for constituting the dielectric multilayer film as those in this embodiment, the number of layers and film thickness values thereof may be changed so as to prepare a mirror for G light optimized for light incident thereon at an incident angle of 65 degrees, thereby yielding a polarizing characteristic superior to that of the mirror in accordance with this embodiment in the G light wavelength region.

(Mirror of Sixth Embodiment)

The mirror in accordance with a sixth embodiment of the present invention will be explained with reference to FIGS. 15 and 16.

Figure 15:
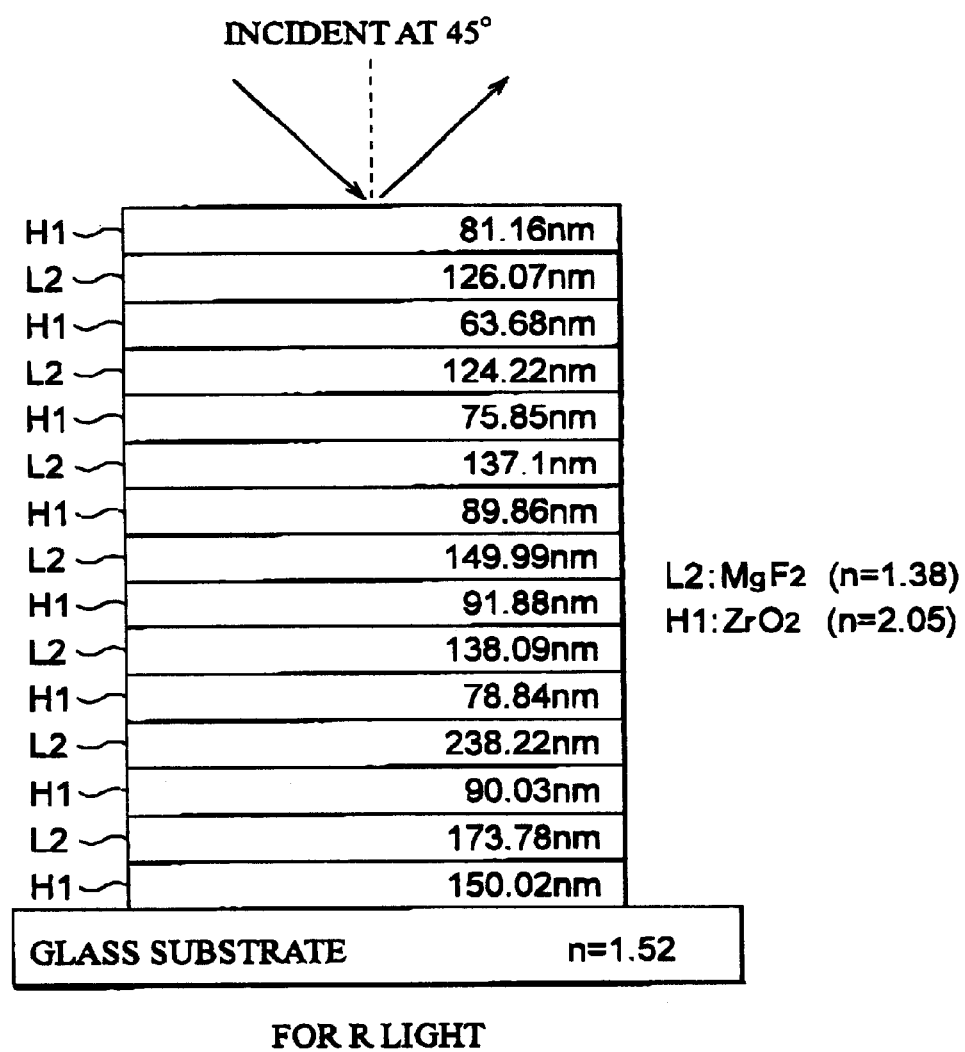
FIG. 15 is a view schematically showing a cross-sectional configuration of a mirror in accordance with its sixth embodiment of the present invention.

FIG. 15 is a view schematically showing a cross-sectional configuration of the mirror in accordance with this embodiment. FIG. 16 is a view showing a reflection characteristic of the mirror shown in FIG. 15.

The mirror in accordance with this embodiment is an example of mirror for R light, which is optimized for light incident thereon at an incident angle of 45 degrees. As shown in FIG. 15, it is constituted by a transparent glass substrate having a refractive index n=1.52, and a dielectric multilayer film laminated on one surface (entrance surface) of the glass substrate. As shown in FIG. 15, this dielectric multilayer is formed by 15 layers in total of films made of zirconium oxide ($ZrO_2$: refractive index n=2.05) as a high refractive index material H1 and films made of magnesium fluoride ($MgF_2$: refractive index n=1.38) as a low refractive index material L2, which are alternately laminated with their respective film thickness values shown in FIG. 15. The dielectric multilayer film in FIG. 15 differs from the dielectric multilayer films respectively shown in FIGS. 1, 5, 9, and 11 in that magnesium fluoride is used in place of silicon dioxide as the low refractive index material.

Figure 16:
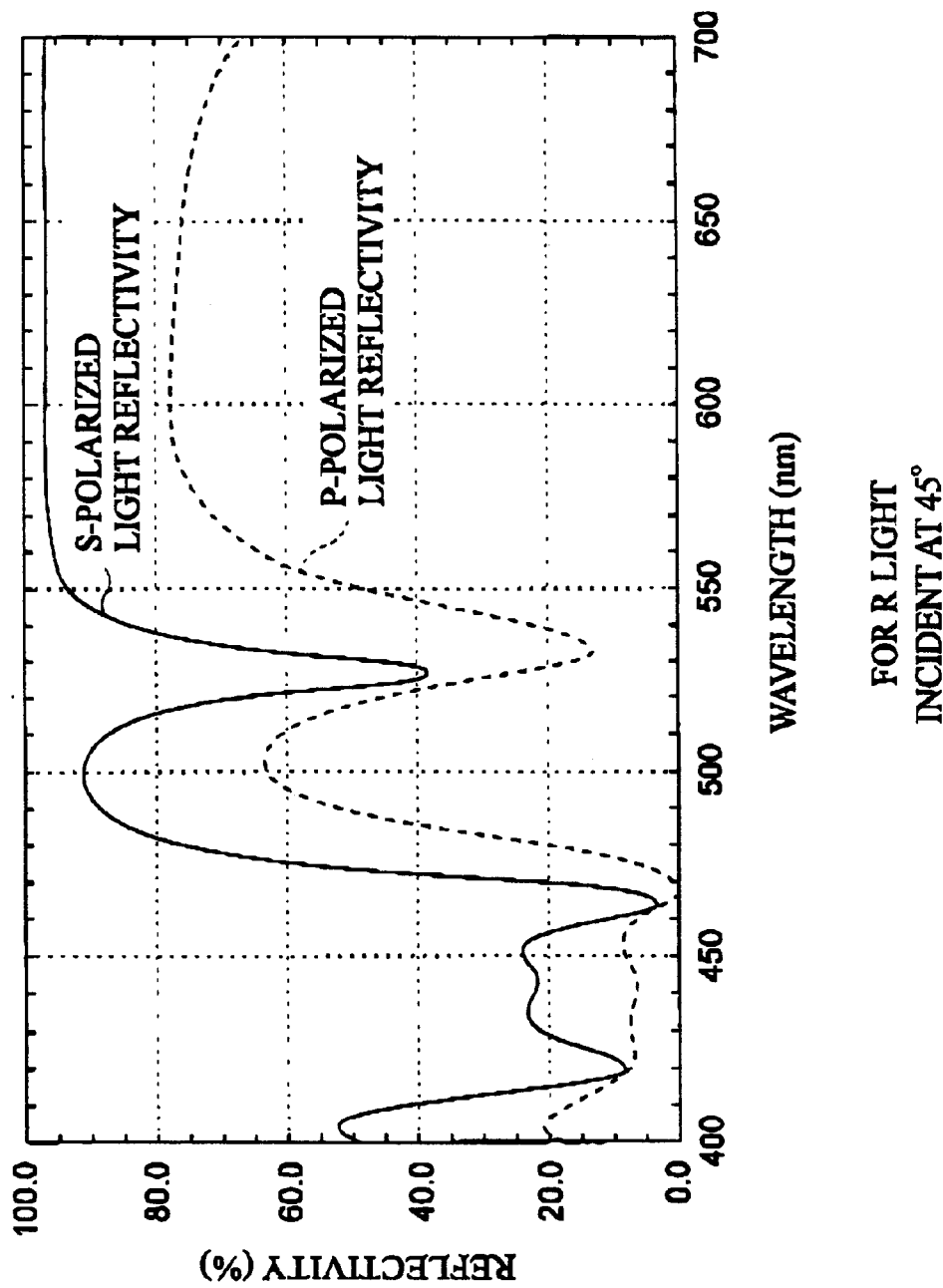
FIG. 16 is a view showing a reflection characteristic of the mirror shown in FIG. 15 at an incident angle of 45 degrees.

FIG. 16 shows a reflection characteristic of the mirror shown in FIG. 15 at an incident angle of 45 degrees. As can be seen from FIG. 16, in the mirror shown in FIG. 15, over substantially the whole R light wavelength region, the reflectivity of S-polarized light is at least 95%, whereas the reflectivity of P-polarized light is at a level lower than that of the S-polarized light by about 20%, from which it can be understood that the mirror has a polarizing characteristic for causing reflected light to approach linearly polarized light in the R light wavelength region.

In this mirror, as with the mirror of the first embodiment, in the case where light in a predetermined wavelength band with a width of at least 50 nm (e.g., 600 to 650 nm), having S-polarized and P-polarized components, selected from a wavelength band of 600 to 700 nm (R light) is made incident thereon with an incident angle of 45 degrees, the ratio Rs=Irs/Iis of intensity of S-polarized light component in reflected light (Irs) to intensity of S-polarized light component in incident light (Iis) is at least 90%, which is greater by at least 15% than the ratio Rp=Irp/Iip of intensity of P-polarized light component in reflected light (Irp) to intensity of P-polarized light component in incident light (Iip). Namely, under this condition, the mirror satisfies the following relationships:

Rs≧90%,

Rs−Rp≧15%.

More specifically, under this condition, the mirror satisfies the following relationships:

Rs≧95%,

Rs−Rp≧15%.

Also, when light in a wavelength band of 600 to 700 nm (R light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is at least 90%, which is greater by at least 15% than the average value (Arp) of ratio Rp=Irp/Iip of intensity of P-polarized light component in reflected light (Irp) to intensity of P-polarized light component in incident light (Iip). Namely, under this condition, the mirror satisfies the following relationships:

ARs≧95%,

ARs−ARp≧15%.

Here, as can be seen from FIG. 16, the mirror shown in FIG. 15 is a dichroic mirror having a selectivity for reflection wavelength.

Namely, when light in a wavelength band of 400 to 500 nm (B light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is not higher than 50%, whereas the average value (Arp) of ratio Rp=Irp/Iip of intensity of P-polarized light component in reflected light (Irp) to intensity of P-polarized light component in incident light (Iip) is not higher than 25%. Namely, under this condition, the mirror satisfies the following relationships:

ARs≦50%,
ARp≦25%.

More specifically, under this condition, the mirror satisfies the following relationships:

ARs≦45%,
ARp≦20%.

When light in a wavelength band of 500 to 600 nm (G light) having S-polarized and P-polarized components is made incident on this mirror, the average value (Ars) of ratio Rs=Irs/Iis of intensity of S-polarized light component in reflected light (Irs) to intensity of S-polarized light component in incident light is not higher than 85%, whereas the average value (Arp) of ratio Rp=Irp/Iip of intensity of P-polarized light component in reflected light (Irp) to intensity of P-polarized light component in incident light (Iip) is not higher than 60%. Namely, under this condition, the mirror satisfies the following relationships:

ARs≦85%,
ARp≦60%.

More specifically, under this condition, the mirror satisfies the following relationships:

ARs≦80%,
ARp≦55%.

As with the second embodiment, while using the same high refractive index material H1 and low refractive index material L2 for constituting the dielectric multilayer film as those in this embodiment, the number of layers and film thickness values thereof may be changed so as to prepare a mirror for R light optimized for light incident thereon at an incident angle of 65 degrees, thereby yielding a polarizing characteristic superior to that of the mirror in accordance with this embodiment in the R light wavelength region.

(Mirror of Seventh Embodiment)

The mirror in accordance with a seventh embodiment of the present invention will be explained with reference to FIGS. 17 and 18.

Figure 17:
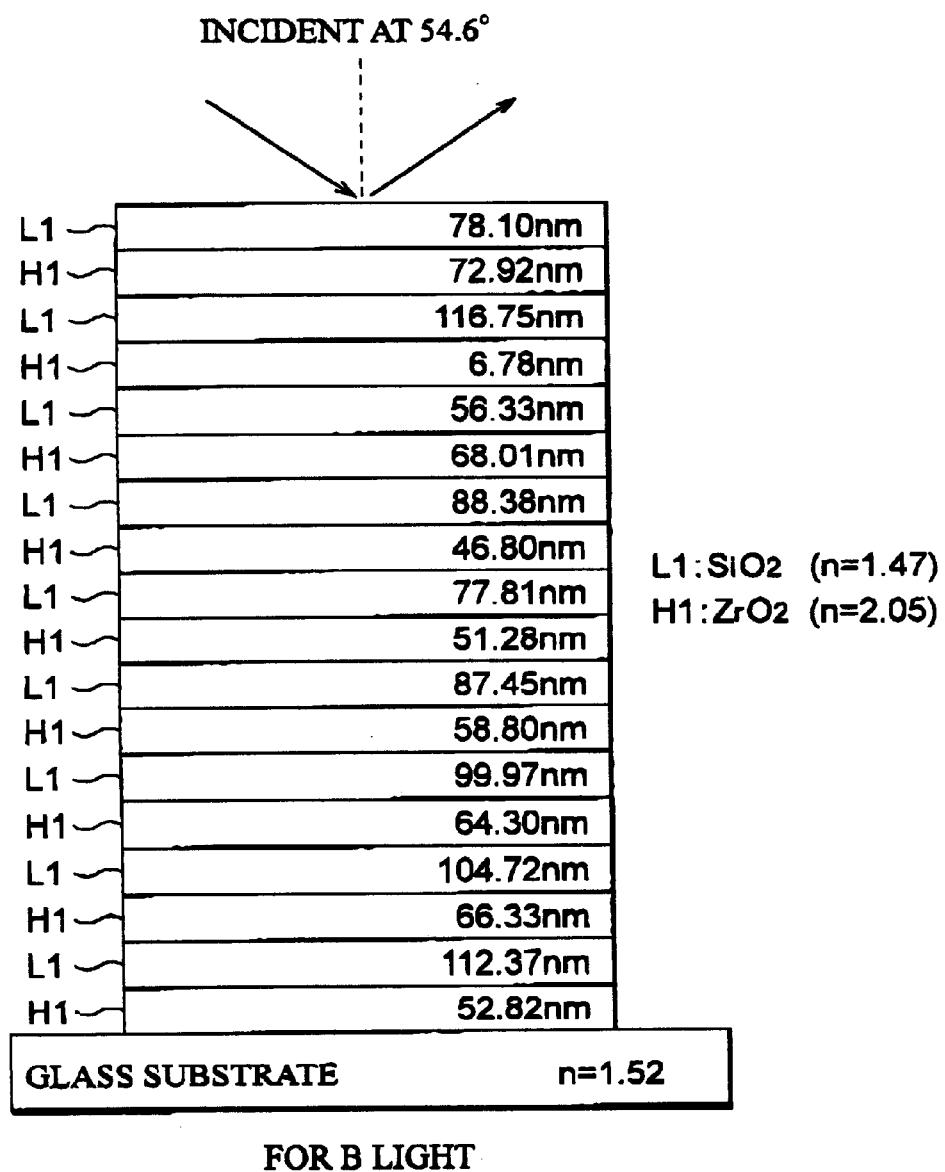
FIG. 17 is a view schematically showing a cross-sectional configuration of a mirror in accordance with its seventh embodiment of the present invention.

FIG. 17 is a view schematically showing a cross-sectional configuration of the mirror in accordance with this embodiment. FIG. 18 is a view showing a reflection characteristic of the mirror shown in FIG. 17.

The mirror in accordance with this embodiment is an example of mirror for B light, which is optimized for light incident thereon at an incident angle of 54.6 degrees. As shown in FIG. 17, it is constituted by a transparent glass substrate having a refractive index n=1.52, and a dielectric multilayer film laminated on one surface (entrance surface) of the glass substrate. As shown in FIG. 17, this dielectric multilayer is formed by 18 layers in total of films made of zirconium oxide ($ZrO_2$: refractive index n=2.05) as a high refractive index material H1 and films made of silicon dioxide ($SiO_2$: refractive index n=1.47) as a low refractive index material L1, which are alternately laminated with their respective film thickness values shown in FIG. 17.

Figure 18:
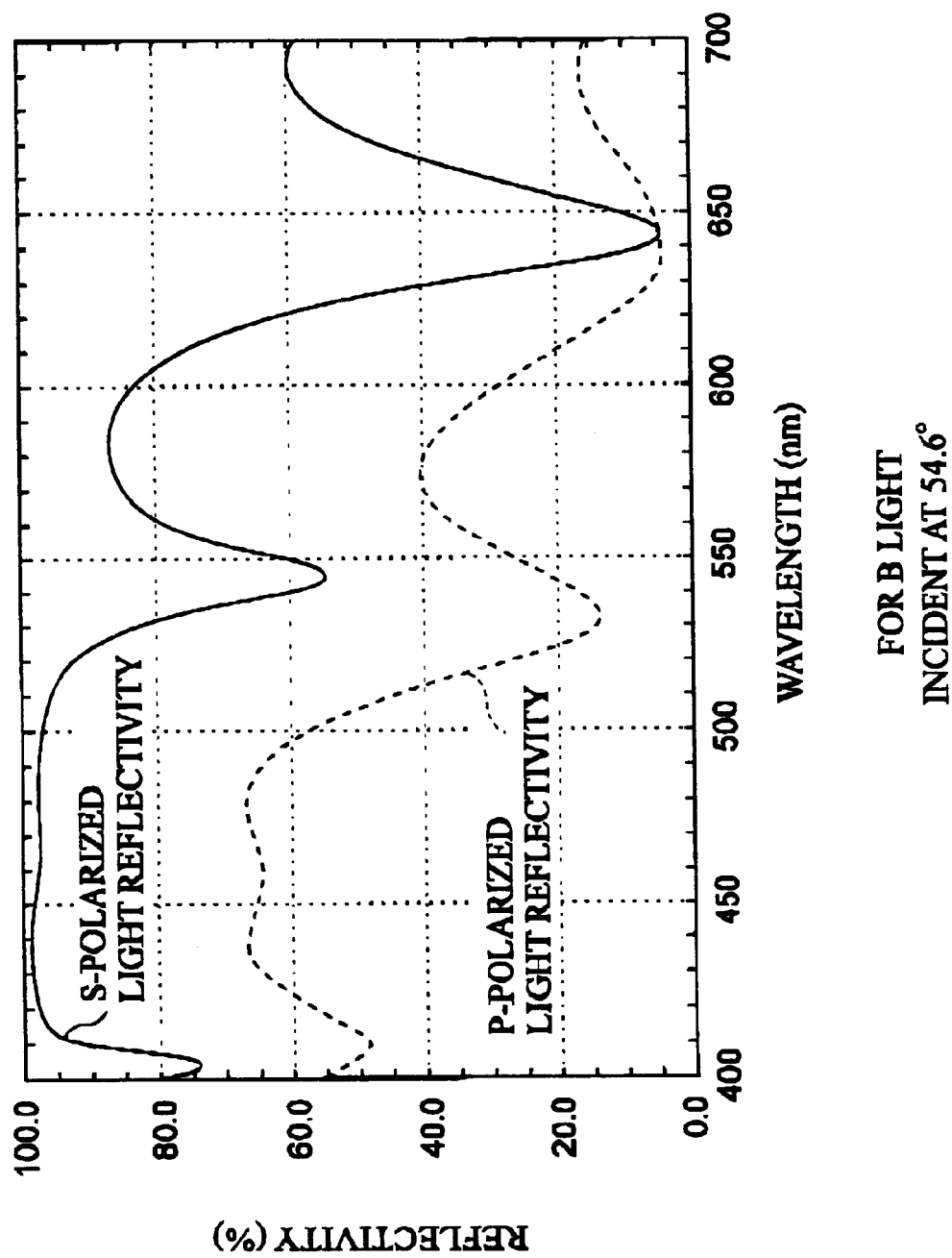
FIG. 18 is view showing a reflection characteristic of the mirror shown in FIG. 17 at an incident angle of 54.6 degrees.

FIG. 18 shows a reflection characteristic of the mirror shown in FIG. 17 at an incident angle of 54.6 degrees. As can be seen from FIG. 18, in the mirror shown in FIG. 17, over substantially the whole B light wavelength region, the reflectivity of S-polarized light is at least 95%, whereas the reflectivity of P-polarized light is at a level lower than that of the S-polarized light by about 30%, from which it can be understood that the mirror has a polarizing characteristic for causing reflected light to approach linearly polarized light in the B light wavelength region.

Namely, in this mirror, in the case where light in a predetermined wavelength band with a width of at least 50 nm (e.g., 450 to 500 nm), having S-polarized and P-polarized components, selected from a wavelength band of 400 to 500 nm (B light) is made incident thereon with an incident angle of 54.6 degrees, the ratio Rs=Irs/Iis of intensity of S-polarized light component in reflected light (Irs) to intensity of S-polarized light component in incident light (Iis) is at least 90%, which is greater by at least 15% than the ratio Rp=Irp/Iip of intensity of P-polarized light component in reflected light (Irp) to intensity of P-polarized light component in incident light (Iip). Namely, under this condition, the mirror satisfies the following relationships:

Rs≧90%,
Rs−Rp≧15%.

More specifically, under this condition, the mirror satisfies the following relationships;

Rs≧95%,
Rs−Rp≧20%.

Also, when light in a wavelength band of 400 to 500 nm (B light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is at least 85%, which is greater by at least 15% than the average value (Arp) of ratio Rp=Irp/Iip of intensity of P-polarized light component in reflected light (Irp) to intensity of P-polarized light component in incident light (Iip). Namely, under this condition, the mirror satisfies the following relationships:

ARs≧90%,
ARs−ARp≧20%.

Here, as can be seen from FIG. 18, the mirror shown in FIG. 17 is a dichroic mirror having a selectivity for reflection wavelength.

Namely, when light in a wavelength band of 500 to 600 nm (G light) having S-polarized and P-polarized components is made incident on this mirror, the average value (Ars) of ratio Rs=Irs/Iis of intensity of S-polarized light component in reflected light (Irs) to intensity of S-polarized light component in incident light (Iis) is not higher than 85%, whereas the average value (Arp) of ratio Rp=Irp/Iip of intensity of P-polarized light component in reflected light (Irp) to intensity of P-polarized light component in incident light (Iip) is not higher than 40%. Namely, under this condition, the mirror satisfies the following relationships:

ARs≦85%,
ARp≦40%.

More specifically, under this condition, the mirror satisfies the following relationships;

ARs≦80%,
ARp≦35%.

When light in a wavelength band of 600 to 700 nm (R light) having S-polarized and P-polarized components is made incident on this mirror, the average value (Ars) of ratio Rs=Irs/Iis of intensity of S-polarized light component in reflected light (Irs) to intensity of S-polarized light component in incident light is not higher than 45%, whereas the average value (Arp) of ratio Rp=Irp/Iip of intensity of P-polarized light component in reflected light (Irp) to intensity of P-polarized light component in incident light (Iip) is not higher than 20%. Namely, under this condition, the mirror satisfies the following relationships:

ARs≦45%,
ARp≦20%.

More specifically, under this condition, the mirror satisfies the following relationships:

ARs≦40%,
ARp≦15%.

Here, while using the same high refractive index material H1 and low refractive index material L1 for constituting the dielectric multilayer film as those in this embodiment, the number of layers and film thickness values thereof may be changed so as to prepare a mirror for R light and a mirror for G light which are optimized for light incident thereon at an incident angle of 54.6 degrees.

Figure 19:
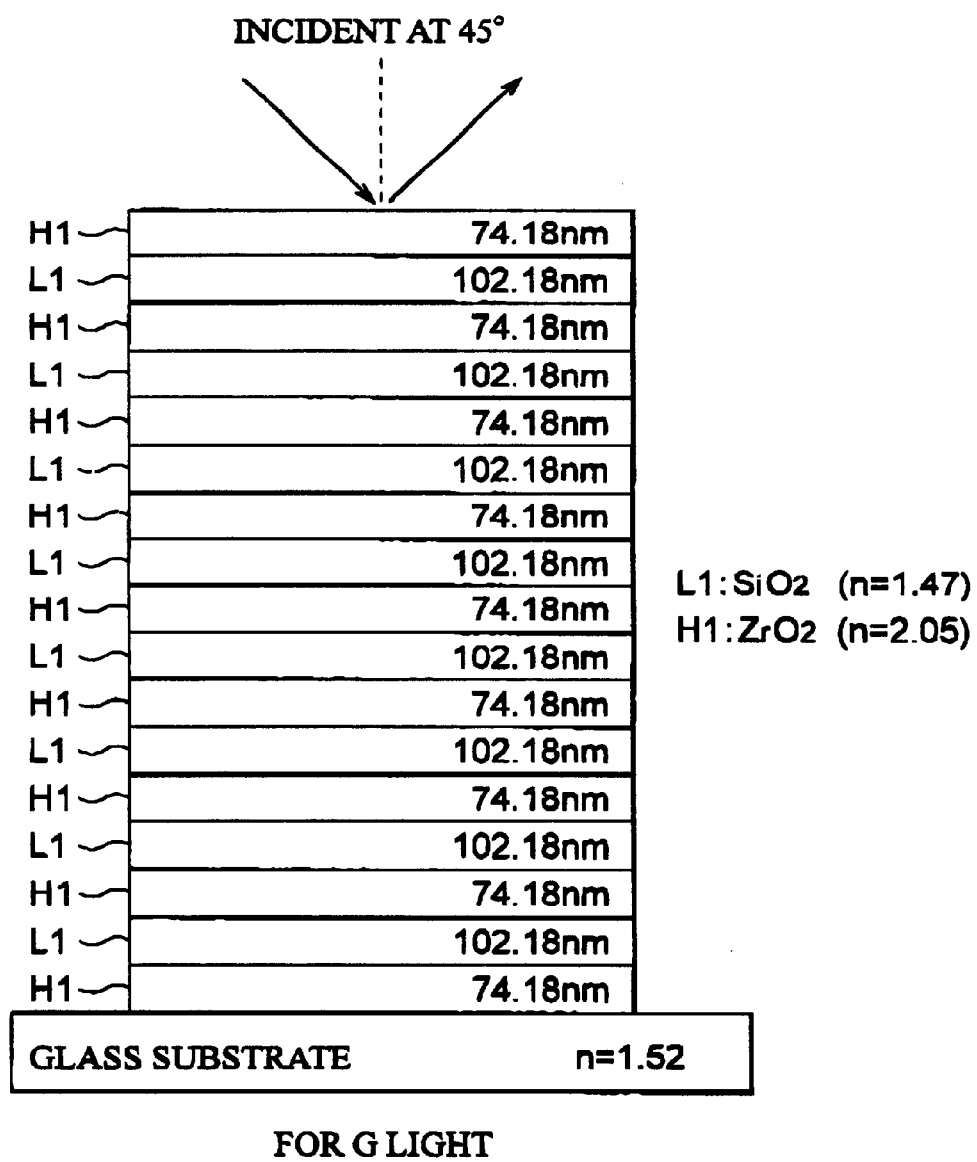
FIG. 19 is a view schematically showing a cross-sectional configuration of a comparative mirror.
Figure 20:
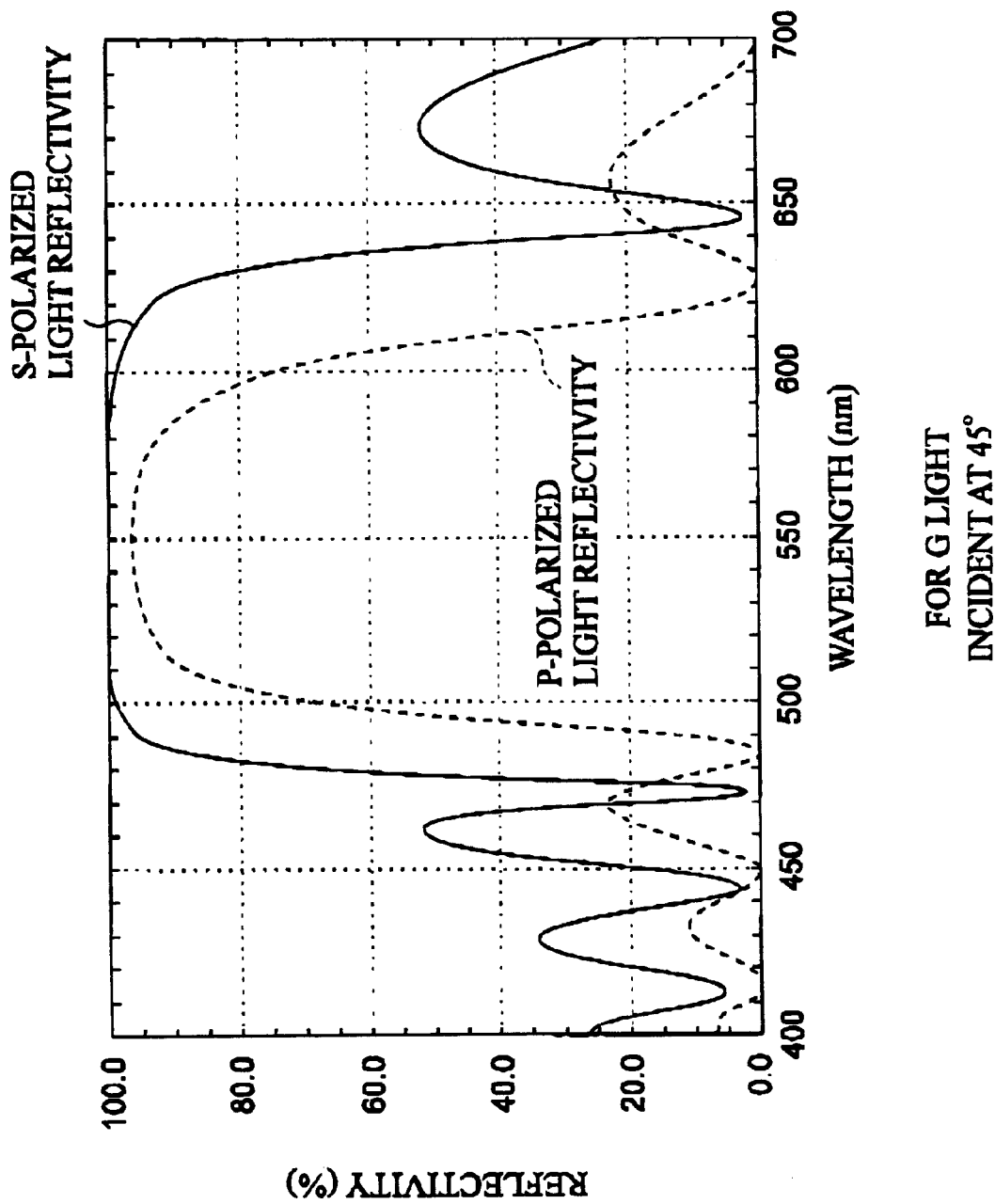
FIG. 20 is a view showing a reflection characteristic of the mirror shown in FIG. 19 at an incident angle of 45 degrees.

FIG. 19 shows a dichroic mirror to be compared with the mirrors in accordance with the foregoing embodiments. The dichroic mirror shown in FIG. 19 is an example of dichroic mirror for reflecting G light, which is optimized for light incident thereon at 45 degrees. It is constituted by a transparent glass substrate having a refractive index n=1.52, and a dielectric multilayer film laminated on one surface (entrance surface) of the glass substrate. As shown in FIG. 19, this dielectric multilayer is formed by 17 layers in total of films made of zirconium oxide ($ZrO_2$: refractive index n=2.05) as a high refractive index material H1 and films made of silicon dioxide ($SiO_2$: refractive index n=1.47) as a low refractive index material L1, which are alternately laminated each with a film thickness of $\lambda/4$. Here, the dichroic mirror shown in FIG. 19 is optimized for light incident at an incident angle of 45 degrees. FIG. 20 shows a reflection characteristic of the dichroic mirror shown in FIG. 19 at an incident angle of 45 degrees. In FIG. 20, solid line indicates reflectivity of S-polarized light, whereas dotted line indicates reflectivity of P-polarized light. As can be seen from FIG. 20, in this dichroic mirror, the S-polarized light has a reflection characteristic with a broader width in terms of wavelength region, and the P-polarized light still has a considerable reflection characteristic though its reflectivity is lower than that of the S-polarized light by about 5%, from which it can be seen that the dichroic mirror does not substantially have a polarizing characteristic.

By contrast, as with the above-mentioned first to seventh embodiments, when a dielectric film constituted by alternately laminated high refractive index material and low refractive index material is formed on a glass substrate, a mirror having a polarization separating characteristic with respect to reflected light (i.e., mirror having a polarizing characteristic for causing reflected light to approach linearly polarized light) can be made. When light in a predetermined wavelength region is made incident on this mirror at a predetermined incident angle, light separated in terms of polarization can be taken out as the reflected light.

As explained in the foregoing, the above-mentioned mirror has a polarizing characteristic (polarization separating characteristic) This mirror may be a dichroic mirror having a selectivity for reflection wavelength.

Since the mirror of this first aspect has a polarizing characteristic for causing reflected light to approach linearly polarized light, it achieves a reflecting function and a polarizing function at the same time. Accordingly, for example, in a projection type display apparatus, the mirror in accordance with the first aspect can be used as a bending mirror, disposed in an optical path through which light is made incident on a light valve, for bending this optical path, thereby enhancing the purity in polarization of the light incident on the light valve and improving the contrast of its projection image. Unlike a polarizing beam splitter or bellows-shaped polarization separating device as a preparatory polarization separating device in the above-mentioned conventional projection type display apparatus, the mirror in accordance with the first aspect of the present invention can be constituted by a glass substrate and a dielectric multilayer film, for example, whereby its cost can be cut down. Also, as mentioned above, since the mirror in accordance with the above-mentioned first aspect can be used as a bending mirror inherent in a projection type display apparatus, while its cost can further be cut down, the apparatus can have a smaller size. Here, the preparatory polarization separating device in the above-mentioned conventional projection type display apparatus may be employed together therewith. In this case, as compared with the above-mentioned conventional projection type display apparatus, without increasing its cost so much, and without increasing its size at all, the purity in polarization of light incident on the light valve can further be enhanced, and the projection image can have more improved contrast.

Also, the above-mentioned mirror may be such that, over substantially the whole B light wavelength region, the reflectivity of S-polarized light incident thereon at a predetermined incident angle is at least 90% while the reflectivity of P-polarized light incident thereon at the predetermined incident angle is lower by at least 15% than the reflectivity of S-polarized light incident thereon at the predetermined incident angle. This mirror may be a dichroic mirror having a selectivity for reflection wavelength.

Further, the above-mentioned mirror may be such that, over substantially the whole G light wavelength region, the reflectivity of S-polarized light incident thereon at a predetermined incident angle is at least 90% while the reflectivity of P-polarized light incident thereon at the predetermined incident angle is lower by at least 15% than the reflectivity of S-polarized light incident thereon at the predetermined incident angle. This mirror may be a dichroic mirror having a selectivity for reflection wavelength.

Furthermore, the above-mentioned mirror may be such that, over substantially the whole R light wavelength region, the reflectivity of S-polarized light incident thereon at a predetermined incident angle is at least 90% while the reflectivity of P-polarized light incident thereon at the predetermined incident angle is lower by at least 15% than the reflectivity of S-polarized light incident thereon at the predetermined incident angle. This mirror may be a dichroic mirror having a selectivity for reflection wavelength.

In each case, a sufficiently high reflectivity for S-polarized light and a sufficiently low reflectivity for P-polarized light are obtained for each color wavelength region, whereby the mirror can be designed more easily than the case where a polarizing characteristic is to be obtained in reflected light with respect to the whole wavelength region from B light wavelength region to R light wavelength region. Here, for example, as with the mirror in accordance with the first aspect, when these mirrors are used as bending mirrors in a projection type display apparatus, similar advantages can be obtained. In this case, however, these mirrors are used such that they reflect the respective color light components after color separation and before being incident on a light valve.

Preferably, the mirror comprises a glass and a dielectric multilayer film laminated on the glass substrate.

Also, the above-mentioned characteristics can be obtained when the thickness of each layer of the dielectric multilayer film or the like is changed. Such a configuration, in essence, is totally different from the configuration of a glass substrate disclosed in the above-mentioned U.S. Pat. No. 5,357,370 in which high refractive index dielectric films (not a multilayer film) are respectively deposited on both surfaces thereof. The above-mentioned mirror can be used in a projection type display apparatus.

Conventionally known are various projection type display apparatus in which light irradiates a light valve which modulates incident light in response to a visual electric signal or optical signal and emits thus modulated light, the modulated light emitted from the light valve is taken out and is projected onto a screen by a projection optical system, thus projecting an optical image as being magnified. Except for dispersion type light valves, each of the light valves used in these projection type display apparatus is typically configured such that linearly polarized light is prepared by a polarization separating device beforehand, this linearly polarized light is made incident on the light valve and is modulated by the modulating function of the light valve, and the resulting modulated light is analyzed by a polarization separating device so as to be taken out.

Known as light valves having such a configuration are two kinds of light valves, i.e., reflection type light valve in which linearly polarized light incident thereon is reflected by a reflecting mirror accommodated therein into a direction opposite to its incident direction so as to be emitted therefrom, and transmission type light valve in which linearly polarized light incident thereon is modulated and transmitted therethrough so as to be emitted therefrom.

In the case where the former reflection type light valve is used, in general, randomly polarized light is made incident on a polarizing beam splitter, one linearly polarized light component emitted from the polarizing beam splitter is made incident on the light valve, and modulated light which is reflected by and emitted from the light valve is made incident on the polarizing beam splitter again, where it is analyzed, so that only its signal component is taken out therefrom. On the other hand, in the latter case where the transmission type light valve is used, in general, the light valve has a configuration in which a liquid crystal panel is sandwiched between polarizing plates which constitute a cross Nicol prism, the polarizing plate on the entrance side makes linearly polarized light, and modulated light which is transmitted thorough and emitted from the liquid crystal panel is analyzed by the polarizing plate disposed on the transmission/exit side.

While the purity in polarization of the linearly polarized light incident on the above-mentioned reflection type light valve and transmission type light valve is determined by the polarizing beam splitter and polarizing plates mentioned above, the polarizing beam splitter and polarizing plates do not always yield perfect performances. Consequently, when they are left as they are, the contrast of projection image may deteriorate. Therefore, in the conventional projection type display apparatus using a reflection type light valve or transmission type light valve, in order for linearly polarized light having a favorable purity to be made incident on the light valve so as to enhance the contrast of projection image, a further polarization separating device (preparatory polarization separating device) is disposed in front of the polarizing beam splitter or polarizing plates.

As a projection type display apparatus having the above-mentioned preparatory polarization separating device, the one using the above-mentioned reflection type light valve is disclosed in U.S. Pat. No. 4,836,649. In this projection type display apparatus, light from a light source is made incident on the front-end polarizing beam splitter as the above-mentioned preparatory polarization separating device, and the linearly polarized light transmitted therethrough is made incident on the rear-side polarizing plate so that it becomes S-polarized light with respect to the polarization separating film surface thereof, whereby the S-polarized light emitted from the rear-side polarizing beam splitter becomes linearly polarized light with a favorable purity of polarization. This S-polarized light is chromatically decomposed into R light (red light), G light (green light), and B light (blue light) by a color separating and combining optical system composed of a plurality of dichroic mirrors, and thus chromatically decomposed color light components are made incident on reflection type light valves which are disposed for the respective color light components. The modulated color light components which have been modulated by their corresponding reflection type light valves are emitted therefrom and are made incident on the above-mentioned color separating and combining optical system, where they are chromatically combined together. Thus chromatically combined light is made incident on the above-mentioned rear-side polarizing beam splitter, and the analyzed light is projected through a projective lens.

On the other hand, as a projection type display apparatus having the above-mentioned polarization separating device, a projection type display apparatus using the above-mentioned transmission type light valve is disclosed in U.S. Pat. No. 5,357,370. Employed as the above-mentioned preparatory polarization separating device in this projection type display apparatus is a polarization separating device having a bellows-like configuration in which glass substrates each having high refractive index dielectric films deposited on both surfaces are arranged in a zigzag fashion. In this projection type display apparatus, light from a light source is made incident on the polarization separating device, light having a larger amount of polarized light component (P-polarized light component) in one vibrating direction is transmitted through the polarization separating device, thus transmitted light is chromatically decomposed into R, G, and B light components by a plurality of dichroic mirrors for color separation, thus decomposed color light components are made incident on their respective transmission type light valves each comprising polarizing plates held in a cross Nicol configuration, light components which have been modulated by the respective light valves and analyzed by their emission-side polarizing plates are chromatically combined together by a plurality of color combining dichroic mirrors, and thus chromatically combined light is projected through a projective lens.

Each of the projection type display apparatus disclosed in the two publications explained above is considered to yield a bright high-quality projection image for a long period of time, since the performance of linearly polarized light incident on the light valve is improved.

Nevertheless, the following problems have been noticed in the conventional projection type display apparatus disclosed in each of the above-mentioned publications.

Namely, in the projection type display apparatus disclosed in U.S. Pat. No. 4,836,649, since the front-end polarizing beam splitter is necessary as the preparatory polarization separating device, it cannot help increasing the cost thereof. Among various kinds of optical members, polarizing beam splitters cannot be made inexpensively, whereby even the cost of one piece of polarizing beam splitter cannot be neglected. Also, it is not easy in terms of designing the polarization separating film of the polarizing beam splitter to polarize the whole wavelength region of light from the B light wavelength region to R light wavelength region by a single front-end polarizing beam splitter as in the case of the projection type display apparatus disclosed in the above-mentioned publication. Therefore, in a projection type display apparatus with a higher performance, e.g., in a projection type display apparatus configured such that light from a light source is chromatically decomposed at first, each color light thus obtained is separated in terms of polarization by a polarizing beam splitter disposed for each color light, one polarized light component of each color light is modulated by and emitted from a light valve, the modulated light components of the respective colors are analyzed by the polarizing beam splitters for the respective color light components, and thus analyzed light components for the respective color light components are chromatically combined together; it is necessary to place a further polarizing beam splitter for each color light in front of the polarizing beam splitter for each color. In this case, the cost would increase further.

In the projection type display apparatus disclosed in the above-mentioned U.S. Pat. No. 5,357,370, since the polarization separating device having the above-mentioned bellows-like configuration is necessary as its preparatory polarization separating device, its cost cannot help increasing, and a larger space is required for placing this polarization separating device, thereby increasing the size of the projection type display apparatus.

When the above-mentioned mirror of the present invention is used in a projection type display apparatus or the like, the purity in polarization of light incident on the light valve can be increased so as to improve the contrast of projection image, while reducing the cost and size of the apparatus.

Namely, when used in a projection type display apparatus or the like, (1) the above-mentioned mirror can enhance the purity in polarization of the light incident on the light valve so as to improve the contrast of projection image, and reduce the cost and size of the apparatus; or (2), when used together with a preparatory polarization separating device, without increasing the cost so much as compared with the conventional projection type display apparatus and without increasing the size of the apparatus at all, the purity in polarization of the light incident on the light valve can be further enhanced, thereby further improving the contrast of projection image.

(Projection Type Display Apparatus of First Embodiment)

In the following, a projection type display apparatus in accordance with its first embodiment using the above-mentioned mirrors will be explained with reference to FIG. 21.

Figure 21:
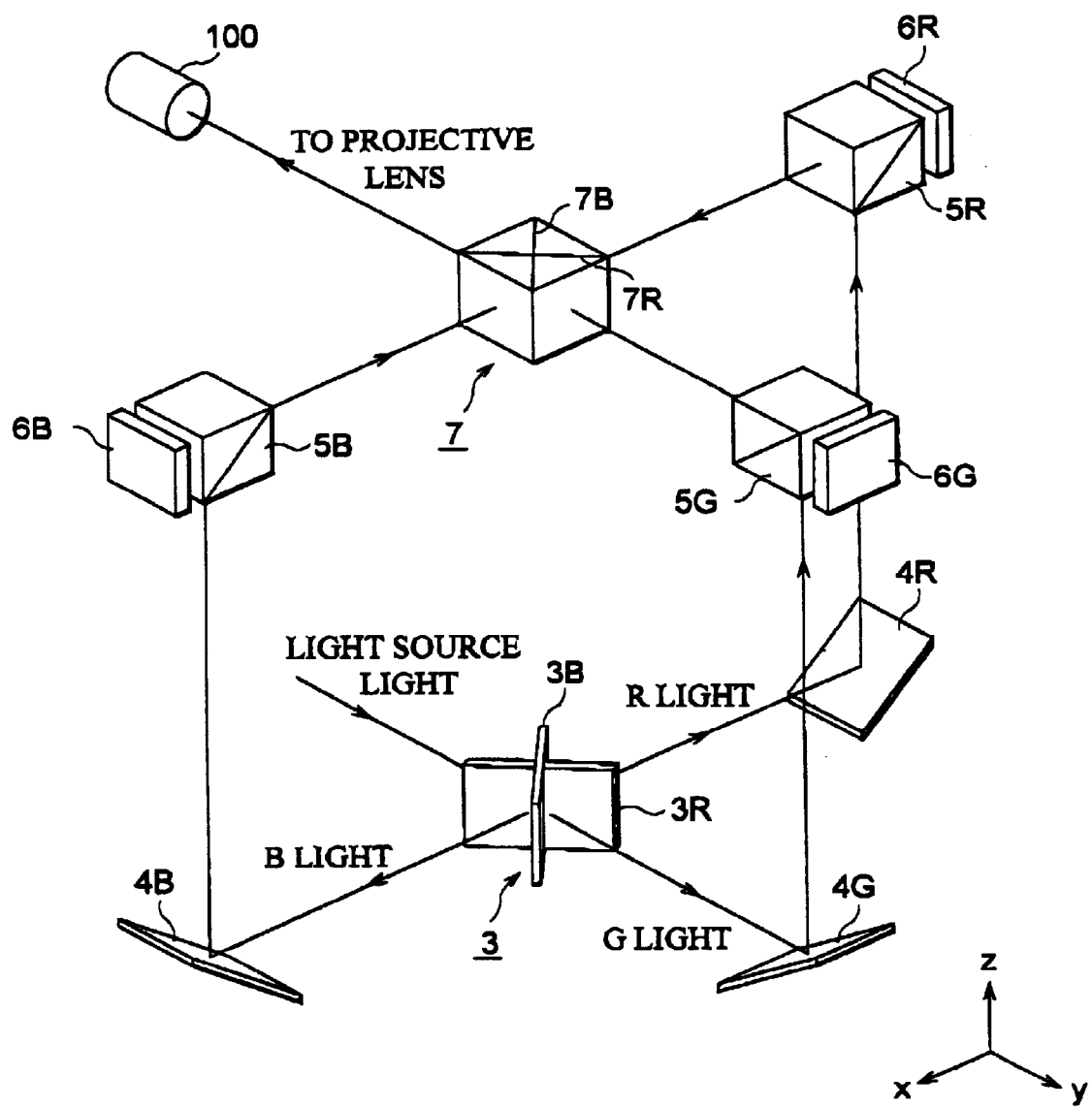
FIG. 21 is a schematic configurational view showing a projection type display apparatus in accordance with its first embodiment of the present invention.

FIG. 21 is a schematic configurational view showing the projection type display apparatus in accordance with this embodiment. For convenience of explanation, X, Y, and Z axes orthogonal to each other are defined as depicted.

In the projection type display apparatus in accordance with this embodiment, as shown in FIG. 21, white light emitted from a non-depicted light source advancing in Y direction is made incident, by way of an infrared absorbing filter and an ultraviolet absorbing filter which are not depicted, on a cross dichroic mirror 3 which constitutes a color separating optical system. In the cross dichroic mirror 3, a B light reflecting dichroic mirror 3B and an R light reflecting mirror 3R are arranged in an X form so as to be orthogonal to each other, whereas each of the mirrors 3B and 3R is disposed so as to yield an incident angle of 45 degrees. The light source light incident on the cross dichroic mirror 3 along Y direction is chromatically decomposed into an R light component advancing in -X direction; a B light component advancing in X direction; and a G light component passing through the cross dichroic mirror 3, as it is, to advance in Y direction.

The R, G, and B light components chromatically decomposed by the cross dichroic mirror 3 shift their optical axes to Z direction at their corresponding bending mirrors 4R, 4G, and 4B and then are made incident on polarizing beam splitters 5R, 5G, and 5B for the respective colors. In this embodiment, since the respective color light components are made incident on the bending mirrors 4R, 4G, and 4B at an incident angle of 45 degrees; of the mirrors in accordance with the foregoing embodiments thereof, those optimized for light incident at an angle of 45 degrees are employed therefor. Specifically, the mirror shown in FIG. 11 or 15 can be employed as the bending mirror 4R, the mirror shown in FIG. 9 or 13 can be employed as the bending mirror 4G, and the mirror shown in FIG. 1 can be employed as the bending mirror 4B.

The R, G, and B light components chromatically decomposed by the cross dichroic mirror 3 are made incident, in their random polarization states, on the bending mirrors 4R, 4G, and 4B thus employing the mirrors of the above-mentioned embodiments at an incident angle of 45 degrees, and are reflected thereby according to reflection characteristics including the polarization separating characteristics explained in their corresponding embodiments mentioned above. Namely, the respective color light components reflected by the mirrors 4R, 4G, and 4B are made incident on their corresponding polarizing beam splitters 5R, 5G, and 5B, while containing a larger amount of S-polarized light component than P-polarized light component.

The polarizing beam splitters 5R, 5G, and 5B are disposed such that S directions of polarization with respect to the mirrors 4R, 4G, and 4B become S directions with respect to the polarization separating films of their corresponding polarizing beam splitters 5R, 5G, and 5B. The respective color light components reflected by the bending mirrors 4R, 4G, and 4B and made incident on the polarizing beam splitters 5R, 5G, and 5B in Z direction, each of which has a larger amount of S-polarized light component than P-polarized light component as mentioned above, are separated in terms of polarization by the polarizing beam splitters 5R, 5G, and 5B into S-polarized light components which are reflected by the polarization separating films of the polarizing beam splitters 5R, 5G, and 5B so as to be made incident on reflection type light valves 6R, 6G, and 6B, and P-polarized light components which are transmitted through the polarizing beam splitters 5R, 5G, and 5B so as to be discarded. Thus, the S-polarized light components of the respective colors subjected to the polarization separating characteristics of the bending mirrors 4R, 4G, and 4B and those of the polarizing beam splitters 5R, 5G, and 5B in a superposing fashion are made incident on the light valves 6R, 6G, and 6B, whereby the S-polarized light components of the respective colors incident on the light valves 6R, 6G, and 6B each have a high purity of polarization and become favorable.

In this embodiment, an optically writable reflection type light valve is used as each of the light valves 6R, 6G, and 6B. Here, the structure and function of an optically writable reflection type liquid crystal light valve will be explained. Though not depicted, this light valve is constituted by, for example, successively from the incident light side, a transparent glass substrate, an ITO transparent electrode film, a liquid crystal alignment layer, a TN liquid crystal layer, a liquid crystal alignment layer, a dielectric reflecting mirror layer, a light shielding layer, a photoconductor layer made of a hydrogenated amorphous silicon layer or the like, an ITO transparent electrode layer, and a transparent glass substrate.

Thus, when a writing optical signal enters this light valve from its side opposite to the incident light, the photoconductor layer at this part reduces its impedance. As an AC voltage is always applied between the above-mentioned two ITO electrodes so as to operate this device, this voltage is applied to above-mentioned liquid crystal. As liquid crystal molecules are oriented in the direction of the resulting electric field, the liquid crystal layer itself functions as a quarter-wave plate. When there is no writing optical signal, by contrast, the photoconductor layer at this part has a high impedance, so that the voltage applied between both ITO electrodes is not efficiently applied to the liquid crystal, whereby the liquid crystal molecules in the liquid crystal layer fail to align with each other but are oriented in conformity to the liquid crystal alignment layers, thus forming a twisted structure.

Due to the foregoing function, at the part where the writing optical signal enters, incident polarized light (reading light) is transmitted through the liquid crystal layer and becomes circularly polarized light so as to be reflected by the mirror layer, and then is transmitted through the liquid crystal layer again and emitted therefrom with its direction of polarization changed by 90 degrees from that at the time of incidence. Namely, when the incident light (reading light) is S-polarized light, it is emitted as P-polarized light. At the part where no writing optical signal enters, on the other hand, the incident polarized light is optically rotated in conformity to the twist of liquid crystal molecules, reflected by the reflecting layer, and then optically rotated again in conformity to the twist before being emitted, whereby the emitted light has the same polarization as the incident light. Namely, when the incident light (reading light) is S-polarized light, it is emitted as S-polarized light. In FIG. 21, writing optical systems for the light valves 6R, 6G, and 6B are not depicted.

Explained above are the structure and function of the optically writable reflection type light valve. It can be understood that, since the optically writable reflection type light valve has the above-mentioned function, the higher is the purity in polarization of linearly polarized light incident on the light valve, the more favorable can become the contrast of the projection image obtained.

The light valves 6R, 6G, and 6B should not be restricted to such an optically writable reflection type light valve. For example, it goes without saying that usable is an electrically writable reflection type light valve which is similarly a reflection type light valve and in which switching is effected by TFT, a nonlinear device, with electric signals, so that the alignment of a liquid crystal modulating layer portion of thus switched pixel is changed so as to be used as a modulating layer. Since no optically writable optical system is necessary, this configuration can contribute to reducing the size of the apparatus.

In the electrically writable reflection type light valve, a higher purity in polarization is similarly required for the incident linearly polarized light. Accordingly, also in the case where an electrically writable reflection type light valve is employed as each of the light valves 6R, 6G, and 6B, the enhanced purity in polarization of the respective color light components reflected by the bending mirrors 4R, 4G, and 4B employing the mirrors in accordance with the above-mentioned embodiments can be further enhanced due to the extinguishing ratios of the polarizing beam splitters 5R, 5G, and 5B, before being made incident on the light valves 6R, 6G, and 6B. Accordingly, light with a favorable contrast can be emitted from each of the light valves 6R, 6G, and 6B.

The S-polarized R, G, and B light components respectively made incident on the light valves 6R, 6G, and 6B are modulated in response to writing light beams for the respective colors and are reflected thereby so as to be emitted therefrom as modulated light components, which are then made incident on the polarizing beam splitters 5R, 5G, and 5B again. In the modulated light of each color, due to the above-mentioned function, there are concurrently a P-polarized light component at the part selected in response to the writing light beam for each color and an S-polarized light component at the part not selected. The modulated light components respectively incident on the polarizing beam splitters 5R, 5G, and 5B are analyzed thereby. Thus, of the modulated light of each color, only the P-polarized light component is transmitted through the polarization separating film of its corresponding polarizing beam splitter 5R, 5G, or 5B so as to advance toward a cross dichroic prism 7 as a color combining optical system (i.e., analyzed), whereas the S-polarized light component is reflected by the polarization separating film of its corresponding polarizing beam splitter 5R, 5G, or 5B so as to be discarded along -Z direction.

The analyzed light components of the respective colors emitted from their corresponding polarizing beam splitters 5R, 5G, and 5B are emitted in directions opposite to their incident directions with respect to the bending mirrors 4R, 4G, and 4B for the respective colors when chromatically decomposed by the cross dichroic mirror 3 as the color separating optical system, so as to be made incident on the color combining optical system constituted by the cross dichroic prism 7.

The cross dichroic prism 7 has a configuration in which four pieces of rectangular equilateral triangle prisms are bonded together by an adhesive such that R light reflecting dichroic films 7R and B light reflecting dichroic films 7B formed at their side faces are orthogonal to each other in an X form.

The analyzed light component of R light emitted from the polarizing beam splitter 5R in X direction so as to be made incident on the cross dichroic prism 7 is reflected by the R light reflecting dichroic film 7R and, with its optical axis shifted to -Y direction, is emitted from the prism 7 in -Y direction. The analyzed light component of B light emitted from the polarizing beam splitter 5B in -X direction so as to be made incident on the cross dichroic prism 7 is reflected by the B light reflecting dichroic film 7B and, with its optical axis shifted to -Y direction, is emitted from the prism 7 in -Y direction. The analyzed light component of G light emitted from the polarizing beam splitter 5G in -Y direction so as to be made incident on the cross dichroic prism 7 is transmitted through the dichroic films 7R and 7G so as to be emitted from the prism 7, as it is, in -Y direction. Though the analyzed light emitted by each of the polarizing beam splitters 5R, 5G, and 5R is the P-polarized light component, it would become incident on the surfaces of the dichroic films 7R and 7B of the cross dichroic prism 7 in the S direction. Accordingly, linearly polarized light having an ideal vibrating direction can be made incident on the surfaces of the dichroic films 7R and 7B.

As a consequence, the color light components modulated by the respective light valves 6R, 6G, and 6B and analyzed by their corresponding polarizing beam splitters 5R, 5G, and 5B are chromatically combined by the cross dichroic prism 7, and thus combined light is emitted from the cross dichroic prism 7 in -Y direction. The composite light emitted from the cross dichroic prism 7 is made incident on a projective lens 100 as a projection optical system so as to be projected 10 onto a screen (not depicted) as a full-color projection image.

As explained in the foregoing, in the projection type display apparatus in accordance with this embodiment, randomly polarized light components of chromatically decomposed R, G, and B light components change their polarization state from random polarization to the state further closer to linear polarization when they shift their optical axes as being reflected by the bending mirrors 4R, 4G, and 4R that employ the mirrors of the above-mentioned embodiments, before being incident on the polarizing beam splitters 5R, 5G, and 5B for the respective color light components. The respective color light components in this polarization state are made incident on their corresponding polarizing beam splitters 5R, 5G, and 5B and are turned into linearly polarized light having a further higher purity by the polarization separating films thereof, before being so-called transmission type light valves.

Figure 22:
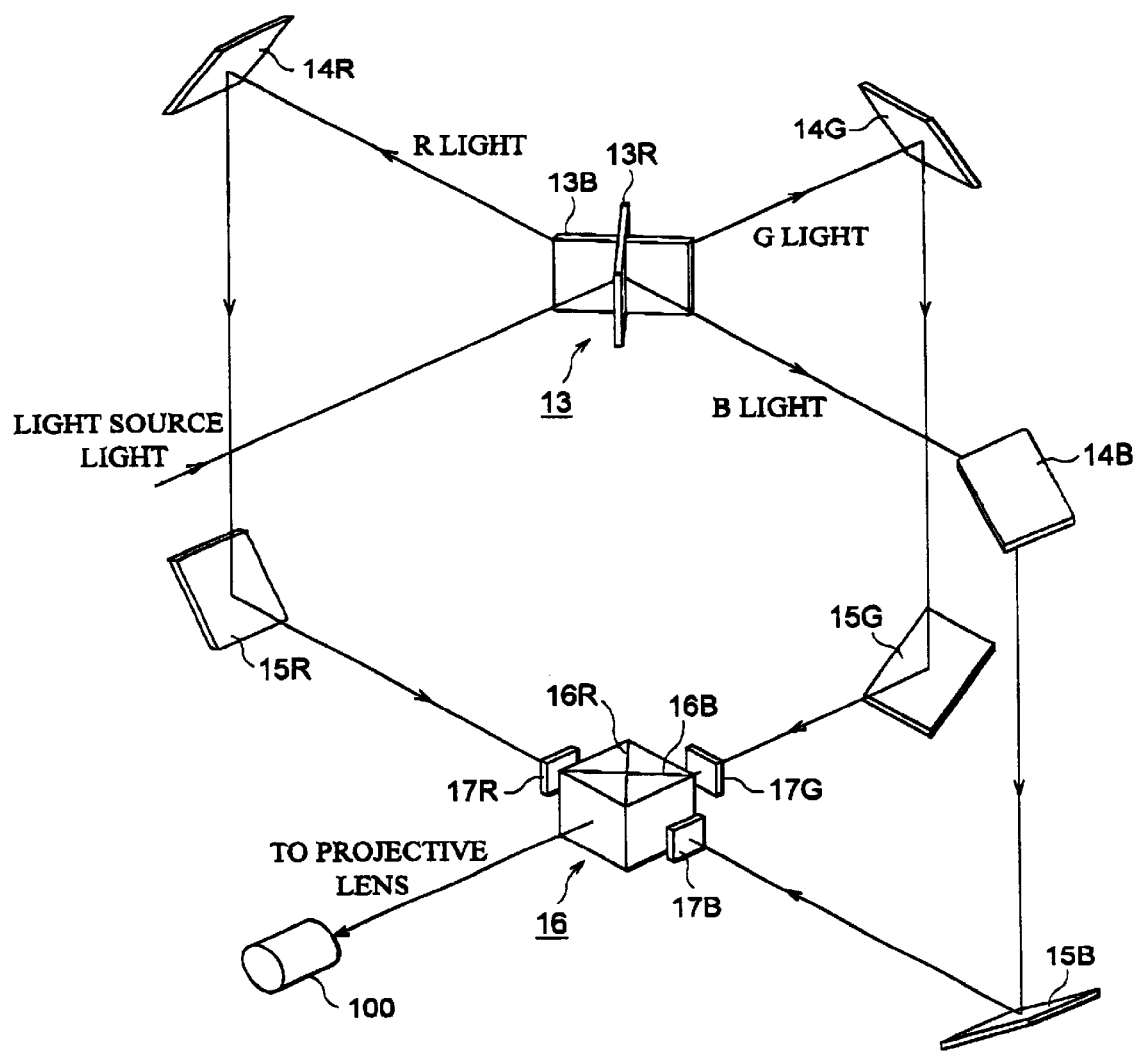
FIG. 22 is a schematic configurational view showing a projection type display apparatus in accordance with its second embodiment of the present invention.

In the projection type display apparatus in accordance with this embodiment, as shown in FIG. 22, white light emitted from a non-depicted light source advancing in -Z direction is made incident, by way of an infrared absorbing filter and an ultraviolet absorbing filter which are not depicted, on a cross dichroic mirror 13 which constitutes a color separating optical system. In the cross dichroic mirror 13, a B light reflecting dichroic mirror 13B and an R light reflecting mirror 13R are arranged in an X form so as to be orthogonal to each other, whereas each of the mirrors 13B and 13R is disposed so as to yield an incident angle of 45 degrees. The light source light incident on the cross dichroic mirror 13 along -Z direction is chromatically decomposed into an R light component advancing in -X direction; a B light component advancing in X direction; and a G light component passing through the cross dichroic mirror 13, as it is, to advance in -Z direction.

The R, G, and B light components chromatically decomposed by the cross dichroic mirror 13 advance while shifting their optical axes to -Y direction at their corresponding bending mirrors 14R, 14G, and 14B. These bending mirrors 14R, 14G, and 14B are not the mirrors in accordance with the present invention but may be normal dielectric multilayer mirrors or metal reflecting mirrors. Even after being reflected thereby, each color light does incident on the respective light valves 6R, 6G, and 6B. Consequently, this apparatus can project a projection image with more favorable contrast.

Further, in this embodiment, as the foregoing configuration is employed, it is not necessary to place a polarizing device downstream the light source nor a front-end polarizing beam splitter in front of each of the polarizing beam splitters 6R, 6G, and 6B as conventionally needed. Accordingly, this embodiment can contribute to reducing the size of the configuration and can lower the cost thereof.

(Projection Type Display Apparatus of Second Embodiment)

In the following, a projection type display apparatus in accordance with its second embodiment using the above-mentioned mirrors will be explained with reference to FIG. 22.

FIG. 22 is a schematic configurational view showing the projection type display apparatus in accordance with this embodiment. For convenience of explanation, X, Y, and Z axes orthogonal to each other are defined as depicted.

While the projection type display apparatus in accordance with the above-mentioned first embodiment is the one using optically writable or electrically writable reflection type light valves, the projection type display apparatus in accordance with this embodiment is the one using not change its polarization state, and thus is still randomly polarized light.

The respective color light components reflected by the bending mirrors 14R, 14G, and 14B are reflected by bending mirrors 15R, 15G, and 15B employing the mirrors in accordance with the above-mentioned embodiment, thereby bending the optical axes so that the R, G, and B light components respectively advance in X, Z, and -X directions so as to be made incident on their corresponding light valves 17R, 17G, and 17B. Also in this embodiment, since the respective color light components are made incident on the bending mirrors 15R, 15G, and 15B at an incident angle of 45 degrees; of the mirrors in accordance with the foregoing embodiments thereof, those optimized for light incident at an angle of 45 degrees are employed therefor. Specifically, the mirror shown in FIG. 11 or 15 can be employed as the bending mirror 15R, the mirror shown in FIG. 9 or 13 can be employed as the bending mirror 15G, and the mirror shown in FIG. 1 can be employed as the bending mirror 15B.

The R, G, and B light components chromatically decomposed by the cross dichroic mirror 3 are made incident, in their random polarization states, on the bending mirrors 15R, 15G, and 15B thus employing the mirrors of the above-mentioned embodiments at an incident angle of 45 degrees, and are reflected thereby according to reflection characteristics including the polarization separating characteristics explained in their corresponding embodiments mentioned above. Namely, the respective color light components reflected by the mirrors 15R, 15G, and 15B are respectively made incident on the light valves 17R, 17G, and 17B for the respective color light components, while containing a larger amount of S-polarized light component than P-polarized light component.

In this embodiment, a transmission type light valve is used as each of the light valves 17R, 17G, and 17B.

In the following, the transmission type light valve will be explained. For example, the transmission type light valve comprises a liquid crystal panel, and polarizing plates disposed on both entrance side and exit side of the liquid crystal panel so as to form a cross Nicol prism; and is configured such that the liquid crystal panel is inserted between the polarizing plates. The liquid crystal panel has, for example, such a function that, as TFT in each pixel is switched, a voltage is applied to the liquid crystal layer of this pixel, so that the orientation of liquid crystal molecules in the liquid crystal layer is changed, whereby the vibrating direction of polarized light emitted from the liquid crystal panel is changed depending on whether the linearly polarized light incident on the liquid crystal panel through the entrance-side polarizing plate is optically rotated or not. The polarized light emitted from the liquid crystal panel is transmitted through the exit-side polarizing plate when its vibrating direction coincides with the direction penetrating through the exit-side polarizing plate; otherwise, it is absorbed by the exit-side polarizing plate. The light transmitted through the exit-side polarizing plate becomes projection light.

The light components (modulated light components) transmitted through the light valves 17R, 17G, and 17B for the respective color light components are made incident on a cross dichroic prism 16 constituting a color combining optical system in directions different from each other, i.e., R, G, and B light components are respectively in X, Z, and -X directions.

The cross dichroic prism 16 has a configuration in which four pieces of rectangular equilateral triangle prisms are bonded together by an adhesive such that R light reflecting dichroic films 16R and B light reflecting dichroic films 16B formed at their side faces are orthogonal to each other in an X form.

The R light transmitted through the light valve 17R in X direction so as to be made incident on the cross dichroic prism 16 is reflected by the R light reflecting dichroic film 16R and, with its optical axis shifted to Z direction, is emitted from the prism 16 in Z direction. The G light transmitted through the light valve 17G in Z direction so as to be made incident on the cross dichroic prism 16 is transmitted through the dichroic films 16R and 16B so as to be emitted from the prism 16 in Z direction as it is. The B light transmitted through the light valve 17B in -X direction so as to be made incident on the cross dichroic prism 16 is reflected by the B light reflecting dichroic film 16B and, with its optical axis shifted to Z direction, is emitted from the prism 16 in Z direction.

As a consequence, the color light components modulated and analyzed by the respective light valves 17R, 17G, and 17B are chromatically combined by the cross dichroic prism 16, and thus combined light is emitted from the cross dichroic prism 16 in Z direction. The composite light emitted from the cross dichroic prism 16 is made incident on a projective lens 100 as a projection optical system so as to be projected onto a screen (not depicted) as a full-color projection image.

As explained in the foregoing, in the projection type display apparatus in accordance with this embodiment, as with that of the above-mentioned first embodiment, randomly polarized light components of chromatically decomposed R, G, and B light components change their polarization state from random polarization to the state further closer to linear polarization when they shift their optical axes as being reflected by the bending mirrors 15R, 15G, and 15R that employ the mirrors of the above-mentioned embodiments, before being incident on the light valves 17R, 17G, and 17B for the respective color light components. The respective color light components in this polarization state are made incident on their corresponding light valves 17R, 17G, and 17B and are turned into linearly polarized light having a further higher purity by the entrance-side polarizing plates thereof, before being incident on the liquid crystal panels thereof. Consequently, this apparatus can project a projection image with more favorable contrast.

Further, in this embodiment, as the foregoing configuration is employed, it is not necessary to place a polarizing device downstream the light source nor a front-end polarizing beam splitter in front of each of the polarizing beam splitters 17R, 17G, and 17B as conventionally needed. Accordingly, this embodiment can also contribute to reducing the size of the configuration and can lower the cost thereof, as with the projection type display device in accordance with the first embodiment. of course, such a polarizing device or front-end polarizing beam splitter may also be used. In this case, the contrast of projection image can further be enhanced.

In this embodiment, the mirrors in accordance with the above-mentioned embodiments thereof are used only in the bending mirrors 15R, 15G, and 15B that are located immediately in front of the place where the respective color components enter their corresponding light valves 17R, 17G, and 17B. Nevertheless, in a projection type display apparatus, such as that of this embodiment, having a configuration in which two sets each of bending mirrors 14R, 15R, 14G, 15G, 14B, and 15B are disposed for the chromatically decomposed light components, both of the two sets of bending mirrors 14R, 15R, 14G, 15G, 14B, and 15B for the color light components may also employ the mirrors in accordance with the above-mentioned embodiments thereof. In this case, though the respective reflected light components reflected by the first bending mirrors 14R, 14G, and 14B become polarized light having a high purity of S polarized light, since the S directions with respect to the initial bending mirrors 14R, 14G, and 14B coincide with the directions with respect to their corresponding bending mirrors 15R, 15G, and 15B used for the second reflection, the S-polarized light component of each color light is subjected to polarization separating characteristics of the two mirrors in accordance with the above-mentioned embodiments thereof in a superposing fashion. Accordingly, linearly polarized light with a further favorable purity can be made incident on each of the light valves 17R, 17G, and 17B, whereby a projection image with much better contrast can be obtained.

Each of the above-mentioned projection type display apparatus in accordance with the first and second embodiments is a projection type display apparatus having a two-story structure in which the direction of optical axis of each of chromatically decomposed color light components is changed by the mirror in accordance with the present invention, while a color combining optical system is disposed above or below the color separating optical system. Nevertheless, also in a projection type display apparatus of a one-story structure in which both the color separating optical system and color combining optical system are disposed on the same plane, as long as it is a projection type display apparatus in which the respective color light components chromatically decomposed by the color separating optical system are made incident on their corresponding light valves, while the light components emitted from the light valves are chromatically combined together, and a bending mirror for at least one color light component is located at a position downstream the place where it is chromatically decomposed but upstream the place where it enters its corresponding light valve; when a mirror having a polarizing function in accordance with one of the above-mentioned embodiments thereof is used as the bending mirror, the purity in polarization can be enhanced for thus bent light, whereby the contrast of projection light can be improved.

(Projection Type Display Apparatus of Third Embodiment)

An example of such projection type display apparatus of a one-story structure will be explained as a third embodiment of the present invention with reference to FIG. 23. It is a schematic configurational view showing the projection type display apparatus in accordance with this embodiment.

Figure 23:
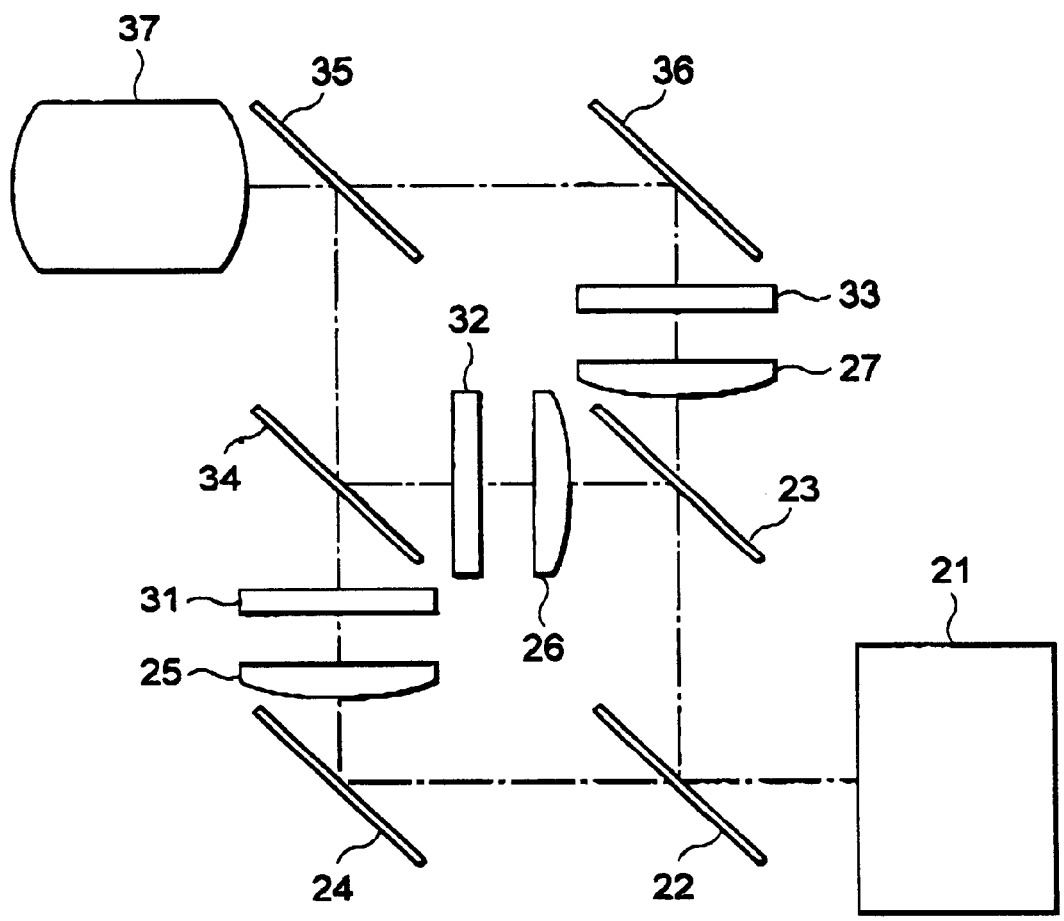
FIG. 23 is a schematic configurational view showing a projection type display apparatus in accordance with its third embodiment of the present invention.

Depicted in FIG. 23 are a light source 21; an R light transmitting dichroic mirror 22; a B light reflecting dichroic mirror 23; a bending mirror 24; field lenses 25, 26, and 27; transmission type light valves 31, 32, and 33; a B light reflecting dichroic mirror 34; an R light transmitting dichroic mirror 35; a bending mirror 36; and a projective lens 37. In this embodiment, the mirror shown in FIG. 11 or 15 is used as the bending mirror 24.

In this embodiment, light from the light source 21 is chromatically decomposed into R, G, and B light components by a color separating optical system constituted by the dichroic mirrors 22 and 23. The chromatically decomposed R light component is reflected by the bending mirror 24 and, with its optical axis shifted thereby, is transmitted through the field lens 25 and is made incident on the transmission type light valve 31, where it is modulated. On the other hand, the chromatically decomposed B and G light components are respectively made incident on the transmission type light valves 32 and 33 by way of the field lenses 26 and 27 without the aid of bending mirrors, and are modulated by their corresponding light valves 32 and 33. The respective color light components modulated by the light valves 31, 32, and 33 are chromatically combined together by a color combining optical system constituted by the dichroic mirrors 34 and 35, and thus chromatically combined light is projected through the projective lens 37 onto a non-depicted screen.

In this embodiment, as mentioned above, the mirror shown in FIG. 11 or 15 is used as the bending mirror 24 for R light, which is disposed at a position downstream the place where it is chromatically decomposed and upstream the place where it enters the light valve 31, whereby the purity in polarization of R light can be enhanced, thus allowing the projection light to improve its contrast.

(Projection Type Display Apparatus of Fourth Embodiment)

In the following, a projection type display apparatus in accordance with a fourth embodiment of the present invention using the above-mentioned mirrors will be explained with reference to FIGS. 24 and 25.

Figure 24:
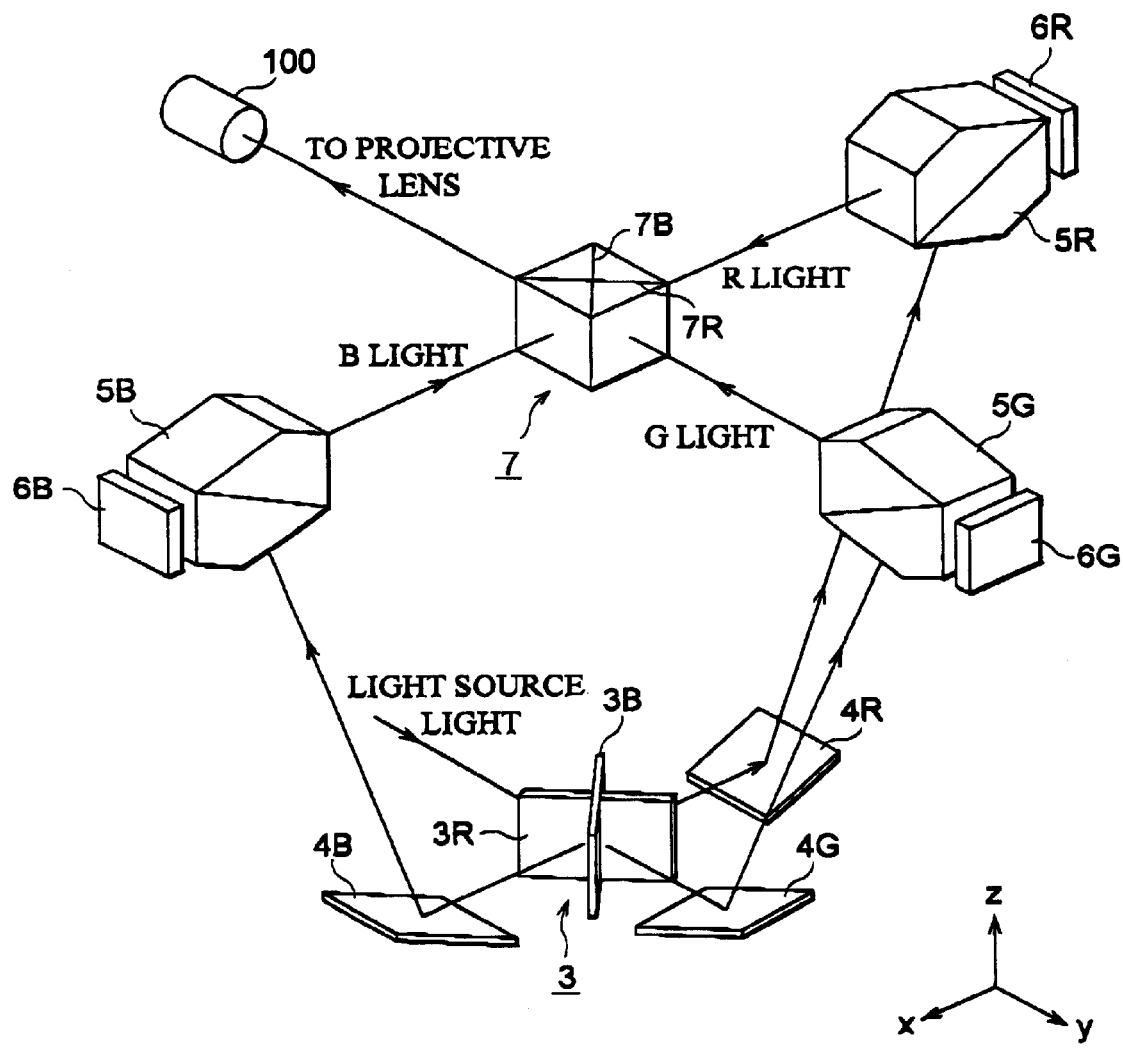
FIG. 24 is a schematic configurational view showing a projection type display apparatus in accordance with its fourth embodiment of the present invention.

FIG. 24 is a schematic configurational view showing the projection type display apparatus in accordance with this embodiment. For convenience of explanation, X, Y, and Z axes orthogonal to each other are defined as depicted. FIG. 25 is a view showing the optical system for B light in FIG. 24 as observed in -Y direction. In FIGS. 24 and 25, constituents identical or equivalent to those in FIG. 21 are referred to with numerals or letters identical thereto, without their overlapping explanations being repeated.

The projection type display apparatus in accordance with this embodiment basically differs from that in accordance with the above-mentioned first embodiment in the forms of polarizing beam splitters 5R, 5G, and 5B used for separating, in terms of polarization, the color light components that have been chromatically decomposed by a cross dichroic mirror 3 as a color separating optical system. Namely, in this embodiment, a glass material having a refractive index of 1.52, so-called BK7, is used as prisms constituting the polarizing beam splitters 5R, 5G, and 5B, whereby the incident angle with respect to the polarization separating film of each of the polarizing beam splitters 5R, 5G, and 5B is most efficiently set at 54.6 degrees. From this viewpoint, as shown in FIGS. 24 and 25, each of the polarizing beam splitters 5R, 5G, and 5B is formed into an irregular hexagonal prism as a whole in which the entrance surface and exit surface thereof are perpendicular to the optical axis and that the incident angle with respect to each polarization separating film thereof becomes 54.6 degrees as mentioned above.

Figure 25:
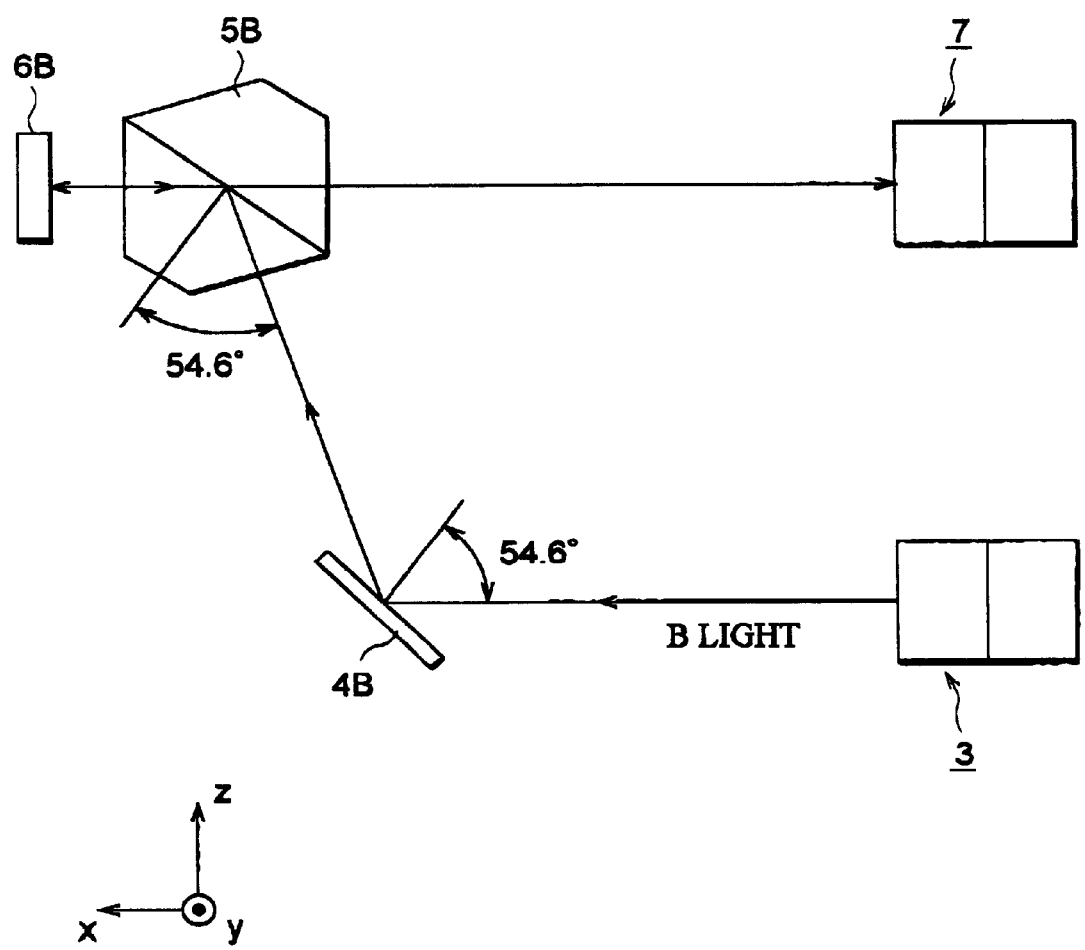
FIG. 25 is a view observing an optical system concerning the B light component in FIG. 24 along -Y direction.

Also, in this embodiment, in order for the respective color light components to be made incident on the polarization separating films of the polarizing beam splitters 5R, 5G, and 5B at an incident angle of 54.6 degrees, bending mirrors 4R, 4G, and 4B are disposed such that their corresponding color light components are made incident thereon at an incident angle of 54.6 degrees as shown in FIGS. 24 and 25. Therefore, in this embodiment, of the mirrors in accordance with the above-mentioned embodiments thereof, those optimized for light incident thereon at an incident angle of 54.6 degrees are employed as the bending mirrors 4R, 4G, and 4B. Specifically, the mirror shown in FIG. 17 can be used as the bending mirror 4B for B light.

In this embodiment, the B light component chromatically decomposed by the cross dichroic mirror 3 advances in X direction so as to be made incident on the bending mirror 4B at an incident angle of 54.6 degrees and reflected thereby, thus entering the polarizing beam splitter 5B so as to be made incident on the polarization separating film thereof at an incident angle of 54.6 degrees. The S-polarized light component of B light separated by the polarization separating film advances in X direction and is emitted from the polarizing beam splitter 5B so as to be made incident on a reflection type light valve 6B. The B light component modulated by the light valve 6B reenters the polarizing beam splitter 5B so as to be made incident on its polarization separating film at an incident angle of 54.6 degrees, thereby being subjected to an analyzing action of the polarization separating film. The analyzed light component of B light advances in -X direction so as to be made incident on a cross dichroic prism 7 as a color combining optical system, where it is chromatically combined with the analyzed light components of R light and G light which are obtained in a manner similar to that of the above-mentioned B light.

The projection type display apparatus in accordance with this embodiment can yield advantages similar to those of the projection type display apparatus in accordance with the above-mentioned first embodiment.

The present invention should not be restricted to the embodiments explained in the foregoing.

While the mirrors having a polarizing characteristic optimized for an incident angle of 45 degrees are used in the projection type display apparatus in accordance with the first to third embodiments, and the mirrors having a polarizing characteristic optimized for an incident angle of 54.6 degrees are used in the projection type display apparatus in accordance with the fourth embodiment, the projection type display apparatus may also be configured so as to use a mirror optimized for an incident angle of 65 degrees, such as that shown in FIG. 5.

As explained above, in accordance with the present invention, the purity in polarization of light incident on a light valve can be enhanced so as to improve the contrast of projection image, while allowing the cost and size of the apparatus to decrease.

As explained in the foregoing, the projection type display apparatus in accordance with the first aspect of the present invention comprises a color separating optical system for chromatically decomposing light from a light source into R, G, and B light components; at least one bending mirror for reflecting at least one color light component of the R, G, and B light components chromatically decomposed by the color separating optical system, so as to change a direction of optical axis thereof; first, second, and third light valves for respectively modulating the R, G, and B light components including the color light component with the direction of optical axis changed by the at least one bending mirror; a color combining optical system for chromatically combining together the R, G, and B light components respectively modulated by the first, second, and third light valves; and a projection optical system for projecting light chromatically combined by the color combining optical system, wherein the at least one bending mirror is a mirror having a polarizing characteristic for causing reflected light to approach linearly polarized light.

In this apparatus, at least one color light component of the R, G, and B light components chromatically decomposed by the color separating optical system is reflected by at least one bending mirror which is a mirror having a polarizing characteristic for causing reflected light to approach linearly polarized light (hereinafter referred as "polarizing mirror" for convenience of explanation), so as to change its direction of optical axis. Then, the R, G, and B light components including the color light component with thus changed direction of optical axis are respectively made incident on the first, second, and third light valves. Accordingly, the above-mentioned at least one color light component is made incident on the light valve by way of the bending mirror that is a polarizing mirror, whereby the purity in polarization of light incident on the light valve is enhanced, thus improving the contrast of projection image. Unlike the polarizing beam splitter or bellows-configured polarization separating device as the preparatory polarizing device in the above-mentioned conventional projection type display apparatus, the polarizing mirror can be constituted by a glass substrate and a dielectric multilayer film, for example, thus being able to cut down the cost. Also in the above-mentioned first aspect, since the polarizing mirror is used as the bending mirror inherent in the projection type display apparatus, the cost can further be cut down, and the size of the apparatus can be reduced.

The projection type display apparatus may comprise a color separating optical system for chromatically decomposing light from a light source into R, G, and B light components; at least one for each color light component of bending mirrors for respectively reflecting the R, G, and B light components chromatically decomposed by the color separating optical system, so as to change directions of optical axes thereof; first, second, and third light valves for respectively modulating the R, G, and B light components whose directions of optical axes are shifted by the bending mirrors; a color combining optical system for chromatically combining together the R, G, and B light components respectively modulated by the first, second, and third light valves; and a projection optical system for projecting light chromatically combined by the color combining optical system, wherein each of the bending mirrors is a mirror having a polarizing characteristic for causing reflected light to approach linearly polarized light.

In this apparatus, each of the R, G, and B light components chromatically decomposed by the color separating optical system is reflected by at least one bending mirror which is a polarizing mirror, so as to shift its direction of optical axis. Then, the R, G, and B light components with thus shifted directions of optical axes are respectively made incident on the first, second, and third light valves. Accordingly, all the color light components are made incident on their corresponding light valves by way of the bending mirrors, each of which is a polarizing mirror, whereby the purity in polarization of each color light component incident on the light valve is enhanced, thus improving the contrast of projection image. unlike the polarizing beam splitter or bellows-configured polarization separating device as the preparatory polarizing device in the above-mentioned conventional projection type display apparatus, the polarizing mirror can be constituted by a glass substrate and a dielectric multilayer film, for example, thus being able to cut down the cost. Also, when the polarizing mirror is used as the bending mirror inherent in the projection type display apparatus, the cost can further be cut down, and the size of the apparatus can be reduced.

The projection type display apparatus may comprise a color separating optical system for chromatically decomposing light from a light source into R, G, and B light components; a plurality of sets, for each color light component, of bending mirrors for respectively reflecting the R, G, and B light components chromatically decomposed by the color separating optical system, so as to change directions of optical axes thereof; first, second, and third light valves for respectively modulating the R, G, and B light components whose directions of optical axes are changed by the bending mirrors; a color combining optical system for chromatically combining together the R, G, and B light components respectively modulated by the first, second, and third light valves; and a projection optical system for projecting light chromatically combined by the color combining optical system; wherein, of the plurality of sets, for each color light component, of the bending mirrors, at least the bending mirror for each color light component disposed closest to the light valve corresponding thereto on an entrance side thereof is a mirror having a polarizing characteristic for causing reflected light to approach linearly polarized light.

In this apparatus, each of the R, G, and B light components chromatically decomposed by the color separating optical system is reflected by a plurality of bending mirrors a plurality of times, so as to change its direction of optical axis a plurality of times. Then, the R, G, and B light components with thus changed directions of optical axes are respectively made incident on the first, second, and third light valves. Since polarizing mirrors are used as at least bending mirrors immediately in front of the first, second, and third light valves in this apparatus, all the color light components are made incident on their corresponding light valves by way of the bending mirrors, each of which is a polarizing mirror, whereby the purity in polarization of each color light component incident on the light valve is enhanced, thus improving the contrast of projection image. Unlike the polarizing beam splitter or bellows-configured polarization separating device as the preparatory polarizing device in the above-mentioned conventional projection type display apparatus, the polarizing mirror can be constituted by a glass substrate and a dielectric multilayer film, for example, thus being able to cut down the cost. Also, in this apparatus, since the polarizing mirror is used as the bending mirror inherent in the projection type display apparatus, the cost can further be cut down, and the size of the apparatus can be reduced.

This apparatus may also be configured such that, of the plurality of bending mirrors for each color light component, as the bending mirror immediately in front of the light valve, a mirror having a simple reflecting function is used in place of the polarizing mirror, while a polarizing mirror is used as the bending mirror immediately after chromatic decomposition, for example. In this case, however, when a mirror using a dielectric multilayer film is employed as the bending mirror immediately in front of the light valve, the purity in polarization enhanced by the polarizing mirror immediately after the chromatic decomposition may be lowered by the bending mirror immediately in front of the light valve. From this viewpoint, preferred is the case where the polarizing mirror is employed as at least the bending mirror immediately in front of the light valve as mentioned above, since the color light component is made incident on the light valve while keeping the high purity in polarization enhanced by the polarizing mirror.

The projection type display apparatus may comprise a color separating optical system for chromatically decomposing light from a light source into R, G, and B light components; a plurality of sets, for each color light component, of bending mirrors for respectively reflecting the R, G, and B light components chromatically decomposed by the color separating optical system, so as to change directions of optical axes thereof; first, second, and third light valves for respectively modulating the R, G, and B light components whose directions of optical axes are changed by the bending mirrors; a color combining optical system for chromatically combining together the R, G, and B light components respectively modulated by the first, second, and third light valves; and a projection optical system for projecting light chromatically combined by the color combining optical system; wherein each of the plurality of sets, for each color light component, of the bending mirrors is a mirror having a polarizing characteristic for causing reflected light to approach linearly polarized light.

In this apparatus, each of the R, G, and B light components chromatically decomposed by the color separating optical system is reflected by a plurality of bending mirrors a plurality of times, so as to change its direction of optical axis a plurality of times. Then, the R, G, and B light components with thus changed directions of optical axes are respectively made incident on the first, second, and third light valves. Since polarizing mirrors are used as the plurality of bending mirrors, all the color light components are made incident on their corresponding light valves by way of a plurality of polarizing mirrors, each of which is a polarizing mirror, whereby the purity in polarization of each color light component incident on the light valve is further enhanced, thus further improving the contrast of projection image. Unlike the polarizing beam splitter or bellows-configured polarization separating device as the preparatory polarizing device in the above-mentioned conventional projection type display apparatus, the polarizing mirror can be constituted by a glass substrate and a dielectric multilayer film, for example, thus being able to cut down the cost. Also, in this apparatus, since the polarizing mirror is used as the bending mirror inherent in the projection type display apparatus, the cost can further be cut down, and the size of the apparatus can be reduced.

The projection type display apparatus may comprise a color separating optical system for chromatically decomposing light from a light source into R, G, and B light components; at least one bending mirror for each color light component for reflecting the R, G, and B light components chromatically decomposed by the color separating optical system, so as to shift directions of optical axes thereof; first, second, and third polarizing beam splitters and first, second, and third reflection type light valves respectively corresponding to the R, G, and B light components; a color combining optical system; and a projection optical system; the first, second, and third polarizing beam splitters respectively separating, in terms of polarization, the R, G, and B light components with the directions of optical axes changed by the bending mirrors into two sets each of polarized light components; the first, second, and third reflection type light valves each modulating one of the polarized light components respectively in the R, G, and B light components separated in terms of polarization by the first, second, and third polarizing beam splitters; the first, second, and third polarizing beam splitters respectively analyzing the R, G, and B light components modulated by the first, second, and third reflection type light valves; the color combining optical system chromatically combining together the R, G, and B light components analyzed by the first, second, and third polarizing beam splitters; the projection optical system projecting light chromatically combined by the color combining optical system; wherein each of the bending mirrors is a mirror having a polarizing characteristic for causing reflected light to approach linearly polarized light.

This apparatus is a specific example in which a reflection type light valve is used as each of the first, second, and third light valves. Here, without being restricted to the reflection type light valve, the first, second, and third light valves may be transmission type light valves as well.

Preferably, in the above-mentioned mirror having a polarizing characteristic for causing reflected light to approach linearly polarized light, over substantially the whole wavelength region of color light incident on the mirror, S-polarized light incident thereon at a predetermined incident angle has a reflectivity of at least 90%, whereas the reflectivity of P-polarized light incident thereon at the predetermined incident angle is lower by at least 15% than the reflectivity of S-polarized light incident thereon at the predetermined incident angle. For example, such a mirror can have a configuration comprising a glass substrate and a dielectric multilayer film laminated thereon. Though such a basic configuration is similar to that of the conventional dichroic mirror, the above-mentioned characteristic can be attained when the thickness of each layer of the dielectric multilayer film or the like is changed. In the conventional dichroic mirror, in a high-reflectivity wavelength region, S-polarized light and P-polarized light have substantially the same reflectivity, thereby essentially failing to have a polarizing characteristic for causing reflected light to approach linearly polarized light. Here, the mirror used in the present invention having a polarizing characteristic for causing reflected light to approach linearly polarized light may be a dichroic mirror having a selectivity for reflection wavelength.

(Projection Type Display Apparatus of Fifth Embodiment)

In the following, a projection type display apparatus in accordance with its fifth embodiment using the above-mentioned mirrors will be explained with reference to FIG. 26.

Figure 26:
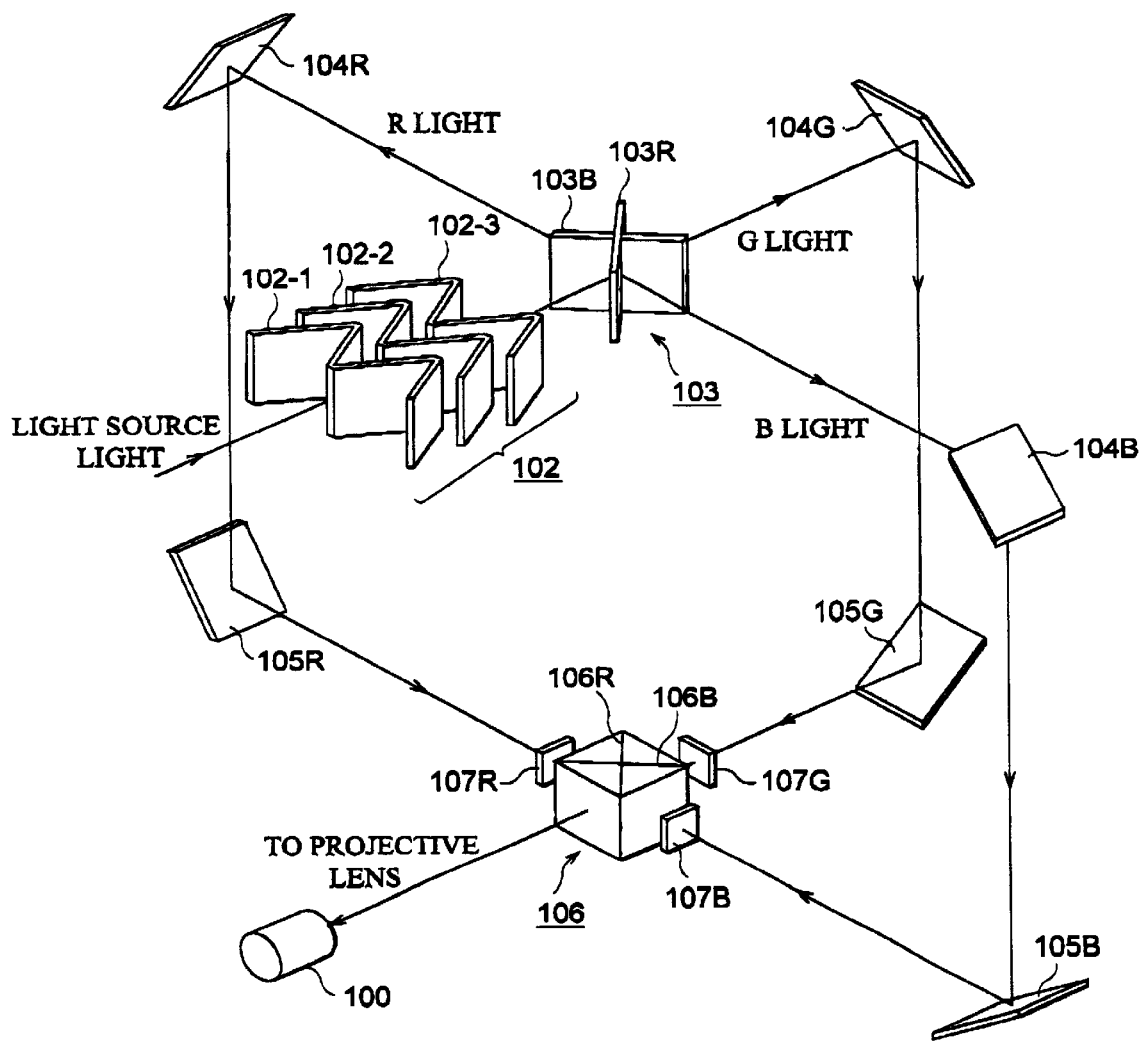
FIG. 26 is a schematic configurational view showing a projection type display apparatus in accordance with its fifth embodiment of the present invention.

FIG. 26 is a schematic configurational view showing the projection type display apparatus in accordance with this embodiment. For convenience of explanation, X, Y, and Z axes orthogonal to each other are defined as depicted.

In the projection type display apparatus in accordance with this embodiment, as shown in FIG. 26, white light emitted from a non-depicted light source advancing in -Z direction is made incident on a polarizing device 102 by way of an infrared absorbing filter and an ultraviolet absorbing filter which are not depicted.

Figure 30:
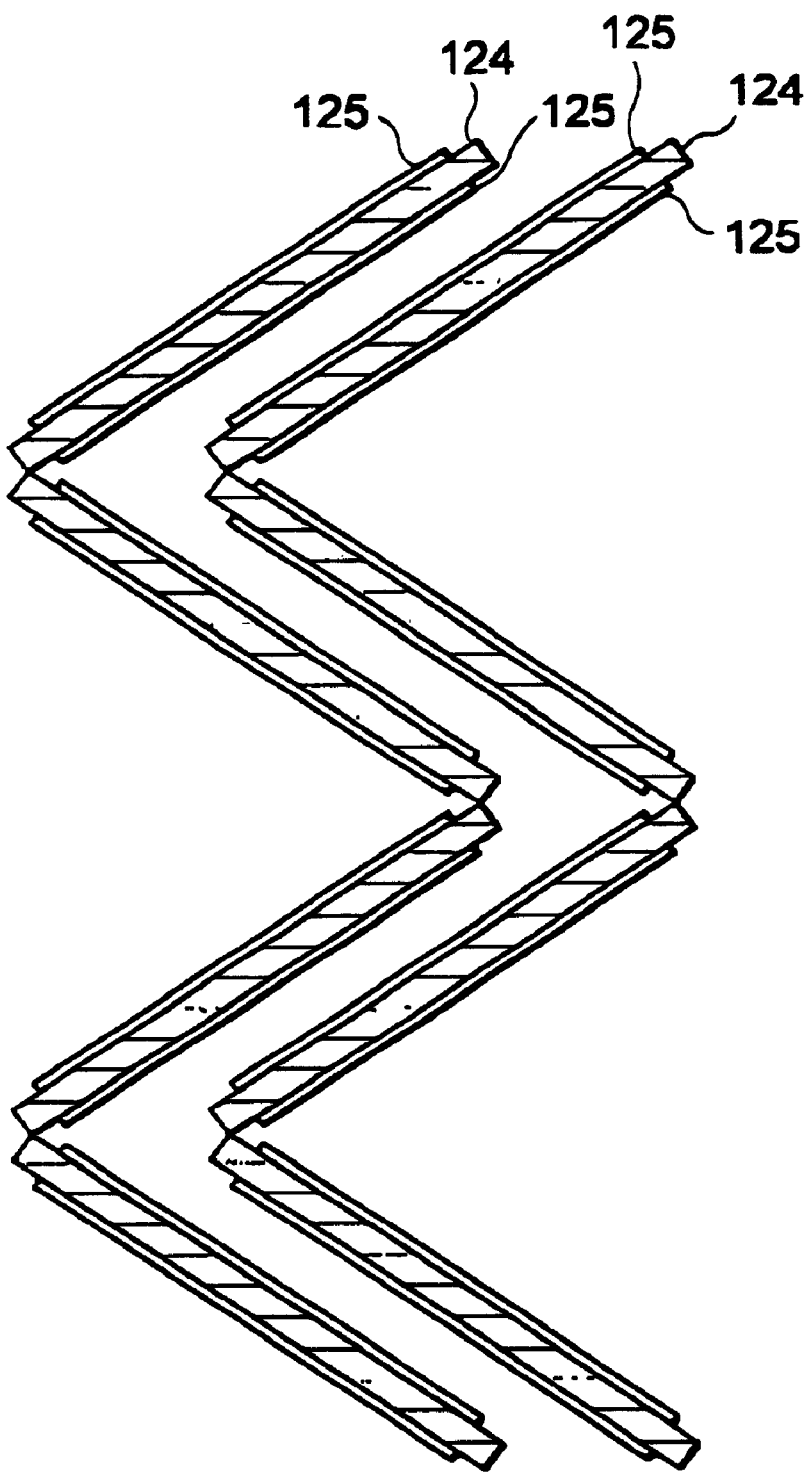
FIG. 30 is a view showing a polarizing device.

The polarizing device 102, as with the one disclosed in U.S. Pat. No. 5,357,370, is constituted by members 102-1, 102-2, and 102-3 each of which is made of a zigzag element configured such that, on both surfaces of a glass substrate, dielectrics having a refractive index higher than that of the glass substrate (e.g., materials having a refractive index of 2 or higher such as $TiO_2$, $ZrO_2$, and the like) are formed, while each member is disposed so as to form substantially a Brewster angle (about 72 degrees) with respect to the optical axis. FIG. 30 is a schematic configurational view showing the polarizing device disclosed in U.S. Pat. No. 5,357,370. As shown in FIG. 30, the polarizing device disclosed in this publication is made of members each of which is configured such that, on both surfaces of a glass substrate 124, dielectric films (optical thin films) 125 having a refractive index higher than that of the glass substrate 124 are respectively formed, while each member is disposed so as to form substantially a Brewster angle with respect to the optical axis. Two sheets of these members are arranged in a zigzag fashion. The zigzag form is employed here since it can attain a smaller size upon arrangement. When randomly polarized light from a light source is made incident on this polarizing device, P-polarized light can be selectively emitted therefrom as transmitted light with a predetermined performance. When a plurality of sheets are arranged, the number of their mutual actions can be increased, thus allowing substantially linearly polarized light with a higher purity to be emitted therefrom.

The light from the light source made incident on the polarizing device 102 is separated, in terms of polarization, into a pseudo second polarized light component reflected by the members 102-1, 102-2, and 102-3 constituting the polarizing device 102 (S-polarized light with respect to the surfaces of the constituent members of the polarizing device 102, which is referred to as "pseudo" since it is not completely linearly polarized light) and a pseudo first polarized light component transmitted therethrough (P-polarized light with respect to the surfaces of the constituent members of the polarizing device 102). When the polarizing device 102 is disposed in a configuration shown in FIG. 26, the pseudo first polarized light component transmitted therethrough in -Z direction is polarized light whose main component has a vibrating direction in parallel to XZ plane.

The pseudo first polarized light component transmitted through and emitted from the polarizing device 102 is made incident on a cross dichroic mirror 103 constituting a color separating optical system. In the cross dichroic mirror 103, a B light reflecting dichroic mirror 103B in which a dichroic film having a characteristic for reflecting B light while transmitting R light and G light therethrough is formed on a sheet glass substrate, and an R light reflecting dichroic mirror 103R in which a dichroic film having a characteristic for reflecting R light while transmitting B light and G light therethrough is formed on a sheet glass substrate are arranged in an X form so as to be orthogonal to each other. Each of the mirrors 103B and 103R is disposed so as to attain an incident angle of 45 degrees. The pseudo first polarized light component incident on the cross dichroic mirror 103 in -Z direction is chromatically decomposed into an R light component advancing in -X direction; a B light component advancing in X direction; and a G light component transmitted through the cross dichroic mirror 103, as it is, so as to advance in -Z direction.

In thus configured cross dichroic mirror 103, while the incident pseudo first polarized light component is chromatically decomposed by the mirror 103 as mentioned above, the state of polarization of each color light component emitted therefrom as being chromatically decomposed is disturbed, whereby its purity in polarization (ratio between P-polarized and S-polarized light components) becomes lower than that of the polarized light incident on the mirror 103. In particular, the R and B light components, which are reflected and chromatically decomposed, have a purity lower than that of the transmitted G light component.

The R, G, and B light components chromatically decomposed by the cross dichroic mirror 113 are respectively reflected by bending mirrors 104R, 104G, and 104B so as to advance with their optical axes shifted to -Y direction. As each of the bending mirrors 104R, 104G, and 104B, a normal dielectric multilayer film mirror is used. As reflected by the mirrors 104R, 104G, and 104B, the purity in polarization further decreases in each of the color light components.

The respective color light components reflected by the reflective bending mirrors 104R, 104G, and 104B are reflected by bending mirrors 105R, 105G, and 105B, each employing a mirror having a polarizing characteristic for causing reflected light to approach linearly polarized light. Accordingly, with their optical axes being bent, R, G, and B light components respectively advance in X, Z, and -X directions so as to be made incident on light valves 107R, 107G, and 107B. In this embodiment, since the respective color light components are made incident on the bending mirrors 105R, 105G, and 105B at an incident angle of 45 degrees, of the mirrors in accordance with the above-mentioned embodiments thereof, those optimized for light incident thereon at an incident angle of 45 degrees are employed as the bending mirrors 105R, 105G, and 105B. Specifically, the mirror shown in FIG. 11 or 15 can be employed as the bending mirror 105R, the mirror shown in FIG. 9 or 13 can be employed as the bending mirror 105G, and the mirror shown in FIG. 1 can be used as the bending mirror 105B.

The R, G, and B light components chromatically decomposed by the cross dichroic mirror 103 are respectively made incident, at an incident angle of 45 degrees, on the bending mirrors 105R, 105G, and 105B employing the mirrors in accordance with the above-mentioned embodiments thereof, and are reflected thereby according to their reflection characteristics including the polarization separating characteristics mentioned in the above-mentioned embodiments thereof. Since each of the bending mirrors 105R, 105G, and 105B is thus effective in reflecting light while improving the purity in polarization thereof, a first polarized light component having a favorable purity can be reflected thereby, thus improving the purity of polarized light that has been lowered as its state of polarization is disturbed by the cross dichroic mirror 103 and bending mirrors 104R, 104G, and 104B. The first polarized light component has a direction of polarization penetrating through the polarizing device 102 (the P direction as viewed from the polarizing device 102), which is also in the P direction as viewed from the cross dichroic mirror 103, while being in the S direction as viewed from the reflecting surfaces of the bending mirrors 104R, 104B, and 104G and those of the bending mirrors 105R, 105B, and 105G having polarization separating functions.

The respective color light components reflected by the bending mirrors 105R, 105B, and 105G having polarization separating functions are made incident on their corresponding transmission type light valves 107R, 107B, and 107G.

The respective color light components reflected by the bending mirrors 105R, 105G, and 105B each having the polarization separating function are made incident on their corresponding transmission type light valves 107R, 107G, and 107B, and are emitted therefrom after being modulated by their respective color signals according to the above-mentioned function. The emitted modulated light becomes a second modulated light component whose vibrating direction is rotated by 90 degrees from that of the first polarized light component incident on the light valves 107R, 107G, and 107B.

The modulated light components emitted from the light valves 107R, 107G, and 107B for the respective color light components are made incident on a cross dichroic prism 106, which constitutes a color combining optical system, at directions different from each other, i.e., the R, G, and B light components are incident thereon in X, Z, and -X directions, respectively.

The cross dichroic prism 106 has a configuration in which four pieces of rectangular equilateral triangle prisms are bonded together by an adhesive such that R light reflecting dichroic films 106R and B light reflecting dichroic films 106B formed at their side faces are orthogonal to each other in an X form.

The R light component transmitted through the light valve 107R in X direction so as to be made incident on the cross dichroic prism 106 is reflected by the R light reflecting dichroic film 106R and, with its optical axis shifted to Z direction, is emitted from the prism 106 in Z direction. The G light component transmitted through the light valve 107G in 2 direction so as to be made incident on the cross dichroic prism 106 is transmitted through the dichroic films 106R and 106B, so as to be emitted from the prism 106, as it is, in Z direction. The B light transmitted through the light valve 107B in -X direction so as to be made incident on the cross dichroic prism 106 is reflected by the B light reflecting dichroic film 106B and, with its optical axis shifted to Z direction, is emitted from the prism 106 in Z direction.

Thus, the respective color light components modulated by their corresponding light valves 107R, 107G, and 107B are chromatically combined together by the cross dichroic prism 106, and thus combined light is emitted from the cross dichroic prism 106 in Z direction. Though each color light component incident on the dichroic prism 106 is the second polarized light component as mentioned above, its incident angle with respect the dichroic films 106R and 106B of the dichroic prism 106 is in the S direction. This is an ideal vibrating direction of polarization as a reflection characteristic for dichroic films.

The composite light emitted from the cross dichroic prism 106 is made incident on a projective lens 100 as a projection optical system so as to be projected onto a screen (not depicted) as a full-color projection image.

As explained in the foregoing, in the projection type display apparatus in accordance with this embodiment, even when the purity of polarization is lowered by the cross dichroic mirror 103 and bending mirrors 104R, 104G, and 104B, since the mirrors having polarization separating functions in accordance with the above-mentioned embodiments thereof are used as the bending mirrors 105R, 105G, and 105B located immediately in front of the places where the respective color light components are made incident on the light valves 107R, 107G, and 107B, the color light components can be made incident on the light valves 107R, 107G, and 107B with their purity in polarization enhanced again to a favorable level. Consequently, the apparatus can project a favorable projection image with a contrast much better than that in the conventional projection type display apparatus.

Though normal dielectric multilayer film mirrors are used as the bending mirrors 104G, 104R, and 104B for reflecting the respective color light components chromatically decomposed by the cross dichroic mirror 103 constituting the color separating optical system in this embodiment, metal mirrors, for example, may also be used as these bending mirrors. While a metal mirror does not substantially generate disturbance in polarization of light reflected thereby, it is disadvantageous in that the reflectivity thereof is lower than that of the dielectric multilayer film mirror. when the metal mirrors are used as the bending mirrors 104G, 104R, and 104B, the purity in polarization of the G light component transmitted through the cross dichroic mirror 103 is not so disturbed as compared with that of the R and B light components, whereby a normal mirror may be used as the bending mirror 105G instead of the mirror having the polarization separating function in accordance with the above-mentioned embodiments thereof.

Though the mirrors in accordance with the above-mentioned embodiments thereof are used only as the bending mirrors 105R, 105G, and 105B located immediately in front of places where the respective color light components are made incident on the light valves 107R, 107G, and 107B in this embodiment; in a projection type display apparatus such as that of this embodiment having a configuration in which two sets for each color light component of the bending mirrors 104R, 105R, 104G, 105G, 104B, and 105B are disposed for the respective color light components after chromatic decomposition, the mirrors in accordance with the above-mentioned embodiments thereof may also be used for both sets of the bending mirrors 104R, 105R, 104G, 105G, 104B, and 105B for the respective color light components. In this case, the respective color light components reflected by the first bending mirrors 104R, 104G, and 104B become polarized light components having a high purity of S polarization. Since the S directions with respect to the first bending mirrors 104R, 104G, and 104B coincide with the S directions with respect to their corresponding bending mirrors 105R, 105G, and 105B used for the second reflection, the S-polarized light in each color light component is subjected to polarization separating characteristics of two mirrors in accordance with the above-mentioned embodiments thereof in a superposing fashion, whereby linearly polarized light components with much better purity can be made incident on the light valves 107R, 107G, and 107B, thus allowing a projection image to be obtained with a further favorable contrast.

(Projection Type Display Apparatus of Sixth Embodiment)

In the following, a projection type display apparatus in accordance with its sixth embodiment using the above-mentioned mirrors will be explained with reference to FIG. 27.

Figure 27:
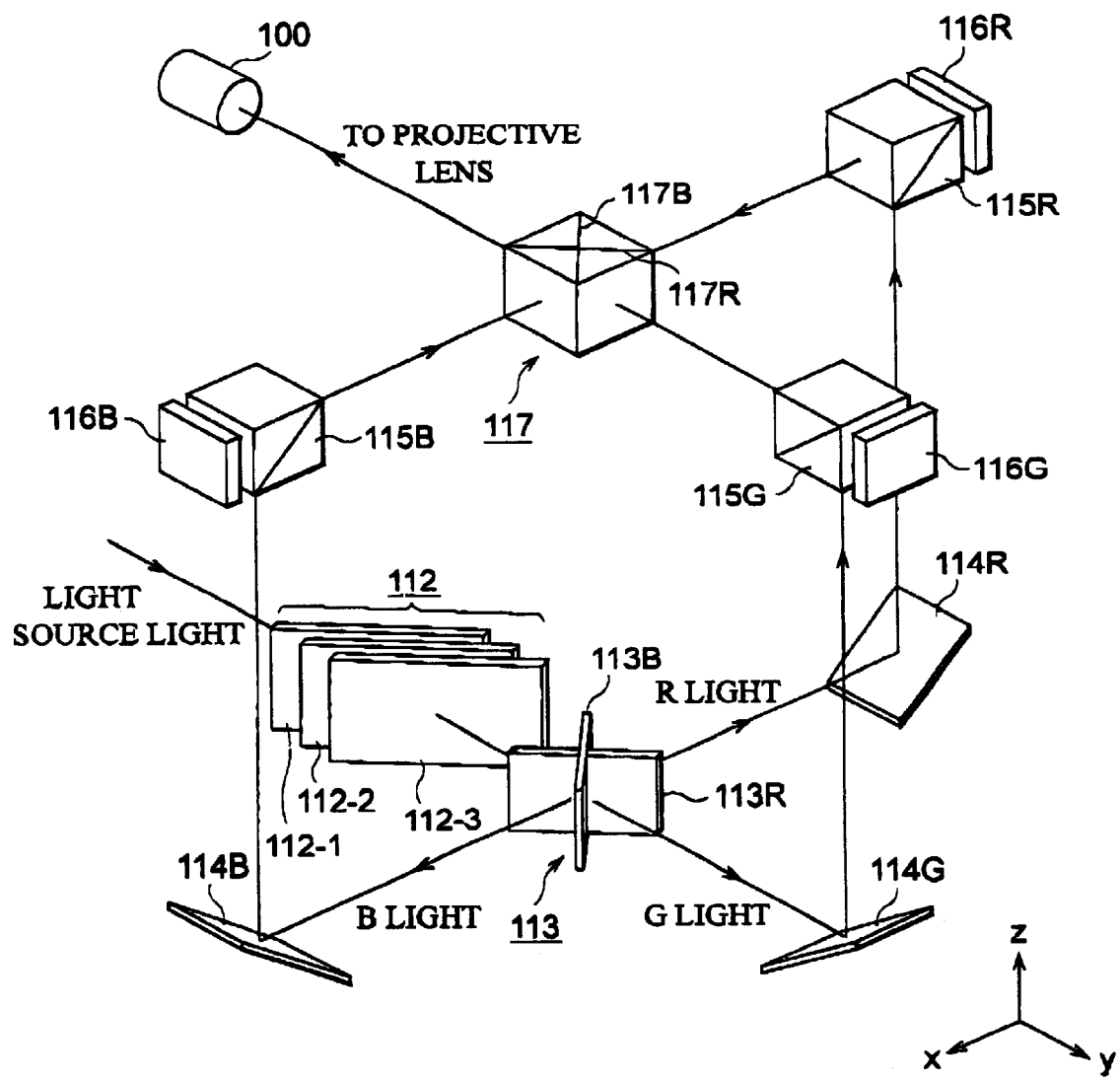
FIG. 27 is a schematic configurational view showing a projection type display apparatus in accordance with its sixth embodiment of the present invention.

FIG. 27 is a schematic configurational view showing the projection type display apparatus in accordance with this embodiment. For convenience of explanation, X, Y, and Z axes orthogonal to each other are defined as depicted.

While the projection type display apparatus in accordance with the fifth embodiment is the one using the transmission type light valves, the projection type display apparatus in accordance with this embodiment is the one using optically writable or electrically writable reflection type light valves.

In the projection type display apparatus in accordance with this embodiment, as shown in FIG. 27, white light emitted from a non-depicted light source advancing in Y direction is made incident on a polarizing device 112 by way of an infrared absorbing filter and an ultraviolet absorbing filter which are not depicted. In the polarizing device 112, a plurality of sheets of members (three sheets of members 112-1, 112-2, and 112-3 in this embodiment), each of which comprises a glass substrate and a film, having a refractive index greater than that of the glass substrate, formed on one surface or both surfaces of the glass substrate, are arranged so as to form substantially a Brewster angle (about 72 degrees) with respect to an axis of incidence (Y axis). In this embodiment, each of the members 112-1, 112-2, and 112-3 is configured not in a zigzag fashion but in a flat form. In the arrangement shown in FIG. 27, as with this embodiment, a major part of transmitted light from the polarizing device 112 becomes a first polarized light component (P-polarized light component) and is made incident on the dichroic mirror 113.

The pseudo first polarized light component transmitted through and emitted from the polarizing device 112 is made incident on a cross dichroic mirror 113 constituting a color separating optical system. In the cross dichroic mirror 113, a B light reflecting dichroic mirror 113B and an R light reflecting dichroic mirror 113R are arranged in an X form so as to be orthogonal to each other. Each of the mirrors 113B and 113R is disposed so as to attain an incident angle of 45 degrees. The pseudo first polarized light component incident on the cross dichroic mirror 113 in Y direction is chromatically decomposed into an R light component advancing in -X direction; a B light component advancing in X direction; and a G light component transmitted through the cross dichroic mirror 113, as it is, so as to advance in Y direction.

In thus configured cross dichroic mirror 113, while the incident pseudo first polarized light component is chromatically decomposed by the mirror 113 as mentioned above, the state of polarization of each color light component emitted therefrom as being chromatically decomposed is disturbed, whereby its purity in polarization (ratio between P-polarized and S-polarized light components) becomes lower than that of the polarized light incident on the mirror 113. In particular, the R and B light components, which are reflected and chromatically decomposed, have a purity lower than that of the transmitted G light component.

The R, G, and B light components chromatically decomposed by the cross dichroic mirror 113 are respectively reflected by bending mirrors 114R, 114G, and 114B, each employing a mirror having a polarizing characteristic for causing reflected light to approach linearly polarized light, so as to shift their optical axes to Z direction and be made incident on their corresponding polarizing beam splitters 115R, 115G, and 115B. In this embodiment, since the respective color light components are made incident on the bending mirrors 114R, 114G, and 114B at an incident angle of 45 degrees, of the mirrors in accordance with the above-mentioned embodiments thereof, those optimized for light incident thereon at an incident angle of 45 degrees are employed as the bending mirrors 114R, 114G, and 114B. Specifically, the mirror shown in FIG. 11 or 15 can be employed as the bending mirror 114R, the mirror shown in FIG. 9 or 13 can be employed as the bending mirror 114G, and the mirror shown in FIG. 1 can be used as the bending mirror 114B.

The R, G, and B light components chromatically decomposed by the cross dichroic mirror 113 are respectively made incident, at an incident angle of 45 degrees, on the bending mirrors 114R, 114G, and 114B employing the mirrors in accordance with the above-mentioned embodiments thereof, and are reflected thereby according to their reflection characteristics including the polarization separating characteristics mentioned in the above-mentioned embodiments thereof. Since each of the bending mirrors 114R, 114G, and 114B is thus effective in reflecting light while improving the purity in polarization thereof, a first polarized light component having a favorable purity can be reflected thereby, thus improving the purity of polarized light that has been lowered as its state of polarization is disturbed by the cross dichroic mirror 113. The first polarized light component has a direction of polarization penetrating through the polarizing device 112 (the P direction as viewed from the polarizing device 112), which is also in the P direction as viewed from the cross dichroic mirror 113, while being in the S direction as viewed from the reflecting surfaces of the bending mirrors 114R, 114G, and 114B. That is, the bending mirrors 114R, 114G, and 114B are disposed such that the vibrating direction of the first polarized light component with respect to these mirrors is in the S direction, thereby ensuring that the reflected light improves its purity in polarization.

The respective color light components reflected by the bending mirrors 114R, 114G, and 114B, which have polarization separating functions, are made incident, with their purity in polarization enhanced and directions of their optical axes shifted to Z direction, on their corresponding polarizing beam splitters 115R, 115G, and 115B.

The polarizing beam splitters 115R, 115G, and 115B are disposed such that S directions of polarization with respect the mirrors 114R, 114G, and 114B become S directions with respect to the polarization separating films of their corresponding polarizing beam splitters 115R, 115G, and 115B. The respective color light components reflected by the bending mirrors 114R, 114G, and 114B and made incident on the polarizing beam splitters 115R, 115G, and 115B in Z direction, each of which has a larger amount of S-polarized light component than P-polarized light component as mentioned above, are separated in terms of polarization by the polarizing beam splitters 115R, 115G, and 115B into S-polarized light components which are reflected by the polarization separating films of the polarizing beam splitters 115R, 115G, and 115B so as to be made incident on reflection type light valves 116R, 116G, and 116B, and P-polarized light components which are transmitted through the polarizing beam splitters 115R, 115G, and 115B so as to be discarded. Thus, the S-polarized light components of the respective colors further subjected to the polarization separating characteristics of the polarizing beam splitters 115R, 115G, and 115B are made incident on the light valves 116R, 116G, and 116B as reading light, whereby the S-polarized light components of the respective colors incident on the light valves 116R, 116G, and 116B each have a further higher purity of polarization and become favorable.

In this embodiment, an optically writable reflection type light valve is used as each of the light valves 106R, 106G, and 106B.

Already explained above are the structure and function of the optically writable reflection type light valve. It can be understood that, since the optically writable reflection type light valve has the above-mentioned function, the higher is the purity in polarization of linearly polarized light incident on the light valve, the more favorable can become the contrast of the projection image obtained.

The light valves used in the projection type display apparatus in accordance with the present invention should not be restricted to the above-mentioned optically writable reflection type light valve. For example, usable is an electrically writable reflection type light valve which is similarly a reflection type light valve and in which switching is effected by TFT, a nonlinear device, with electric signals, so that the alignment of a liquid crystal modulating layer portion of thus switched pixel is changed so as to be used as a modulating layer. Since no optically writable optical system is necessary, this configuration can contribute to reducing the size of the apparatus.

In the electrically writable reflection type light valve, a higher purity in polarization is similarly required for the incident linearly polarized light. Accordingly, also in the case where an electrically writable reflection type light valve is employed as each of the light valves 116R, 116G, and 116B, the enhanced purity in polarization of the respective color light components reflected by the bending mirrors 114R, 114G, and 114B employing the mirrors in accordance with the above-mentioned embodiments can be further enhanced due to the extinguishing ratios of the polarizing beam splitters 115R, 115G, and 115B, before being made incident on the light valves 116R, 116G, and 116B. Accordingly, light with a favorable contrast can be emitted from each of the light valves 116R, 116G, and 116B.

The S-polarized R, G, and B light components respectively made incident on the light valves 116R, 116G, and 116B are modulated in response to writing light beams for the respective colors and are reflected thereby so as to be emitted therefrom as modulated light, which are then made incident on the polarizing beam splitters 115R, 115G, and 115B again. In the modulated light of each color, due to the above-mentioned function, there are concurrently a P-polarized light component at the part selected in response to the writing light beam for each color and an S-polarized light component at the part not selected. The modulated light components respectively incident on the polarizing beam splitters 115R, 115G, and 115B are analyzed thereby. Thus, of the modulated light of each color, only the P-polarized light component is transmitted through the polarization separating film of its corresponding polarizing beam splitter 115R, 115G, or 115B so as to advance toward a cross dichroic prism 117 as a color combining optical system (i.e., analyzed), whereas the S-polarized light component is reflected by the polarization separating film of its corresponding polarizing beam splitter 115R, 115G, or 115B so as to be discarded along -Z direction.

The analyzed light components of the respective colors emitted from their corresponding polarizing beam splitters 115R, 115G, and 115B are emitted in directions opposite to their incident directions with respect to the bending mirrors 114R, 114G, and 114B for the respective colors when chromatically decomposed by the cross dichroic mirror 113 as the color separating optical system, so as to be made incident on the color combining optical system constituted by the cross dichroic prism 117.

The cross dichroic prism 117 has a configuration in which four pieces of rectangular equilateral triangle prisms are bonded together by an adhesive such that R light reflecting dichroic films 117R and B light reflecting dichroic films 117B formed at their side faces are orthogonal to each other in an X form.

The analyzed light component of R light emitted from the polarizing beam splitter 115R in X direction so as to be made incident on the cross dichroic prism 117 is reflected by the R light reflecting dichroic film 117R and, with its optical axis shifted to -Y direction, is emitted from the prism 117 in -Y direction. The analyzed light component of B light emitted from the polarizing beam splitter 115B in -X direction so as to be made incident on the cross dichroic prism 117 is reflected by the B light reflecting dichroic film 117B and, with its optical axis shifted to -Y direction, is emitted from the prism 117 in -Y direction. The analyzed light component of G light emitted from the polarizing beam splitter 115G in -Y direction so as to be made incident on the cross dichroic prism 117 is transmitted through the dichroic films 117R and 117G so as to be emitted from the prism 117, as it is, in -Y direction. Though the analyzed light emitted by each of the polarizing beam splitters 115R, 115G, and 115R is the P-polarized light component, it would become incident on the surfaces of the dichroic films 117R and 117B of the cross dichroic prism 117 in the S direction. Accordingly, linearly polarized light having an ideal vibrating direction can be made incident on the surfaces of the dichroic films 117R and 117B.

As a consequence, the color light components modulated by the respective light valves 116R, 116G, and 116B and analyzed by their corresponding polarizing beam splitters 115R, 115G, and 115B are chromatically combined by the cross dichroic prism 117, and thus combined light is emitted from the cross dichroic prism 117 in -Y direction. The composite light emitted from the cross dichroic prism 117 is made incident on a projective lens 100 as a projection optical system so as to be projected onto a screen (not depicted) as a full-color projection image.

As explained in the foregoing, in the projection type display apparatus in accordance with this embodiment, the purity in polarization of polarized light once lowered by the cross dichroic mirror 113 can be enhanced by the bending mirrors 114R, 114G, and 114B that employ the mirrors of the above-mentioned embodiments thereof, and these polarized light components can be made incident on the light valves. Consequently, this apparatus can project a projection image with much better contrast as compared with the above-mentioned conventional projection type display apparatus.

(Projection Type Display Apparatus of Seventh Embodiment)

In the following, a projection type display apparatus in accordance with a seventh embodiment of the present invention using the above-mentioned mirrors will be explained with reference to FIGS. 28 and 29.

Figure 28:
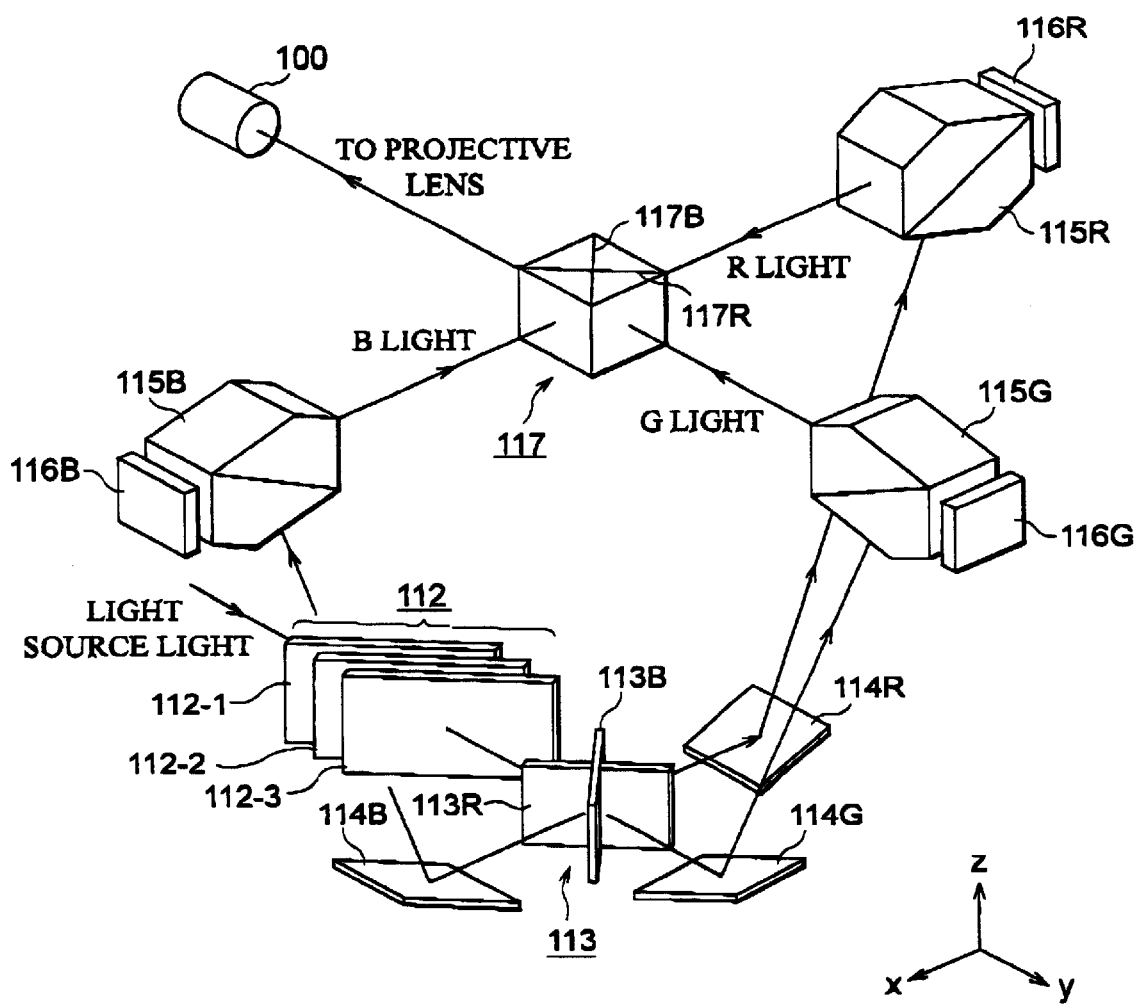
FIG. 28 is a schematic configurational view showing a projection type display apparatus in accordance with its seventh embodiment of the present invention.

FIG. 28 is a schematic configurational view showing the projection type display apparatus in accordance with this embodiment. For convenience of explanation, X, Y, and Z axes orthogonal to each other are defined as depicted. FIG. 29 is a view showing the optical system for B light in FIG. 28 as observed in -Y direction. In FIGS. 28 and 29, constituents identical or equivalent to those in FIG. 27 are referred to with numerals or letters identical thereto, without their overlapping explanations being repeated.

The projection type display apparatus in accordance with this embodiment basically differs from that in accordance with the above-mentioned sixth embodiment in the forms of polarizing beam splitters 115R, 115G, and 115B used for separating, in terms of polarization, the color light components that have been chromatically decomposed by a cross dichroic mirror 113 as a color separating optical system. Namely, in this embodiment, a glass material having a refractive index of 1.52, so-called BK7, is used as prisms constituting the polarizing beam splitters 115R, 115G, and 115B, whereby the incident angle with respect to the polarization separating film of each of the polarizing beam splitters 115R, 115G, and 115B is most efficiently set at 54.6 degrees.

Figure 29:
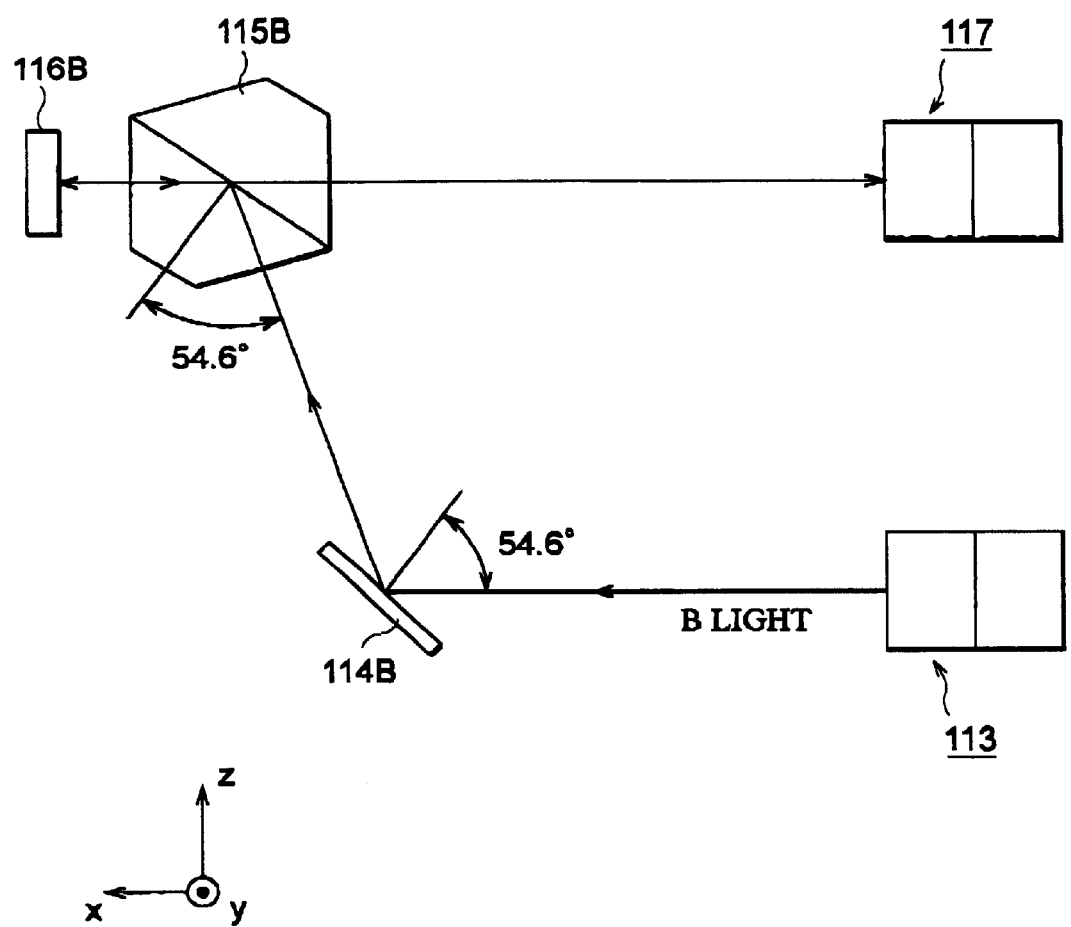
FIG. 29 is a view observing an optical system concerning the B light component in FIG. 28 along -Y direction.

From this viewpoint, as shown in FIGS. 28 and 29, each of the polarizing beam splitters 115R, 115G, and 1153 is formed into an irregular hexagonal prism as a whole in which the entrance surface and exit surface thereof are perpendicular to the optical axis and that the incident angle with respect to each polarization separating film thereof becomes 54.6 degrees as mentioned above.

Also, in this embodiment, in order for the respective color light components to be made incident on the polarization separating films of the polarizing beam splitters 115R, 115G, and 115B at an incident angle of 54.6 degrees, bending mirrors 114R, 114G, and 114B are disposed such that their corresponding color light components are made incident thereon at an incident angle of 54.6 degrees as shown in FIGS. 28 and 29. Therefore, in this embodiment, of the mirrors in accordance with the above-mentioned embodiments thereof, those optimized for light incident thereon at an incident angle of 54.6 degrees are employed as the bending mirrors 114R, 114G, and 114B. Specifically, the mirror shown in FIG. 17 can be used as the bending mirror 114B for B light.

In this embodiment, the B light component chromatically decomposed by the cross dichroic mirror 113 advances in X direction so as to be made incident on the bending mirror 114B at an incident angle of 54.6 degrees and reflected thereby, thus entering the polarizing beam splitter 115B so as to be made incident on the polarization separating film thereof at an incident angle of 54.6 degrees. The S-polarized light component of B light separated by the polarization separating film advances in X direction and is emitted from the polarizing beam splitter 115B so as to be made incident on a reflection type light valve 116B. The B light component modulated by the light valve 116B reenters the polarizing beam splitter 115B so as to be made incident on its polarization separating film at an incident angle of 54.6 degrees, thereby being subjected to an analyzing action of the polarization separating film. The analyzed light component of B light advances in -X direction so as to be made incident on a cross dichroic prism 117 as a color combining optical system, where it is chromatically combined with the analyzed light components of R light and G light which are obtained in a manner similar to that of the above-mentioned B light.

The projection type display apparatus in accordance with this embodiment can yield advantages similar to those of the projection type display apparatus in accordance with the above-mentioned sixth embodiment.

Each of the above-mentioned projection type display apparatus in accordance with the fifth to seventh embodiments is a projection type display apparatus having a two-story structure in which the direction of optical axis of each of chromatically decomposed color light components is changed by the mirror in accordance with the present invention, while a color combining optical system is disposed above or below the color separating optical system. Nevertheless, also in a projection type display apparatus of a one-story structure in which both the color separating optical system and color combining optical system are disposed on the same plane, as long as it is a projection type display apparatus in which the respective color light components chromatically decomposed by the color separating optical system are made incident on their corresponding light valves, while the light components emitted from the light valves are chromatically combined together, and a bending mirror for at least one color light component is located at a position downstream the place where it is chromatically decomposed but upstream the place where it enters its corresponding light valve; when a mirror having a polarizing function in accordance with one of the above-mentioned embodiments thereof is used as the bending mirror, the purity in polarization can be enhanced for thus bent light, whereby the contrast of projection light can be improved.

Figure 31:
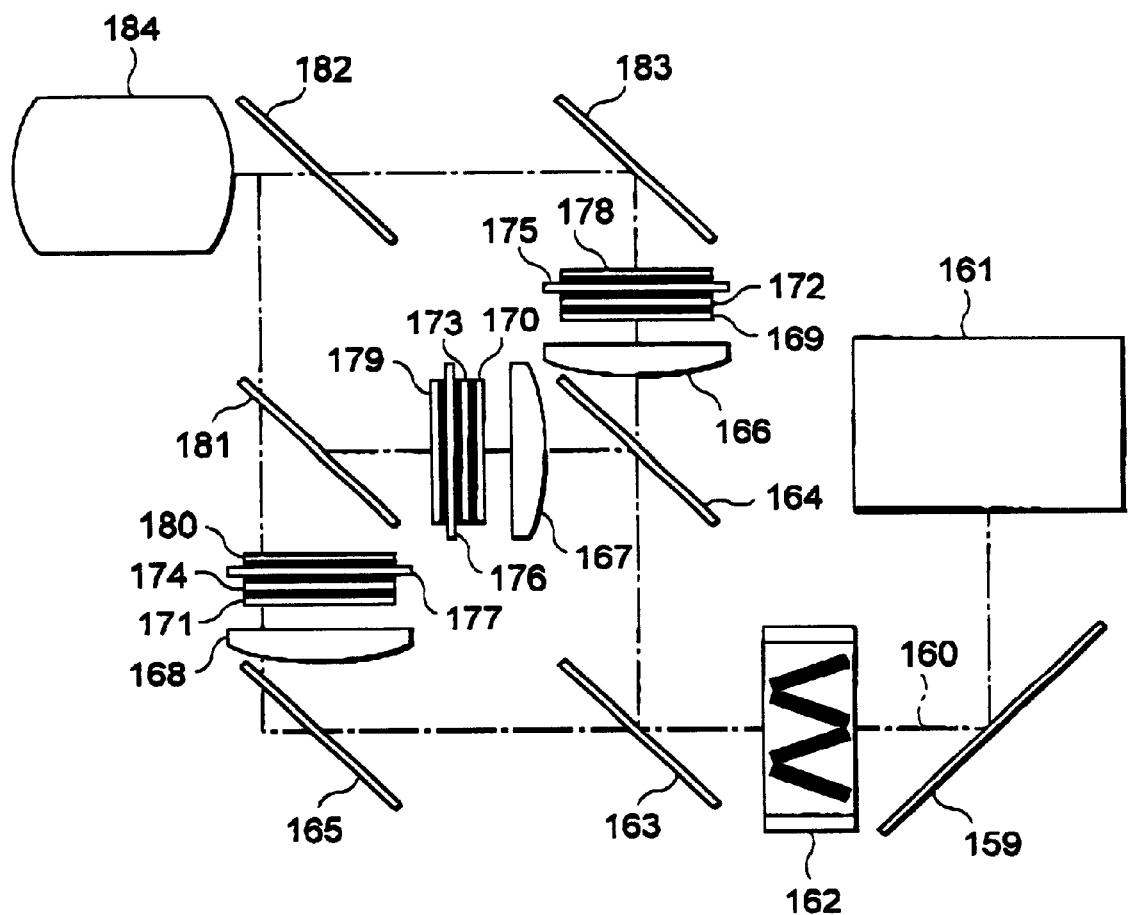
FIG. 31 is a view showing a projection type display apparatus

An example of such projection type display apparatus with a one-story structure is a projection type display apparatus shown in FIG. 31, in which the mirror in accordance with one of the above-mentioned examples thereof is employed as a bending mirror 165.

FIG. 31 is a schematic configurational view showing the projection type display apparatus disclosed in U.S. Pat. No. 5,357,370, using the above-mentioned polarizing device. In this projection type display apparatus, the polarizing device is used for preparatorily separating light from a light source in terms of polarization. The light emitted from a light source 161 is made incident on a polarizing device 162 (the one shown in FIG. 30) by way of a bending mirror 159, and is transmitted therethrough to become substantially linearly polarized light, which is made incident on a color separating optical system comprising dichroic mirrors 163 and 164, thereby being decomposed into three primary color light components (R (red), G (green), and B (blue) light components). Only one of the chromatically decomposed light components is reflected by the bending mirror 165 and thereby changes its direction of optical axis. The respective primary color light components are successively transmitted through field lenses 166, 167, and 168; half-wave plates 169, 170, and 171; entrance-side polarizing plates 172, 173, and 174; liquid crystal cells 175, 176, and 177; and exit-side polarizing plates 178, 179, and 180. The light components emitted from their corresponding exit-side polarizing plates 178, 179, and 180 are chromatically combined together by a color combining optical system which is constituted by dichroic mirrors 181 and 182 and a plane mirror 183, and the resulting composite light is projected by a projective lens 184. Here, each of the groups of the above-mentioned members 172, 175, and 178; members 173, 176, and 179; and members 174, 177, and 180 respectively constitute transmission type light valves. In FIG. 31, the optical axis is indicated by 160.

Though the embodiments of the present invention are explained in the foregoing, the present invention should not be restricted to these embodiments.

For example, in place of the polarizing device 102 in FIG. 26 or the polarizing device 112 in FIG. 27, a polarizing beam splitter or any other polarizing device may be used.

While the mirrors having a polarizing characteristic optimized for an incident angle of 45 degrees are used in the projection type display apparatus in accordance with the fifth and sixth embodiments, and the mirrors having a polarizing characteristic optimized for an incident angle of 54.6 degrees are used in the projection type display apparatus in accordance with the seventh embodiment, the projection type display apparatus may also be configured so as to use a mirror optimized for an incident angle of 65 degrees, such as that shown in FIG. 5.

As explained above, in accordance with the present invention, linearly polarized light having a favorable purity can be made incident on a light valve so as to yield a projection image with a good contrast, without increasing the cost and size of the apparatus.

As explained in the foregoing, the projection type display apparatus comprises a polarizing device for preparatorily separating light from a light source in terms of polarization; a color separating optical system for chromatically decomposing thus preparatorily separated light into R, G, and B light components; at least one bending mirror for reflecting at least one color light component of the R, G, and B light components chromatically decomposed by the color separating optical system, so as to change a direction of optical axis thereof; first, second, and third light valves for respectively modulating the R, G, and B light components including the color light component with the direction of optical axis changed by the at least one bending mirror; a color combining optical system for chromatically combining together the R, G, and B light components respectively modulated by the first, second, and third light valves; and a projection optical system for projecting light chromatically combined by the color combining optical system, wherein the at least one bending mirror is a mirror having a polarizing characteristic for causing reflected light to approach linearly polarized light.

In this apparatus, the light from the light source is preparatorily separated by the polarizing device in terms of polarization, and then is chromatically decomposed by the color separating optical system into R, G, and B light components. At least one color light component of the R, G, and B light components chromatically decomposed by the color separating optical system is reflected by at least one bending mirror which is a mirror having a polarizing characteristic for causing reflected light to approach linearly polarized light (hereinafter referred as "polarizing mirror" for convenience of explanation), so as to change its direction of optical axis. Then, the R, G, and B light components including the color light component with thus changed direction of optical axis are respectively made incident on the first, second, and third light valves. Accordingly, the respective color light components are made incident on the first, second and third light valves after their purity in polarization is enhanced by the above-mentioned polarizing device before being chromatically decomposed. Therefore, as with the above-mentioned conventional projection type display apparatus, the purity in polarization of light incident on each light valve is enhanced, thereby improving the contrast of projection image. Also, in this aspect of the present invention, after chromatic decomposition, the above-mentioned at least one color light component is made incident on the light valve by way of the bending mirror, which is a polarizing mirror. Accordingly, even when the purity in polarization of the color light component once enhanced by the polarizing device is disturbed by the color separating optical system or the like, the color light component would be made incident on the light valve after its purity in polarization is enhanced again by the bending mirror. Consequently, as compared with the above-mentioned conventional projection type display apparatus, the purity in polarization of light incident on the light valve is further enhanced, thus further improving the contrast of projection image. Since the polarizing mirror can be constituted by a glass substrate and a dielectric multilayer film, for example, it is inexpensive and occupies only a very small space. Also, in this aspect of the present invention, since the polarizing mirror is used as the bending mirror inherent in the projection type display apparatus, the cost can further be cut down, and the size of the apparatus can be reduced.

The projection type display apparatus may comprise a polarizing device for preparatorily separating light from a light source in terms of polarization; a color separating optical system for chromatically decomposing the light preparatorily separated by the polarizing device into R, G, and B light components; at least one for each color light component of bending mirrors for respectively reflecting the R, G, and B light components chromatically decomposed by the color separating optical system, so as to change directions of optical axes thereof; first, second, and third valves for respectively modulating the R, G, and B light components whose directions of optical axes are changed by the bending mirrors; a color combining optical system for chromatically combining together the R, G, and B light components respectively modulated by the first, second, and third light valves; and a projection optical system for projecting light chromatically combined by the color combining optical system, wherein each of the bending mirrors is a mirror having a polarizing characteristic for causing reflected light to approach linearly polarized light.

In this apparatus, the light from the light source is preparatorily separated by the polarizing device in terms of polarization, and then is chromatically decomposed by the color separating optical system into R, G, and B light components. Each of thus chromatically decomposed R, G, and B light components is reflected by at least one bending mirror which is a polarizing mirror, so as to change its direction of optical axis. Then, the R, G, and B light components including the color light component with thus changed direction of optical axis are respectively made incident on the first, second, and third light valves. Accordingly, as with the above-mentioned conventional projection type display apparatus, the respective color light components are made incident on the first, second and third light valves after their purity in polarization is enhanced by the above-mentioned polarizing device before being chromatically decomposed. Therefore, the purity in polarization of light incident on each light valve is enhanced, thereby improving the contrast of projection image. Also, in this apparatus, after chromatic decomposition, all the color light components are made incident on their corresponding light valves by way of the bending mirrors, each of which is a polarizing mirror. Accordingly, even when the purity in polarization of the color light component once enhanced by the polarizing device is disturbed by the color separating optical system or the like, all the color light components would be made incident on their corresponding light valves after their purity in polarization is enhanced again by the bending mirrors. Consequently, as compared with the above-mentioned conventional projection type display apparatus, the purity in polarization of light incident on the light valve is further enhanced, thus further improving the contrast of projection image. Since the polarizing mirror can be constituted by a glass substrate and a dielectric multilayer film, for example, it is inexpensive and occupies only a very small space. Also, in this apparatus, since the polarizing mirror is used as the bending mirror inherent in the projection type display apparatus, the cost and size of the apparatus are prevented from increasing as compared with the above-mentioned conventional projection type display apparatus.

The projection type display apparatus may comprise a polarizing device for preparatorily separating light from a light source in terms of polarization; a color separating optical system for chromatically decomposing the light preparatorily separated by the polarizing device into R, G, and B light components; a plurality of sets, for each color light component, of bending mirrors for respectively reflecting the R, G, and B light components chromatically decomposed by the color separating optical system, so as to change directions of optical axes thereof; first, second, and third light valves for respectively modulating the R, G, and B light components whose directions of optical axes are changed by the bending mirrors; a color combining optical system for chromatically combining together the R, G, and B light components respectively modulated by the first, second, and third light valves; and a projection optical system for projecting light chromatically combined by the color combining optical system; wherein, of the plurality of sets, for each color light component, of the bending mirrors, at least the bending mirror for each color light component disposed closest to the light valve corresponding thereto on an entrance side thereof is a mirror having a polarizing characteristic for causing reflected light to approach linearly polarized light.

In this apparatus, the light from the light source is preparatorily separated by the polarizing device in terms of polarization, and then is chromatically decomposed by the color separating optical system into R, G, and B light components. Each of the R, G, and B light components chromatically decomposed by the color separating optical system is reflected by a plurality of bending mirrors a plurality of times, so as to change its direction of optical axis a plurality of times. Then, the R, G, and B light components with thus changed directions of optical axes are respectively made incident on the first, second, and third light valves. Accordingly, as with the above-mentioned conventional projection type display apparatus, the respective color light components are made incident on the first, second and third light valves after their purity in polarization is enhanced by the above-mentioned polarizing device before being chromatically decomposed. Therefore, the purity in polarization of light incident on each light valve is enhanced, thereby improving the contrast of projection image. Also, in this apparatus, since the polarizing mirror is used at least as the bending mirror immediately in front of each of the first, second, and third light valves, all the color light components are made incident on their corresponding light valves by way of the bending mirrors, each of which is a polarizing mirror. Accordingly, even when the purity in polarization of the color light component once enhanced by the polarizing device is disturbed by the color separating optical system or the like, all the color light components would be made incident on their corresponding light valves after their purity in polarization is enhanced again by the bending mirrors. Consequently, as compared with the above-mentioned conventional projection type display apparatus, the purity in polarization of light incident on the light valve is further enhanced, thus further improving the contrast of projection image. Since the polarizing mirror can be constituted by a glass substrate and a dielectric multilayer film, for example, it is inexpensive and occupies only a very small space. Also, in this apparatus, since the polarizing mirror is used as the bending mirror inherent in the projection type display apparatus, the cost and size of the apparatus are prevented from increasing as compared with the above-mentioned conventional projection type display apparatus.

This apparatus may also be configured such that, of the plurality of bending mirrors for each color light component, as the bending mirror immediately in front of the light valve, a mirror having a simple reflecting function is used in place of the polarizing mirror, while a polarizing mirror is used as the bending mirror immediately after chromatic decomposition, for example. In this case, however, when a mirror using a dielectric multilayer film is employed as the bending mirror immediately in front of the light valve, the purity in polarization enhanced by the polarizing mirror immediately after the chromatic decomposition may be lowered by the bending mirror immediately in front of the light valve. From this viewpoint, preferred is this apparatus in which the polarizing mirror is employed as at least the bending mirror immediately in front of the light valve as mentioned above, whereby the color light component is made incident on the light valve while keeping the high purity in polarization enhanced by the polarizing mirror.

The projection type display apparatus may comprise a polarizing device for preparatorily separating light from a light source in terms of polarization; a color separating optical system for chromatically decomposing the light preparatorily separated by the polarizing device into R, G, and B light components; a plurality of sets, for each color light component, of bending mirrors for respectively reflecting the R, G, and B light components chromatically decomposed by the color separating optical system, so as to change directions of optical axes thereof; first, second, and third light valves for respectively modulating the R, G, and B light components whose directions of optical axes are changed by the bending mirrors a color combining optical system for chromatically combining together the R, G, and B light components respectively modulated by the first, second, and third light valves; and a projection optical system for projecting light chromatically combined by the color combining optical system; wherein each of the plurality of sets, for each color light component, of the bending mirrors is a mirror having a polarizing characteristic for causing reflected light to approach linearly polarized light.

In this apparatus, the light from the light source is preparatorily separated by the polarizing device in terms of polarization, and then is chromatically decomposed by the color separating optical system into R, G, and B light components. Each of the R, G, and B light components chromatically decomposed by the color separating optical system is reflected by a plurality of bending mirrors a plurality of times, so as to change its direction of optical axis a plurality of times. Then, the R, G, and B light components with thus changed directions of optical axes are respectively made incident on the first, second, and third light valves. Accordingly, as with the above-mentioned conventional projection type display apparatus, the respective color light components are made incident on the first, second and third light valves after their purity in polarization is enhanced by the above-mentioned polarizing device before being chromatically decomposed. Therefore, the purity in polarization of light incident on each light valve is enhanced, thereby improving the contrast of projection image. Also, in this apparatus, since the polarizing mirror is used as each of the plurality of bending mirrors, all the color light components are made incident on their corresponding light valves by way of the bending mirrors, each of which is a polarizing mirror. Accordingly, even when the purity in polarization of the color light component once enhanced by the polarizing device is disturbed by the color separating optical system or the like, all the color light components would be made incident on their corresponding light valves after their purity in polarization is enhanced again by the plurality of bending mirrors a plurality of times. Consequently, as compared with the above-mentioned conventional projection type display apparatus, the purity in polarization of light incident on the light valve is further enhanced, thus further improving the contrast of projection image. Since the polarizing mirror can be constituted by a glass substrate and a dielectric multilayer film, for example, it is inexpensive and occupies only a very small space. Also, in this apparatus, since the polarizing mirror is used as the bending mirror inherent in the projection type display apparatus, the cost and size of the apparatus are prevented from increasing as compared with the above-mentioned conventional projection type display apparatus.

The projection type display apparatus may comprise a polarizing device for preparatorily separating light from a light source in terms of polarization; a color separating optical system for chromatically decomposing the light preparatorily separated by the polarizing device into R, G, and B light components; at least one bending mirror for each color light component for reflecting the A, G, and B light components chromatically decomposed by the color separating optical system, so as to change directions of optical axes thereof; first, second, and third polarizing beam splitters and first, second, and third reflection type light valves respectively corresponding to the R, G, and B light components; a color combining optical system; and a projection optical system; the first, second, and third polarizing beam splitters respectively separating, in terms of polarization, the R, G, and B light components with the directions of optical axes changed by the bending mirrors into two sets each of polarized light components; the first, second, and third reflection type light valves each modulating one of the polarized light components respectively in the R, G, and B light components separated in terms of polarization by the first, second, and third polarizing beam splitters; the first, second, and third polarizing beam splitters respectively analyzing the R, G, and B light components modulated by the first, second, and third reflection type light valves; the color combining optical system chromatically combining together the R, G, and B light components analyzed by the first, second, and third polarizing beam splitters; the projection optical system projecting light chromatically combined by the color combining optical system; wherein each of the bending mirrors is a mirror having a polarizing characteristic for causing reflected light to approach linearly polarized light.

This apparatus is a specific example in which a reflection type light valve is used as each of the first, second, and third light valves. Here, without being restricted to the reflection type light valve, the first, second, and third light valves may be transmission type light valves as well.

In the present invention, as the polarizing device for effecting the above-mentioned preparatory polarization separation, a polarizing device such as that disclosed in the above-mentioned U.S. Pat. No. 5,357,370, a polarizing beam splitter, or any other polarizing device may be used.

Preferably, in the mirror used in the present invention having a polarizing characteristic for causing reflected light to approach linearly polarized light, over substantially the whole wavelength region of color light incident on the mirror, S-polarized light incident thereon at a predetermined incident angle has a reflectivity of at least 90%, whereas the reflectivity of P-polarized light incident thereon at the predetermined incident angle is lower by at least 15% than the reflectivity of S-polarized light incident thereon at the predetermined incident angle. For example, such a mirror can have a configuration comprising a glass substrate and a dielectric multilayer film laminated thereon. Though such a basic configuration is similar to that of the conventional dichroic mirror, the above-mentioned characteristic can be attained when the thickness of each layer of the dielectric multilayer film or the like is changed. In the conventional dichroic mirror, in a high-reflectivity wavelength region, S-polarized light and P-polarized light have substantially the same reflectivity, thereby essentially failing to have a polarizing characteristic for causing reflected light to approach linearly polarized light. Here, the mirror used in the present invention having a polarizing characteristic for causing reflected light to approach linearly polarized light may be a dichroic mirror having a selectivity for reflection wavelength.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mirror used for deflecting light when equipped in an optical system, said mirror comprising:

(a) a substrate having a surface that is flat; and
   (b) a plurality of films being parallel to the flat surface, having refractive indices different from each other, laminated on said flat surface of said substrate such that, within a predetermined wavelength band, reflectivity Rs of S-polarized light and reflectivity Rp of P-polarized light which are directly incident thereon at a predetermined angle different from 90 degrees satisfy the following expressions when an outermost film of said plurality of films is exposed to air:

$Rs \geq 90\%$ $Rs - Rp \geq 15\%$ wherein said outermost film is exposed to air so as to receive said light directly, and only one reflection occurs at a surface of said mirror on which said plurality of films are laminated.

2. A mirror according to claim 1, wherein said predetermined wavelength band is a predetermined wavelength band having a width of at least 50 nm selected from a wavelength band of 400 to 500 nm.

3. A mirror according to claim 1, wherein said predetermined wavelength band is a predetermined wavelength band having a width of at least 50 nm selected from a wavelength band of 500 to 600 nm.

4. A mirror according to claim 1, wherein said predetermined wavelength band is a predetermined wavelength band having a width of at least 50 nm selected from a wavelength band of 600 to 700 nm.

5. A mirror according to claim 1, wherein said substrate is made of glass, and said plurality of films are made of a plurality of kinds of dielectrics different from each other.

6. A mirror according to claim 5, wherein said dielectrics comprise $SiO_2$ and $ZrO_2$.

7. A mirror according to claim 5, wherein said dielectrics comprise $SiO_2$ and $TiO_2$.

8. A mirror according to claim 5, wherein said dielectrics comprise $MgF_2$ and $ZrO_2$.

9. A projection type display apparatus comprising:
   three mirrors including the mirror according to claim 1;
   a color separating optical system for chromatically decomposing white light from a light source into red (R), green (G), and blue (B) light components and guiding the decomposed light components to said mirrors;
   first, second, and third light valves respectively irradiated by the light components reflected by said mirrors;
   a color combining optical system for chromatically combining the light components respectively modulated by said first, second, and third light valves; and
   a projection optical system for projecting light combined by said color combining optical system.

10. A projection type display apparatus according to claim 9, wherein said three mirrors have reflection characteristics different from each other.

11. A projection type display apparatus according to claim 9, wherein said color combining optical system is a cross dichroic prism.

12. A projection type display apparatus according to claim 9, further comprising polarizing beam splitters respectively disposed in optical paths between said color combining optical system and said three mirrors.

13. A projection type display apparatus according to claim 9, further comprising a polarizing device disposed between an optical path between said light source and said color separating optical system.

14. A projection type display apparatus according to claim 13, wherein said polarizing device comprises a plurality of plates, each of said plates having:
   a glass substrate, and
   dielectric films, disposed on both surfaces of said glass substrate, having a refractive index higher than that of said glass substrate.

15. An optical article used for deflecting light when equipped in an optical system, said optical article comprising:

(a) a surface that is flat; and
   (b) a plurality of films being parallel to the flat surface, having refractive indices different from each other, laminated on said flat surface such that, within a predetermined wavelength band, reflectivity Rs of S-polarized light and reflectivity Rp of P-polarized light which are directly incident thereon at a predetermined angle different from 90 degrees satisfy the following expressions when an outermost film of said plurality of films is exposed to air:

$Rs \geq 90\%$ $Rs - Rp \geq 15\%$ wherein said outermost film is exposed to air so as to receive said light directly, and only one reflection occurs at a surface of said optical article on which said plurality of films are laminated.

16. An optical article according to claim 15, wherein said predetermined wavelength band is a predetermined wavelength band having a width of at least 50 nm selected from a wavelength band of 400 to 500 nm.

17. An optical article according to claim 15, wherein said predetermined wavelength band is a predetermined wavelength band having a width of at least 50 nm selected from a wavelength band of 500 to 600 nm.

18. An optical article according to claim 15, wherein said predetermined wavelength band is a predetermined wavelength band having a width of at least 50 nm selected from a wavelength band of 600 to 700 nm.

19. An optical article according to claim 15, wherein said flat surface is made of glass, and said plurality of films are made of a plurality of kinds of dielectrics different from each other.

20. An optical article according to claim 19, wherein said dielectrics comprise $SiO_2$ and $ZrO_2$.

21. An optical article according to claim 19, wherein said dielectrics comprise $SiO_2$ and $TiO_2$.

22. An optical article according to claim 19, wherein said dielectrics comprise $MgF_2$ and $ZrO_2$.

23. A projection type display apparatus comprising:
- three optical articles each including the optical article according to claim 15;
- a color separating optical system for chromatically decomposing white light from a light source into red (R), green (G), and blue (B) light components and guiding the decomposed light components to said optical articles;
- first, second, and third light valves respectively irradiated by the light components reflected by said optical articles;
- a color combining optical system for chromatically combining the light components respectively modulated by said first, second, and third light valves; and
- a projection optical system for projecting light combined by said color combining optical system.

24. A mirror according to claim 1, wherein said predetermined angle is 45 degrees.

25. An optical article according to claim 15, wherein said predetermined angle is 45 degrees.

* * * * *